United States Patent
Yamaguchi et al.

(10) Patent No.: US 9,021,568 B2
(45) Date of Patent: Apr. 28, 2015

(54) VERIFICATION METHOD FOR VERIFYING VALIDITY OF PROGRAM, AND VERIFICATION SYSTEM

(71) Applicant: Panasonic Intellectual Property Corporation of America, Torrance, CA (US)

(72) Inventors: Takahiro Yamaguchi, Osaka (JP); Yuichi Futa, Ishikawa (JP); Natsume Matsuzaki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/147,908

(22) Filed: Jan. 6, 2014

(65) Prior Publication Data

US 2014/0196134 A1 Jul. 10, 2014

Related U.S. Application Data

(60) Provisional application No. 61/750,105, filed on Jan. 8, 2013.

(51) Int. Cl.
*G06F 21/44* (2013.01)
(52) U.S. Cl.
CPC .................................. *G06F 21/44* (2013.01)
(58) Field of Classification Search
CPC combination set(s) only.
See application file for complete search history.

(56) References Cited

U.S. PATENT DOCUMENTS

| | | | |
|---|---|---|---|
| 6,647,494 B1 * | 11/2003 | Drews | 713/170 |
| 8,024,582 B2 * | 9/2011 | Kunitz et al. | 713/193 |
| 8,321,933 B2 * | 11/2012 | Traenkenschuh et al. | 726/22 |
| 8,458,479 B2 * | 6/2013 | Takashima | 713/176 |
| 8,943,318 B2 * | 1/2015 | Lee et al. | 713/168 |
| 2010/0130254 A1 | 5/2010 | Kamada et al. | |
| 2013/0050093 A1 | 2/2013 | Kim et al. | |

FOREIGN PATENT DOCUMENTS

| | | |
|---|---|---|
| JP | 2003-78971 | 3/2003 |
| JP | 2006-129184 | 5/2006 |
| JP | 2013-45467 | 3/2013 |
| WO | 2008/129773 | 10/2008 |

OTHER PUBLICATIONS

International Search Report issued Feb. 10, 2014 in International (PCT) Application No. PCT/JP2013/006620.

* cited by examiner

*Primary Examiner* — Beemnet Dada
(74) *Attorney, Agent, or Firm* — Wenderoth, Lind & Ponack, L.L.P.

(57) ABSTRACT

A verification method pertaining to the present invention is executed by a terminal device and is used for determining the validity of a control program used for remotely controlling an appliance via a server. Verification data generated from: a unique identifier which is assigned to a user of the terminal device; a parameter which is generated by the server device and is assigned to the control program; and partial data which is at least a portion of the control program, is compared with comparison data generated from: the ID of the user stored in the server device; the parameter; and a portion of a program corresponding to the partial data of the control program. When a mismatch occurs, the remote control of the appliance will be prohibited.

21 Claims, 39 Drawing Sheets

Account management table 261

| Account information set | | | |
|---|---|---|---|
| User identifier | Password | Time-varying parameter | Unique identifier |
| SATO | 1234 | AD7C | 8DA4 |
| ITO | Abcd | 7D2B | 9C5E |
| JOHN | A2C4 | 4A69 | 7A3E |
| PETER | 9876 | F93C | 85A1 |
| ⋮ | ⋮ | ⋮ | ⋮ |

Condition table for acquisition of appliance information — 271

| Conditions for acquisition of appliance information ||
|---|---|
| Appliance information | Condition |
| Inside temperature and humidity measured by air conditioner | Login is unnecessary<br>Unique identifier is necessary |
| Locking state of Door | Login is necessary<br>Unique identifier is necessary |
| Channel of TV that is being tuned to | Login is unnecessary<br>Unique identifier is necessary |
| Title of DVD that is being played back | Login is unnecessary<br>Unique identifier is necessary |
| ⋮ | ⋮ |

273 → (Inside temperature row), 272 / 274 → (Condition cell)

FIG. 8

Control rule management table 281

| User identifier | SATO | 282 |
|---|---|---|
| Control rule information set | | |
| Operation information | Condition | Item |
| Rule change | Unique identifier is necessary | — |
| Opening/ closing of door | Unique identifier is necessary | Locking |
| Power control of air conditioner | Unique identifier is necessary | OFF |
| Timer recording of TV program | Unique identifier is unnecessary Login is necessary | Starting of timer recording |
| Operation of living-room light | Unique identifier is necessary | ON, OFF |
| Operation of dining room light | Unique identifier is necessary | ON, OFF |
| Operation of security camera | Unique identifier is unnecessary Login is necessary | Deletion of data |
| ⋮ | ⋮ | ⋮ |

284 — Opening/closing of door
285
283
286

FIG. 35

Account management table 1261

| User identifier | Password | Time-varying parameter | Unique identifier | E-mail address |
|---|---|---|---|---|
| SATO | 1234 | AD7C | 8DA4 | sato@example1.com |
| ITO | Abcd | 7D2B | 9C5E | ito@example1.com |
| JOHN | A2C4 | 4A69 | 7A3E | john@example1.com |
| PETER | 9876 | F93C | 85A1 | peter@example1.com |
| ... | ... | ... | ... | ... |

Account information set 1262

1263 1264 1265 1266 1267

VERIFICATION METHOD FOR VERIFYING VALIDITY OF PROGRAM, AND VERIFICATION SYSTEM

CROSS-REFERENCE TO RELATED APPLICATIONS

This application claims benefit to the U.S. provisional Application No. 61/750,105, filed on Jan. 8, 2013.

TECHNICAL FIELD

The present invention relates to technology of verifying the validity of an application program, and in particular to a technology of verifying the validity of an application program that is being executed.

BACKGROUND ART

There have been portable terminals having a communication function and capable of downloading application programs (hereinafter simply referred to as "programs") from an external server via a communication network, the external server distributing various kinds of programs according to a user's request (cf. Patent Literature 1). By installing downloaded programs, the portable terminals will be capable of executing various additional functions.

CITATION LIST

Patent Literature

[Patent Literature 1] Japanese Patent Application Publication No. 2013-45467

SUMMARY OF INVENTION

Technical Problem

Programs distributed by the external server include a remote control program for controlling home electrical appliances (hereinafter simply referred to as "appliances") having a function to connect to a network. If such a program used by a user has been tampered with by a third party, there is a risk that the user's appliance will be controlled by a third party without authority or that the information stored in the appliance will be stolen by a third party. In addition, since such a program connects to a network during the use, there is a high risk of being tampered with by a third party.

The present invention is made in view of the problems described above, and aims to provide a verification method for verifying the validity of a program that is being executed, and regulating remote control performed by the program, based on the result of the verification.

Solution to Problem

To solve the problem described above, a verification method pertaining to the present invention is a verification method for verifying validity of a control program, the control program being executed by a terminal device to remotely control an appliance via a server device, the verification method comprising: a unique identifier acquiring step of acquiring a unique identifier from a unique identifier storage device that stores therein the unique identifier, the unique identifier being assigned to a user of the terminal device; a parameter acquiring step of acquiring a parameter generated by the server device, the parameter being assigned to the control program; a generating step of repeatedly generating verification data during execution of the control program based on partial data, the unique identifier, and the parameter, the partial data being at least a portion of the control program; a transmitting step of transmitting the verification data to the server device every time the verification data is generated; a comparison data generating step of, every time the server device receives the verification data, generating comparison data by using at least one of: an ID stored in correspondence with an authorized user of the control program; the parameter; and a portion of a control program stored in the server device, the control program stored in the server device being in correspondence with the control program executed by the terminal device, and the portion of the control program stored in the server device being in correspondence with the partial data; a determining step of determining whether the control program stored in the terminal device is valid by comparing the verification data with the comparison data; and a controlling step of prohibiting the terminal device from remotely controlling the appliance when the control program is determined as not valid in the determining step.

Effects of Invention

The above-described verification method pertaining to the present invention realizes verification of the validity of a program that is being executed, and realizes prohibition of the remote control by the program based on the result of the verification.

BRIEF DESCRIPTION OF DRAWINGS

FIG. 7 shows an example data structure of a condition table 271.
FIG. 8 shows an example data structure of a control rule management table 281.

FIG. 35 shows an example data structure of an account management table 1261.

DESCRIPTION OF EMBODIMENTS

<1. Embodiment 1>

The following describes a remote control system 10 as Embodiment 1 that uses a verification method pertaining to the present invention.

<1.1 Remote Control System 10>

Figure 1:
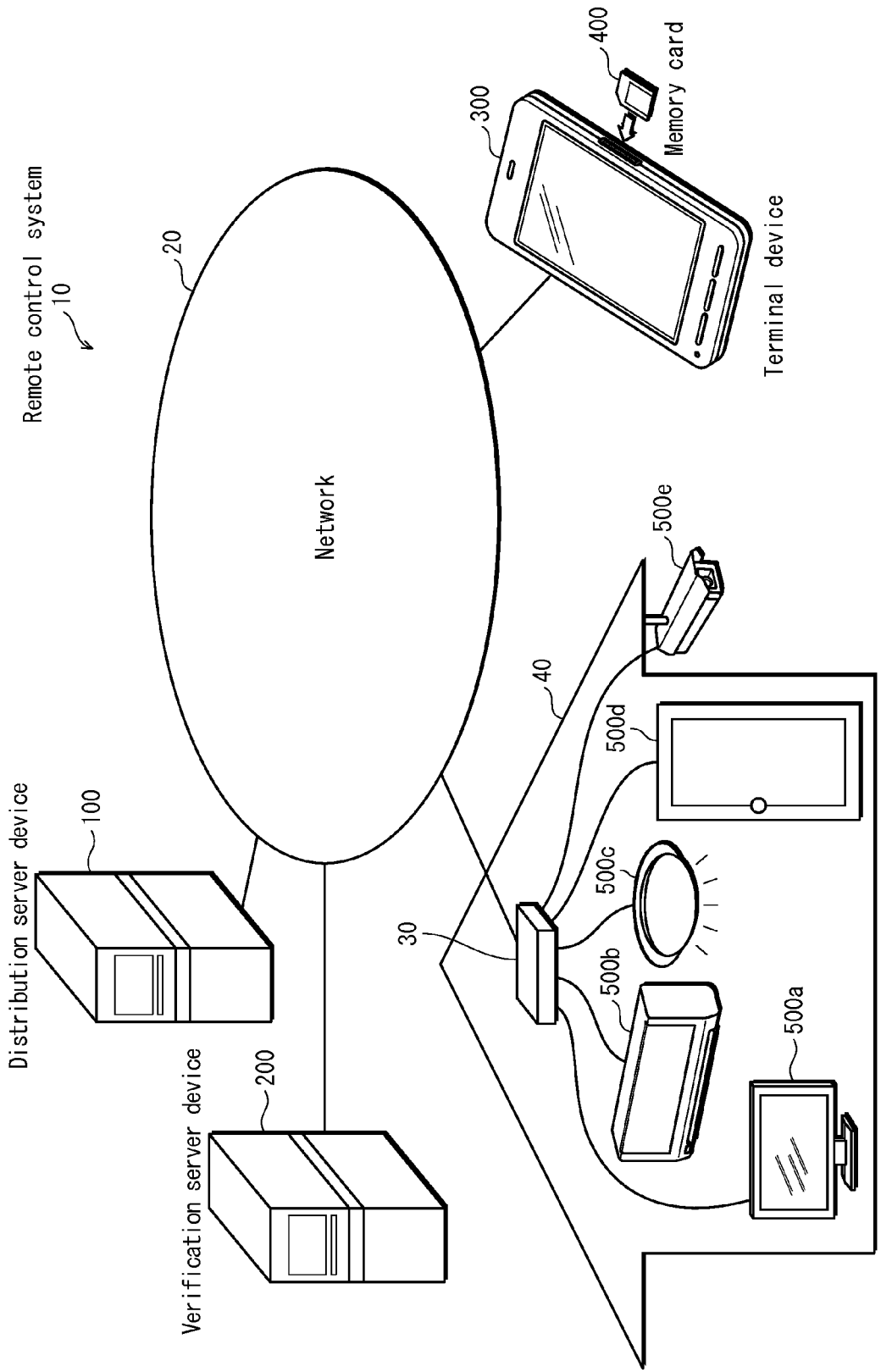
FIG. 1 shows the structure of a remote control system 10 as Embodiment 1 of the present invention.

As shown in FIG. 1, the remote control system 10 includes a distribution server device 100, a verification server device 200, a terminal device 300, a memory card 400, and appliances 500a, 500b, 500c, 500d and 500e.

The distribution server device 100, the verification server device 200 and the terminal device 300 are connected via a network 20. The appliances 500a, 500b, 500c, 500d and 500e are provided within a user's house 40. The appliances 500a, 500b, 500c, 500d and 500e are connected to the network 20 via a router 30.

The appliances 500a, 500b, 500c, 500d and 500e are, for example, a TV receiver, an air conditioner, a lighting device, a door lock system, and a security camera, respectively.

The memory card 400, which is portable, is attached to the terminal device 300.

In the following, the appliances 500a, 500b, 500c, 500d and 500e may be referred to collectively as "the appliances 500".

The terminal device 300 transmits, for example, the following remote control instructions to the appliances 500 via the verification server device 200.

Instructions to be transmitted to the appliance 500a as a TV receiver include an instruction to power on or off, an instruction to select a channel, an instruction to set timer recording, an instruction to cancel timer recording, an instruction to acquire information of the channel that is being tuned to, and an instruction to acquire information of the program that is being received. Instructions to be transmitted to the appliance 500b as an air conditioner include: an instruction to power on or off; an instruction to change the temperature setting; an instruction to acquire the current temperature; an instruction to acquire the current humidity; and an instruction to switch between a cooling mode, a heating mode, and a fan mode. Instructions to be transmitted to the appliance 500c as a lighting device include: an instruction to power on or off; and an instruction to change the brightness. Instructions to be transmitted to the appliance 500d as a door lock system include: an instruction to lock; an instruction to unlock; and an instruction to acquire state information showing whether the door is locked or unlocked. Instructions to be transmitted to the appliance 500e as a security camera include: an instruction to start recording; an instruction to stop recording; an instruction to transfer a recorded video to a TV receiver; and an instruction to delete a recorded video.

The verification server device 200 transmits a control program for remote control of an appliance to the distribution server device 100. The terminal device 300 receives the control program from the distribution server device 100, and installs the control program thus received.

The terminal device 300 starts up the control program according to the user's instruction. Subsequently, the terminal device 300 acquires a unique identifier from the memory card 400 attached to the terminal device 300, and transmits the unique identifier thus acquired to the verification server device 200. If the terminal device 300 stores therein associated data, the terminal device 300 embeds the associated data into the control program.

The verification server device 200 receives the unique identifier from the terminal device 300. When the user of the terminal device 300 successfully logs in, the verification server device 200 generates the associated data containing the acquired unique identifier, and transmits the associated data thus generated to the terminal device 300. The terminal device 300 receives the associated data, and stores therein the associated data thus received.

The verification server device 200 embeds the associated data into the control program, calculates a hash value from the control program, and calculates an evaluation value S by using a random number, the hash value, and the unique identifier.

The terminal device 300 acquires the unique identifier from the memory card 400, calculates the hash value from the control program, and calculates an evaluation value S' by using a random number, the hash value and the unique identifier.

The verification server device 200 receives the evaluation value S' from the terminal device 300, and compares the evaluation value S' with the evaluation value S. When the evaluation value S' matches the evaluation value S, the verification server device 200 permits the remote control of the appliance. When the evaluation value S' does not match the evaluation value S, the verification server device 200 prohibits the remote control of the appliance.

<1.2 Distribution Server Device 100>

Figure 2:
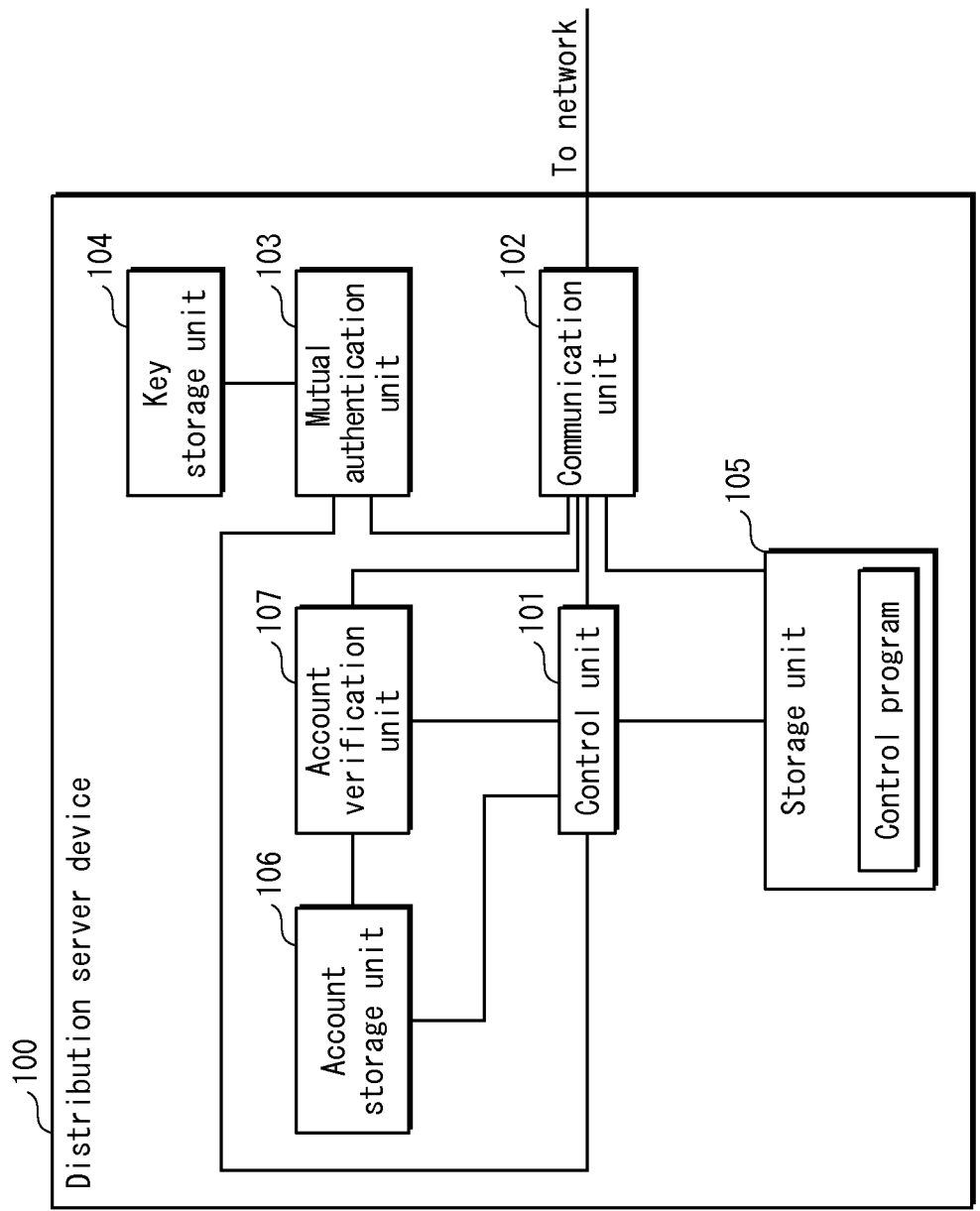
FIG. 2 is a block diagram showing the structure of a distribution server device 100.

As shown in FIG. 2, the distribution server device 100 includes a control unit 101, a communication unit 102, a mutual authentication unit 103, a key storage unit 104, a storage unit 105, an account storage unit 106, and an account verification unit 107.

The distribution server device 100 is specifically realized as a computer system including a microprocessor, ROM, RAM, a hard disk device, and so on. The RAM or the hard disk device stores a computer program. The microprocessor operates according to the computer program and thereby realizes the functions of the distribution server device 100.

(1) Key Storage Unit 104 and Storage Unit 105

The key storage unit 104 is specifically realized as a hard disk device, for example. The key storage unit 104 stores therein a private key assigned to the distribution server device 100. The key storage unit 104 also stores a system key Ksc written in advance. The system key Ksc is a common key used within the remote control system. Note that the key storage unit of each of the verification server device 200, the terminal device 300 and the memory card 400 stores the same system key Ksc as the key storage unit 104. These system keys have been written in advance.

The storage unit 105 is realized as a hard disk device, for example. The storage unit 105 has a region for storing a control program.

(2) Communication Unit 102

The communication unit 102 exchanges information with the verification server device 200 and with the terminal device 300 via the network 20.

Specifically, the communication unit 102 receives a control program from the verification server device 200 via a network 20 by using a secure means. Upon receiving the control program, the communication unit 102 writes the control program thus received into the storage unit 105. The communication unit 102 also receives a request for a control program from the terminal device 300 via the network 20. Upon receiving the request of a control program, the communication unit 102 outputs the request thus received to the control unit 101. The communication unit 102 also receives a user identifier and a password from the terminal device 300 via the network 20 by using a secure means. Upon receiving the user identifier and the password, the communication unit 102 outputs the user identifier and the password thus received to the account verification unit 107.

Also, under the control of the control unit 101, the communication unit 102 transmits a request for the user identifier and the password to the terminal device 300. Also, under the control of the control unit 101, the communication unit 102 reads the control program stored in the storage unit 105. Subsequently, the communication unit 102 transmits the control program thus read to the terminal device 300 by using a secure means. Also, under the control of the control unit 101, the communication unit 102 transmits a message to the terminal device 300. The secure means will be described later.

(3) Account Storage Unit 106 and Account Verification Unit 107

The account storage unit 106 stores therein a user identifier assigned to a user, and a password of the user, in association with each other. The user identifier and the password are input by an operator of the distribution server device 100.

The account verification unit 107 receives the user identifier and the password of the user of the terminal device 300 from the terminal device 300 via the network 20 and the communication unit 102 by using a secure means. Upon receiving the user identifier and the password, the account verification unit 107 subsequently determines whether the user identifier and the password thus received are stored in the account storage unit 106.

If the user identifier and the password thus received are not stored in the account storage unit 106, the account verification unit 107 determines that the login has failed (i.e. unsuccessful login). If the user identifier and the password thus received are stored in the account storage unit 106, the account verification unit 107 determines that the login has been successful (i.e. successful login).

When the user identifier and the password thus received are not stored in the account storage unit 106, that is, in the case of the unsuccessful login, the account verification unit 107 generates a message indicating the unsuccessful login. Subsequently, the account verification unit 107 transmits the message thus generated to the terminal device 300 via the communication unit 102 and the network 20. Subsequently, the account verification unit 107 prohibits the user using the user identifier and the password from logging in.

When the user identifier and the password thus received are stored in the account storage unit 106, the account verification unit 107 permits the user using the user identifier and the password to log in.

The account verification unit 107 outputs permission/prohibition information, which indicates either permission or prohibition of logging in, to the control unit 101.

(4) Control Unit 101

The control unit 101 controls the communication unit 102, the mutual authentication unit 103, the key storage unit 104, the storage unit 105, the account storage unit 106, and the account verification unit 107.

The control unit 101 receives a request for a control program from the terminal device 300 via the network 20 and the communication unit 102. Upon receiving the request for the control program, the control unit 101 transmits a request for the user identifier and the password to the terminal device 300 via the communication unit 102 and the network 20.

The control unit 101 receives the permission/prohibition information, which indicates either permission or prohibition of logging in, from the account verification unit 107.

When receiving the request for the control program and the permission/prohibition information indicates permission of logging in, the control unit 101 controls the communication unit 102 to read the control program from the storage unit 105. Subsequently, the control unit 101 controls the communication unit 102 to transmit the control program thus read to the terminal device 300 via the communication unit 102 and the network 20 by using a secure means.

(5) Mutual Authentication Unit 103

The mutual authentication unit 103 has the same structure as the mutual authentication unit 203 of the verification server device 200.

When receiving the control program, the mutual authentication unit 103 performs mutual authentication and key sharing with the mutual authentication unit 203 of the verification server device 200. When transmitting the control program, the mutual authentication unit 103 performs mutual authentication and key sharing with the mutual authentication unit 303 of the terminal device 300. The mutual authentication and the key sharing will be described later.

Also, the mutual authentication unit 103 supports the communications using the secure means performed with the verification server device 200 and with the terminal device 300. The communications using the secure means will be described later.

<1.3 Verification Server Device 200>

Figure 3:
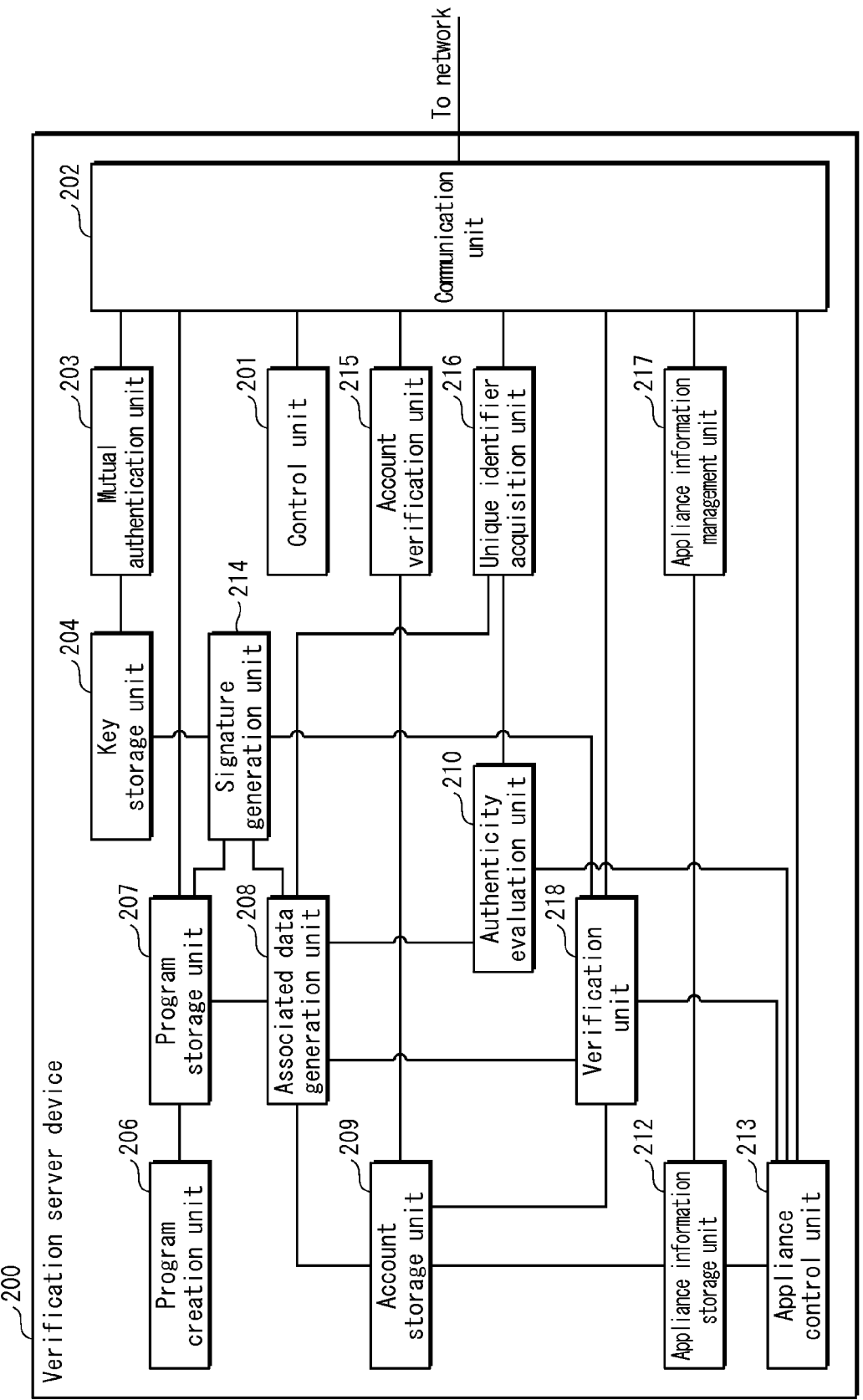
FIG. 3 is a block diagram showing the structure of a verification server device 200.

As shown in FIG. 3, the verification server device 200 includes a control unit 201, a communication unit 202, a mutual authentication unit 203, a key storage unit 204, a program creation unit 206, a program storage unit 207, an associated data generation unit 208, an account storage unit 209, an authenticity evaluation unit 210, an appliance information storage unit 212, an appliance control unit 213, a signature generation unit 214, an account verification unit 215, a unique identifier acquisition unit 216, an appliance information management unit 217 and a verification unit 218.

The verification server device 200 is specifically realized as a computer system including a microprocessor, ROM, RAM, a hard disk device, a display device, a keyboard, and so on. The RAM or the hard disk device stores a computer program. The microprocessor operates according to the computer program and thereby realizes the functions of the verification server device 200.

(1) Program Storage Unit 207, Key Storage Unit 204 and Appliance Information Storage Unit 212

(Program Storage Unit 207)

The program storage unit 207 is specifically realized as a hard disk device, for example. The program storage unit 207 has regions for storing the control program 231 and the control program 331.

The control program 231 is a computer program to be distributed to the terminal device 300 via the distribution server device 100. The control program 331 is a computer program that is the same as the computer program installed in the terminal device 300. To enable the verification server device 200 to duplicate the state of the control program installed in the terminal device 300, the program storage unit 207 has a region for storing the control program 331.

Figure 4:
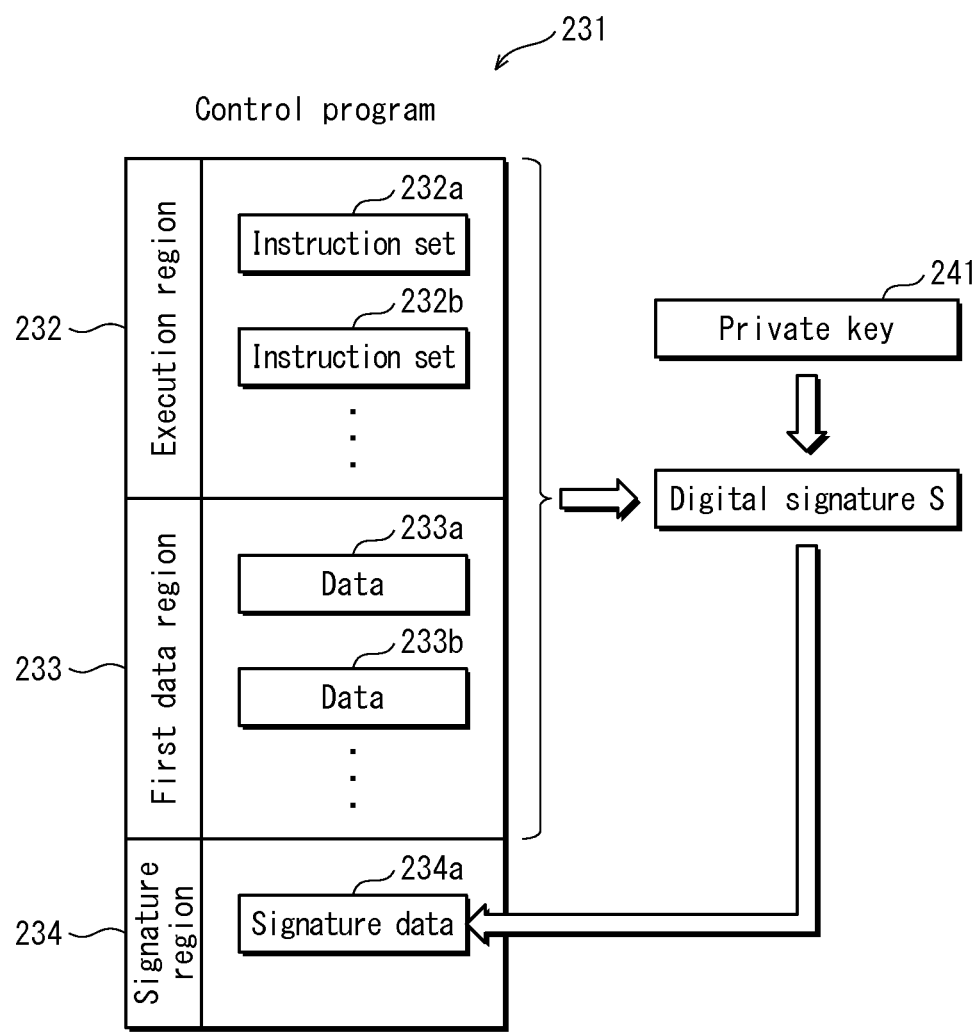
FIG. 4 shows an example data structure of a control program 231.

(a) FIG. 4 shows the data structure of the control program 231. As shown in this drawing, the control program 231 is composed of an execution region 232, a first data region 233, and a signature region 234.

The execution region 232 stores therein a plurality of instruction sets 232a, 232b, and so on. Each instruction set includes operation commands to be executed by the terminal device 300. The first data region 233 stores data 233a, 233b, and so on, which are read-only and referred to when the plurality of instruction sets 232a, 232b, and so on are executed. The signature region 234 stores signature data 234a.

The signature data 234a is generated by the signature generation unit 214. The signature data 234a is generated by applying a digital signature Sign to the execution region 232 and the first data region 233 of the control program 231 by using a private key 241 assigned to the verification server device 200.

Signature Data 234a=Sign(Private Key 241, (Execution Region 232 and First Data Region 233))

In the above, Sign(A, B) denotes the signature data generated by applying the digital signature Sign to the data B by using the private key A. Here, the digital signature Sign is, for example, a digital signature algorithm based on Elliptic Curve Digital Signature standard (ECDSA).

By performing digital signature verification Vrfy corresponding to the digital signature Sign by using the signature data 234a, it is possible to determine whether the execution region 232 and the first data region 233 have been tampered with. Here, the digital signature verification Vrfy is, for example, a digital signature verification algorithm based on Elliptic Curve Digital Signature standard (ECDSA).

Figure 10:
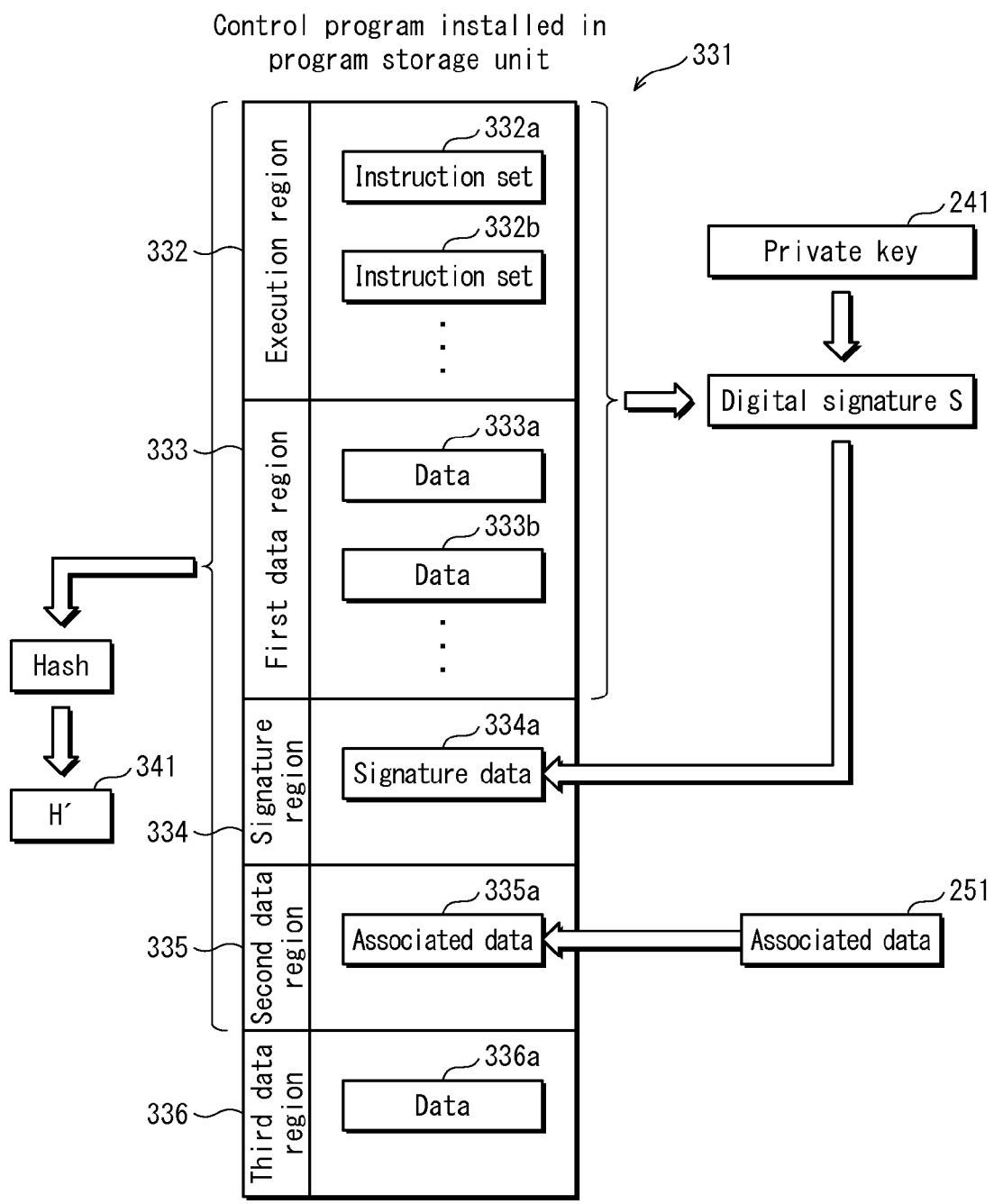
FIG. 10 shows an example data structure of a control program 331 which has been installed.

(b) FIG. 10 shows the data structure of the control program 331. As shown in this drawing, the control program 331 is composed of an execution region 332, a first data region 333, a signature region 334, a second data region 335, and a third data region 336.

The execution region 332 stores therein a plurality of instruction sets 332a, 332b, and so on. Each instruction set includes operation commands to be executed by the terminal device 300. The first data region 333 stores data 333a, 333b, and so on which are read-only and referred to when the plurality of instruction sets 332a, 332b, and so on are executed. The signature region 334 stores signature data 334a.

The execution region 332, the first data region 333 and the signature region 334 are the same as the execution region 232, the first data region 233 and the signature region 234 shown in FIG. 4, respectively. The plurality of instruction sets 332a, 332b and so on stored in the execution region 332 are the same as the plurality of instruction sets 232a, 232b, and so on shown in FIG. 4, respectively. The data 333a, 333b and so on stored in the first data region 333 are the same as the data 233a, 233b and so on shown in FIG. 4, respectively. The signature data 334a stored in the signature region 334 is the same as the signature data 234a shown in FIG. 4.

The second data region 335 stores associated data 335a. The associated data 335a is to be overwritten with the associated data 251 which is generated as described below.

The third data region 336 stores data 336a. The data 336a is added, updated, overwritten or referred to according to the instruction sets 332a, 332b and so on.

(Key Storage Unit 204)

The key storage unit 204 is specifically realized as a hard disk device, for example. The key storage unit 204 stores therein a private key 241 assigned to the verification server device 200. The key storage unit 204 also stores the system key Ksc written in advance.

(Appliance Information Storage Unit 212)

The appliance information storage unit 212 stores a condition table 271 and a control rule management table 281 written in advance.

The condition table 271 has, as shown in FIG. 7 for example, a region for storing a plurality of condition information sets.

Each condition information set associates appliance information and a condition with each other. The appliance information shows the type of information of the appliance. The condition shows a condition for acquisition applied to the appliance state information corresponding to the type indicated by the appliance information. The appliance state information, corresponding to the type indicated by the appliance information, shows the actual state of the appliance.

When the appliance is an air conditioner, the appliance information indicates "Inside temperature, humidity measured by air conditioner", for example. The appliance state information corresponding to the appliance information is, for example, "25 degrees" and "50%" actually measured by the air conditioner.

When the appliance is a TV receiver, the appliance information indicates "Channel that is being tuned to", for example. The appliance state information corresponding to the appliance information is, for example, "16" which is the number of the channel that is currently tuned to.

When the appliance is a DVD playback device, the appliance information is "Title of the DVD that is being played back", for example. The appliance state information corresponding to the appliance information is, for example, the actual title "Galaxy Wars" of the DVD currently being played back by the DVD playback device.

The specific examples of the condition include, whether it is necessary to log into the verification server device 200 from the terminal device 300, and whether the unique identifier of the memory card 400 attached to the terminal device 300 is necessary.

The condition table 271 contains, for example, a condition information set 272. The condition information set 272 contains the appliance information 273 "Inside temperature and humidity measured by air conditioner" and the condition "Login is unnecessary, Unique identifier is necessary" in association with each other. The condition information set 272 indicates that it is unnecessary to log into the verification server device 200 from the terminal device 300 to acquire the inside temperature and humidity measured by the air conditioner as the appliance via the network 20, but the unique identifier is required.

The control rule management table 281 has, as shown in FIG. 8, a region for storing a user identifier and a plurality of control rule information sets, in association with each other.

The user identifier identifies the user of the remote control system 10.

Each control rule information set contains operation information, a condition, and an item. The operation information shows the information of the operation that the user can be permitted to perform. The condition indicates the condition for permitting the user to perform the operation. The item shows a target operation related to the operation information.

The control rule management table 281 contains, as shown in FIG. 8, a control rule information set 283 for example. The control rule information set 283 contains operation information 284 "Opening/closing of door", a condition 285 "Unique identifier is necessary", and an item "Locking".

In this way, the control rule information set 283 indicates that the operation of opening or closing the door requires the unique identifier, and that the target operation related to the operation information is locking.

(2) Program Creation Unit 206

The program creation unit 206 creates a control program according to operations by the user of the verification server device 200. The program creation unit 206 writes the control program thus created into the program storage unit 207.

Examples of the control program include a computer program for acquiring information of the appliance 500 to be subject to the remote control, a computer program for operating the appliance 500 under the remote control, a computer program for changing the appliance control rule, and so on.

The control program to be created is composed of the execution region 232 and the first data region 233 from among the regions of the control program 231 shown in FIG. 4, for example.

The program creation unit 206 reads the control program 231 shown in FIG. 4 from the program storage unit 207 according to operations by the user of the verification server device 200. Subsequently, the program creation unit 206 installs the control program 231 thus read into the program storage unit 207. Consequently, the control program 331 shown in FIG. 10 is stored into the program storage unit 207. As described above, when compared with the control program 231, the control program 331 additionally has the second data region 335 and the third data region 336. At this stage, the second data region 335 and the third data region 336 are in their initial states. That is, no data is stored in these regions.

(3) Account Storage Unit 209 and Account Verification Unit 215

(Account Storage Unit 209)

The account storage unit 209 stores an account management table 261.

Figures 5, 6:
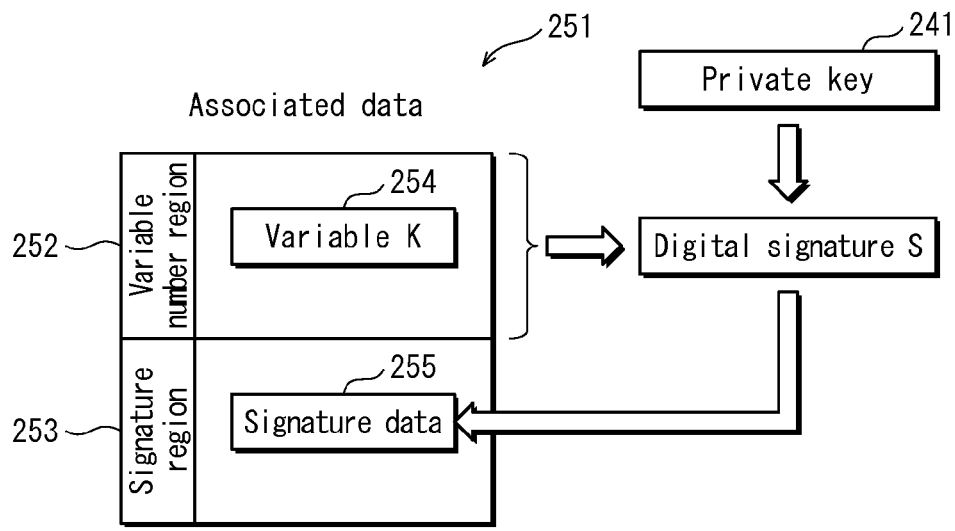
FIG. 5 shows an example data structure of associated data 251.
FIG. 6 shows an example data structure of an account management table 261.

The account management table 261 is, as shown in FIG. 6 for example, a region for storing a plurality of account information sets. Each account information set corresponds to a user. Each account information set contains a user identifier, a password, a time-varying parameter and a unique identifier. The user identifier uniquely identifies the user. The password is used for authenticating the user. The time-varying parameter is a random number generated at each time. The unique identifier is an identifier that is unique to the memory card owned by the user.

The account management table 261 contains, as shown in FIG. 6 for example, an account information set 262. The account information set 262 contains a user identifier 263 "SATO", a password 264 "1234", a time-varying parameter 265 "AD7C" and a unique identifier 266 "8DA4".

(Account Verification Unit 215)

The account verification unit 215 receives login necessity information showing whether login is necessary or not from the terminal device 300 via the network 20 and the communication unit 202. Subsequently, the account verification unit 215 determines whether the login necessity information thus received shows that login is necessary or not.

When the login necessity information shows that login is not necessary, the account verification unit 215 does not perform login processing.

When the login necessity information thus received indicates that login is necessary, the account verification unit 215 receives the user identifier and the password of the user from the terminal device 300 via the network 20 and the communication unit 202 by using a secure means. The secure means will be described later. Subsequently, the account verification unit 215 determines whether the pair of the user identifier and the password is contained in the account management table 261 in the account storage unit 209.

The account verification unit 215 determines that the login has failed (i.e. unsuccessful login) if the account verification unit 215 does not receive the user identifier and the password from the terminal device 300 even after five minutes, for example, have elapsed since receiving the login necessity information from the terminal device 300. If the user identifier and the password thus received are not stored in the account management table 261, the account verification unit 215 determines that the login has failed (i.e. unsuccessful login).

If the user identifier and the password thus received are stored in the account management table 261, the account verification unit 215 determines that the login has been successful (i.e. successful login).

The account verification unit 215 sends the login results, showing either successful login or unsuccessful login, to the control unit 201.

In the case of the unsuccessful login, the account verification unit 215 generates a message showing the unsuccessful login. Subsequently, the account verification unit 215 transmits the message to the terminal device 300 via the communication unit 202 and the network 20.

(4) Unique Identifier Acquisition Unit 216

The unique identifier acquisition unit 216 receives a connection request from the control unit 201. Upon receiving the connection request, after the mutual authentication and the key sharing, the unique identifier acquisition unit 216 transmits a request for the unique identifier to the memory card 400 via the communication unit 202, the network 20 and the terminal device 300.

Subsequently, the unique identifier acquisition unit 216 receives a unique identifier Y or a message "no unique identifier", which indicates that no unique identifier is stored in the memory card 400, from the memory card 400 via the terminal device 300, the network 20 and the communication unit 202 by using a secure means. The secure means will be described later. If the unique identifier acquisition unit 216 does not receive the unique identifier Y or the message indicating that no unique identifier is stored in the memory card 400 even after a predetermined period has elapsed since transmitting the request for the unique identifier to the memory card 400, the unique identifier acquisition unit 216 generates a message indicating "no unique identifier". The predetermined period is 200 ms, for example.

Subsequently, the unique identifier acquisition unit 216 outputs the unique identifier Y thus acquired or the message indicating "no unique identifier" to the associated data generation unit 208, the authenticity evaluation unit 210 and the verification unit 218.

(5) Control Unit 201

The control unit 201 controls the communication unit 202, the mutual authentication unit 203, the key storage unit 204, the program creation unit 206, the program storage unit 207, the associated data generation unit 208, the account storage unit 209, the authenticity evaluation unit 210, the appliance information storage unit 212, the appliance control unit 213, the signature generation unit 214, the account verification unit 215, the unique identifier acquisition unit 216, the appliance information management unit 217 and the verification unit 218.

The control unit 201 also receives a connection request for operating the appliance from the terminal device 300, via the network 20 and the communication unit 202. Upon receiving the connection request, the control unit 201 outputs the connection request for operating the appliance to the mutual authentication unit 203 and the unique identifier acquisition unit 216.

The control unit 201 receives the login results, which indicate either the successful login or the unsuccessful login, from the account verification unit 215. When receiving the login results indicating successful login, the control unit 101 stores the received user identifier and password.

(6) Communication Unit 202

Under the control of the control unit 201, the communication unit 202 exchanges information with the distribution server device 100, the terminal device 300, the memory card 400, and the appliances 500a, 500b, 500c, 500d and 500e via the network 20.

Specifically, under the control of the control unit 201, the communication unit 202 transmits the control program to the distribution server device 100 via the network 20.

Under the control of the control unit 201, the communication unit 202 also transmits the request for the unique identifier to the memory card 400 via the network 20 and the terminal device 300. The communication unit 202 also transmits the message, the associated data and the random number R to the terminal device 300 via the network 20.

The communication unit 202 also receives the connection request for operating the appliance, the login necessity information, the user identifier, the password, the operation instruction for the appliance, and the evaluation value S' from the terminal device 300 via the network 20. The communication unit 202 receives the unique identifier Y or the message indicating "no unique identifier" from the memory card 400 via the terminal device 300 and the network 20.

(7) Mutual Authentication Unit 203

The mutual authentication unit 203 receives the connection request for transmitting the control program and the connection request for operating the appliance from the control unit 201.

When receiving the connection request for transmitting the control program, the mutual authentication unit 203 performs the mutual authentication with the mutual authentication unit 103 of the distribution server device 100, and shares the same shared key with the distribution server device 100.

When receiving the connection request for operating the appliance, the mutual authentication unit 203 performs the mutual authentication with the mutual authentication unit 303 of the terminal device 300, and shares the same shared key with the terminal device 300. The mutual authentication unit 203 also performs the mutual authentication with the mutual authentication unit 403 of the memory card 400 and shares the same shared key with the memory card 400.

Figure 15:
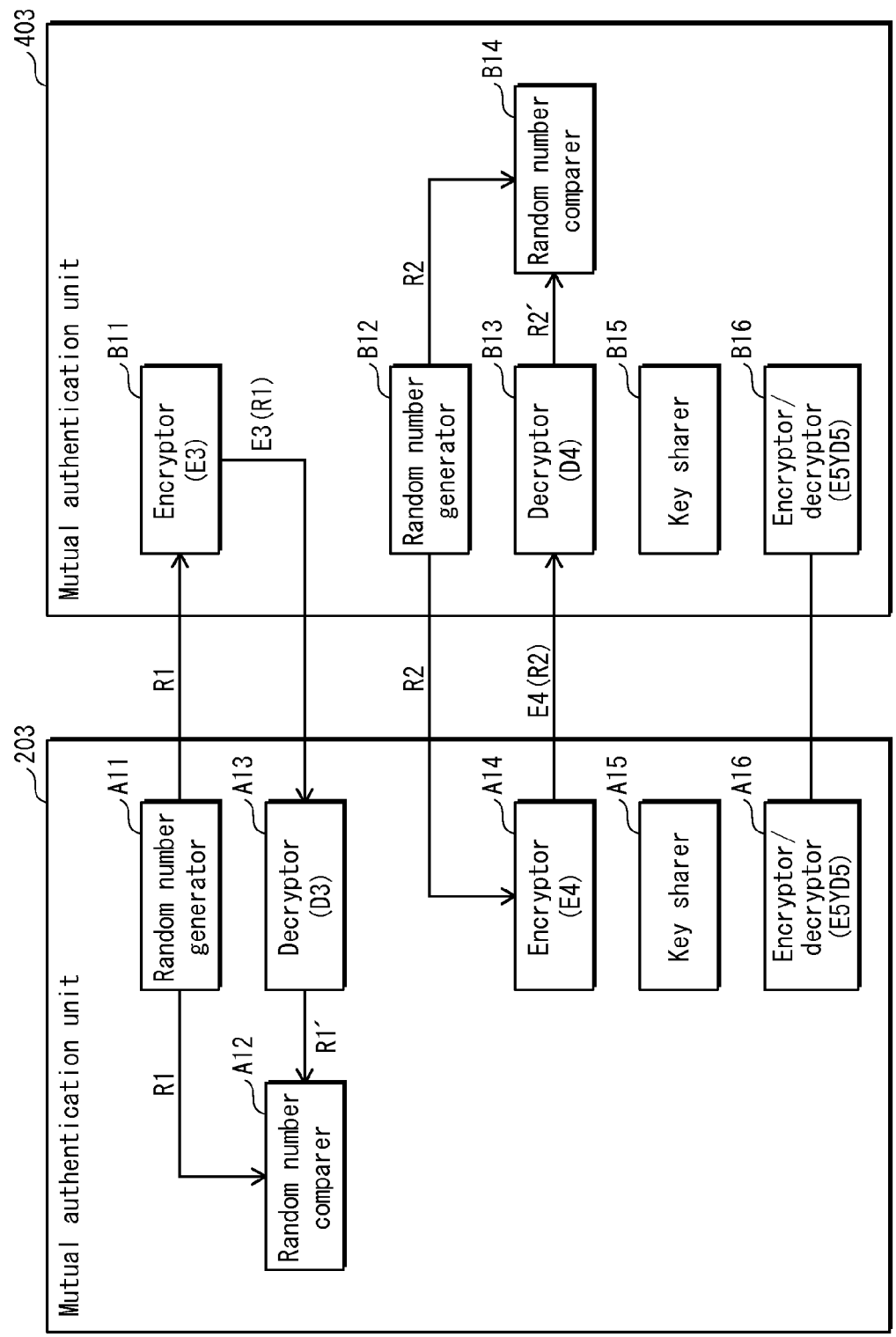
FIG. 15 is a block diagram showing the structure of a mutual authentication unit 203 of the verification server device 200 and the structure of a mutual authentication unit 403 of the memory card 400.

As shown in FIG. 15, the mutual authentication unit 203 includes a random number generator A11, a random number comparer A12, a decryptor A13, an encryptor A14, a key sharer A15 and an encryptor/decryptor A16.

The random number generator A10 generates a random number R1. The random number generator A10 subsequently outputs the random number R1 thus generated to the random number comparer A12. The random number generator A10 also transmits the random number R1 thus generated to the mutual authentication unit of the other party in terms of the mutual authentication.

The decryptor A13 receives an encrypted random number E3(Ksc, R1) from the mutual authentication unit of the other party in terms of the mutual authentication. Subsequently, the decryptor A13 decrypts the encrypted random number E3(Ksc, R1) according to a decryption algorithm D3 by using the system key Ksc, and thereby generates a plaintext R1'=D3 (Ksc, E3(Ksc, R1)). The decryptor A13 subsequently outputs the plaintext R1' thus generated to the random number comparer A12.

Here, the decryption algorithm D3 is an algorithm according to a secret key cryptosystem. The decryption algorithm D3 is, for example, an algorithm conforming to the Advanced Encryption Standard (AES). E3(K, A) denotes a ciphertext generated by applying the encryption algorithm E3 to a plaintext A by using a key K. D3(K, B) denotes a plaintext generated by applying a decryption algorithm D3 to a ciphertext B by using a key K.

The random number comparer A12 receives the random number R1 from the random number generator A11, and the plaintext R1' from the decryptor A13. The random number comparer A12 compares the random number R1 with the plaintext R1'. When the random number R1 matches the plaintext R1', the mutual authentication unit 203 determines that the other party is valid. When the random number R1 does not match the plaintext R1', the mutual authentication unit 203 determines that the other party is invalid.

The encryptor A14 receives the random number R2 from the mutual authentication unit of the other party. Upon receiving the random number R2, the encryptor A14 encrypts the random number R2 according to an encryption algorithm E4 by using the system key Ksc, thereby generating an encrypted random number E4(Ksc, R2), and transmits the generated encrypted random number E4(Ksc, R2) to the other party.

Here, the encryption algorithm E4 is an algorithm according to a secret key cryptosystem. The encryption algorithm E4 is, for example, an algorithm conforming to the AES. E4(K, A) denotes an encrypted text generated by applying the encryption algorithm E4 to a plaintext A by using a key K.

When the mutual authentication is successful, the key sharer A15 performs the key sharing, and calculates the shared key k. When the mutual authentication fails, the key sharer A15 does not calculate the shared key k.

When the mutual authentication is successful, the encryptor/decryptor A16 encrypts data by using the shared key k thus calculated, and thereby generates encrypted data. The encrypted data is transmitted to the other party. The encryptor/decryptor A16 receives encrypted data from the other party. Subsequently, the encryptor/decryptor A16 decrypts the encrypted data by using the shared key k thus calculated, and generates the original data. The above-mentioned secure means is realized by these procedures.

(8) Associated Data Generation Unit 208

The associated data generation unit 208 receives the acquired unique identifier Y or the message indicating "no unique identifier" from the unique identifier acquisition unit 216.

Subsequently, the associated data generation unit 208 determines whether the unique identifier Y has been received. When the unique identifier Y has been received, the associated data generation unit 208 generates a random number R. The associated data generation unit 208 writes the generated random number R and the received unique identifier Y, which serve as the time-varying parameter and the unique identifier, into the account management table 261 in association with the received user identifier and password.

Subsequently, the associated data generation unit 208 calculates a variable K according to the following formula by using the unique identifier Y and the random number R.

Variable K=Unique Identifier Y XOR Random Number R

Here, XOR is an operator denoting exclusive OR.

Subsequently, as shown in FIG. 5, the associated data generation unit 208 generates associated data 251 composed of a variable number region 252 and a signature region 253. At this stage, the variable number region 252 and the signature region 253 are in their initial states. That is, no data is stored in these regions.

Subsequently, the associated data generation unit 208 calculates a variable K(254) and writes the variable K(254) into the variable number region 252.

Subsequently, the associated data generation unit 208 outputs the variable K(254) to the signature generation unit 214, and instructs the signature generation unit 214 to generate signature data corresponding to the variable K(254). Subsequently, the associated data generation unit 208 receives signature data 255 corresponding to the variable K(254) from the signature generation unit 214. The signature data 255 is obtained by applying the digital signature Sign to the variable K(254) by using the private key 241 assigned to the verification server device 200. Upon receiving the signature data 255 from the signature generation unit 214, the associated data generation unit 208 writes the signature data 255 into the signature region 253 of the associated data 251.

As shown in FIG. 5, the associated data 251 is composed of the variable number region 252 and the signature region 253. The variable number region 252 stores the variable K(254), and the signature region 253 stores the signature data 255.

Subsequently, the associated data generation unit 208 transmits the associated data 251 and the random number R to the terminal device 300 via the communication unit 202 and the network 20 by using a secure means.

When the unique identifier Y has not been received, the associated data generation unit 208 does not perform the generation of the random number R, the calculation of the variable K, the generation of the associated data, the provision of the instruction to generate the signature data, or the transmission of the associated data and the random number R.

When the unique identifier Y and the instruction to operate the appliance have been received, the associated data generation unit 208 overwrites the associated data 335a, which is stored in the second data region 335 of the control program 331 stored and installed in the program storage unit 207, with the associated data 251 containing the variable K(254) and the signature data 255.

Upon completing the overwriting with the associated data 251, the associated data generation unit 208 outputs a completion notification to the authenticity evaluation unit 210 and the verification unit 218. The completion notification indicating that the overwriting with the associated data 251 has been completed.

When the unique identifier has not been received, the associated data generation unit 208 does not overwrite the second data region 335 of the control program 331 with the associated data.

(9) Signature Generation Unit 214

The signature generation unit 214 receives an instruction to generate signature data from the program creation unit 206 and the associated data generation unit 208.

When receiving the instruction to generate signature data from the program creation unit 206, the signature generation unit 214 reads the private key 241 assigned to the verification server device 200 from the key storage unit 204. Subsequently, the signature generation unit 214 reads the control program from the program storage unit 207. As shown in FIG. 4, the control program thus read includes the execution region 232 and the first data region 233. At this stage, however, the control program thus read does not include the signature region 234 shown in FIG. 4.

Subsequently, the signature generation unit 214 generates the signature data 234a by applying the digital signature Sign to the read control program, by using the read private key 241.

Signature Data 234a=Sign(Private Key 241, Control Program)

Subsequently, the signature generation unit 214 adds the signature data 234a thus generated to the control program, and overwrites the control program stored in the program storage unit 207 with the control program 231 to which the signature data has been added.

When receiving the instruction to generate signature data from the associated data generation unit 208, the signature generation unit 214 furthermore receives the variable K(254) from the associated data generation unit 208. Subsequently, the signature generation unit 214 reads the private key 241 assigned to the verification server device 200 from the key storage unit 204. Subsequently, the signature generation unit 214 generates the signature data 255 by applying the digital signature Sign to the variable K(254) by using the private key 241.

Signature Data 255=Sign(Private Key 241, Variable K(254))

Subsequently, the signature generation unit 214 outputs the signature data 255 to the associated data generation unit 208.

(10) Authenticity Evaluation Unit 210

The authenticity evaluation unit 210 receives the acquired unique identifier Y or the message indicating "no unique identifier" from the unique identifier acquisition unit 216. The authenticity evaluation unit 210 also receives the random number R from the associated data generation unit 208. The authenticity evaluation unit 210 also receives the completion notification, which indicates that the overwriting of the control program with the associated data 251 has been completed, from the associated data generation unit 208.

Upon receiving the completion notification and the unique identifier Y, the authenticity evaluation unit 210 reads the control program 331 after the overwriting with the associated data, from the program storage unit 207. Subsequently, the authenticity evaluation unit 210 calculates a hash value H by applying a hash operation Hash to the instruction and data stored in the execution region 332, the first data region 333, the signature region 334 and the second data region 335 included in the read control program 331.

Hash Value $H$=Hash(Instruction and Data stored in Execution Region 332, First Data Region 333, Signature Region 334 and Second Data Region 335 included in Control Program 331)

The third data region 336 is excluded from the hash operation Hash because the data stored in the third data region 336 varies depending on the execution status of the control program 331.

The hash operation Hash is performed according to, for example, Secure Hash Algorithm 1 (SHA-1). Alternatively, the hash operation Hash may be performed according to Secure Hash Algorithm 2 (SHA-2), Secure Hash Algorithm 256-bit (SHA-256), or the like.

Note that the hash operation Hash applied here should be the same as the hash operation Hash applied by a unique identifier acquisition processing unit 902.

Subsequently, the authenticity evaluation unit 210 calculates the evaluation value S by using the unique identifier Y, the hash value H and the random number R.

$S=Y$ XOR Oneway$(H, R)$

Here, one-way operation Oneway(A, B) denotes the value obtained by applying a one-way operation to data A and data B. For example, the one-way operation Oneway(A, B) is a hash value obtained by applying a keyed hash operation to the data A, using the data B as the key. The one-way operation Oneway(A, B) may be a hash value obtained by applying a hash operation to the concatenated data obtained by joining the data A and the data B in this order. Alternatively, the one-way operation Oneway(A, B) may be a hash value obtained by generating a ciphertext by using the data B as the key and an encryption algorithm according to the AES as the secret key cryptosystem, and applying the hash operation SHA-1 to the generated ciphertext.

Note that the one-way operation Oneway applied here should be the same as the one-way operation Oneway applied by the unique identifier acquisition processing unit 902.

The authenticity evaluation unit 210 also receives the evaluation value S' from the terminal device 300 via the network 20 and the communication unit 202.

Subsequently, the authenticity evaluation unit 210 determines whether the evaluation value S thus calculated matches the evaluation value S' thus received. When the evaluation value S matches the evaluation value S', remote control of the appliance and its related operations should be permitted. When the evaluation value S does not match the evaluation value S', remote control of the appliance and its related operations should be prohibited.

When the evaluation value S does not match the evaluation value S', the authenticity evaluation unit 210 generates a message indicating that the remote control of the appliance and its related operations should be prohibited. Subsequently, the authenticity evaluation unit 210 transmits the message thus generated to the terminal device 300 via the communication unit 202 and the network 20.

When the evaluation value S matches the evaluation value S', the authenticity evaluation unit 210 outputs permission information to the appliance control unit 213. The permission information indicates that the remote control of the appliance and its related operations should be permitted. Only in this case, the remote control of the appliance and its related operations will be performed. When the evaluation value S matches the evaluation value S', the authenticity evaluation unit 210 outputs prohibition information to the appliance control unit 213. The prohibition information indicates that the remote control of the appliance and its related operations should be prohibited. In this case, the remote control of the appliance and its related operations will not be performed.

When the unique identifier Y has not been received, the authenticity evaluation unit 210 does not perform the calculation of the hash value H, the calculation of the evaluation value S, or the comparison between the evaluation value S and the evaluation value S'.

(11) Verification Unit 218

In the same manner as with the authenticity evaluation unit 210, the verification unit 218 receives the acquired unique identifier Y or the message indicating "no unique identifier" from the unique identifier acquisition unit 216. The verification unit 218 also receives the random number R from the associated data generation unit 208.

Furthermore, when the terminal device 300 is executing the control program 331, the verification unit 218 receives verification data S' i at predetermined intervals (e.g. one minute) from the terminal device 300 via the communication unit 202.

Upon receiving the verification data S' i, the verification unit 218 reads the control program 331 after the overwriting with the associated data from the program storage unit 207. Subsequently, the verification unit 218 generates data Di, and obtains a hash value Hi by applying the hash operation Hash to the data Di. The data Di is the combination of: one data portion Pi (i being from 0 to N-1) of N portions (N being a predetermined integer equal to or greater than 1, e.g. N=10) divided from the data composed of the instruction and data stored in the execution region 332, the first data region 333, the signature region 334 and the second data region 335 of the read control program 331; and data T indicating the time obtained by adding an elapsed period (TS) to time (TA) at which the previous verification data was received. Note that the number of the data portions should be the same as the number of the data portions related to a verification data generation unit 911, and the data portion used for the data generation should be the same as the data portion used for the generation of the verification data by the verification data generation unit 911. Also note that the hash operation Hash used here should be the same as the hash operation Hash used by the verification data generation unit 911.

Subsequently, the verification unit 218 calculates comparison data Si by using the unique identifier Y, the hash value Hi and the random number R. The comparison data Si is also calculated by using the one-way operation Oneway. Note that the one-way operation Oneway applied here should be the same as the one-way operation Oneway applied by the verification data generation unit 911.

The verification unit 218 also receives the verification data S' i from the terminal device 300 via the network 20 and the communication unit 202.

Subsequently, the verification unit 218 determines whether the comparison data Si thus calculated matches the verification data S' i thus received. When the comparison data Si matches the verification data S' i, the remote control of the appliance and its related operations should be permitted. When the comparison data Si does not match the verification data S' i, the remote control of the appliance and its related operations should be prohibited.

When the evaluation value S does not match the evaluation value S', the authenticity evaluation unit 218 generates a message indicating that the remote control of the appliance and the related operations will be prohibited. Subsequently, the authenticity evaluation unit 210 transmits the message thus generated to the terminal device 300 via the communication unit 202 and the network 20.

When the comparison data Si matches the verification data S' i, the authenticity evaluation unit 210 outputs permission information to the appliance control unit 213. The permission information indicates that the remote control of the appliance and its related operations should be permitted. Only in this case, the remote control of the appliance and its related operations will be performed. When the comparison data Si does not match the verification data S' i, the authenticity evaluation unit 210 outputs prohibition information to the appliance control unit 213. The prohibition information indicates that the remote control of the appliance and its related operations should be prohibited. In this case, the remote control of the appliance and its related operations will not be performed.

When the unique identifier Y has not been received, the verification unit 218 does not perform the calculation of the hash value Hi, the calculation of the comparison data Si, or the comparison between the comparison data Si and the verification data S' i.

(12) Appliance Information Management Unit 217

The appliance information management unit 217 receives an instruction to change the control rule from the terminal device 300 via the network 20 and the communication unit 202. Subsequently, the appliance information management unit 217 changes the control rule management table 281 stored in the appliance information storage unit 212 according to the received control change instruction.

(13) Appliance Control Unit 213

The appliance control unit 213 receives an operational instruction from the terminal device 300 via the network 20 and the communication unit 202. Examples of the operational instruction include: a request for acquisition of information related to the appliance 500; an instruction related to the remote control of the appliance 500, an instruction to change the appliance control rule; and so on.

The appliance control unit 213 determines whether the received operational instruction is a request for acquisition of information related to the appliance 500, an instruction related to the remote control of the appliance 500, an instruction to change the appliance control rule, or another different instruction.

When the operational instruction is the request for acquisition of information related to the appliance 500, the appliance control unit 213 performs processing for acquiring information related to the appliance 500. When the operational instruction is the instruction related to the remote control of the appliance 500, the appliance control unit 213 performs processing related to the remote control of the appliance 500. When the operational instruction is the instruction to change the appliance control rule, the appliance control unit 213 changes the appliance control rule. When the operational instruction is a different instruction, the appliance control unit 213 performs different processing.

(Acquisition of Information Related to Appliance 500)

The appliance control unit 213 extracts appliance information from the request for information related to the appliance 500 received from the terminal device 300. Subsequently, the appliance control unit 213 reads the conditions corresponding to the extracted appliance information from the condition table 271.

Subsequently, the appliance control unit 213 determines whether the current state of the verification server device 200 satisfies the conditions read from the condition table 271.

Here, the current state of the verification server device 200 is specifically represented by whether the user of the terminal device 300 is logging in the verification server device 200, and whether the unique identifier has been acquired from the memory card 400 attached to the terminal device 300.

For example, in the case where the user is not logging in the verification server device 200 and the unique identifier has not been acquired, if the conditions are "login is unnecessary, unique identifier is necessary" or "login is necessary, unique identifier is necessary", the current state of the verification server device 200 does not satisfy the conditions.

In the case where the user is logging in the verification server device 200 and the unique identifier has not been acquired, if the conditions are "login is unnecessary, unique identifier is necessary" or "login is necessary, unique identifier is necessary", the current state of the verification server device 200 does not satisfy the conditions. If the conditions are "logging is necessary, unique identifier is unnecessary", the current state of the verification server device 200 satisfies the conditions.

In the case where the user is logging in the verification server device 200 and the unique identifier has been acquired, if the conditions are "login is unnecessary, unique identifier is necessary" or "login is necessary, unique identifier is necessary", the current state of the verification server device 200 satisfies the conditions.

When the current state of the verification server device 200 does not satisfy the read conditions, the appliance control unit 213 generates a message indicating that appliance control unit 213 has failed to acquire the appliance state information. Subsequently, the authenticity evaluation unit 210 transmits the message thus generated to the terminal device 300 via the communication unit 202 and the network 20.

When the current state of the verification server device 200 satisfies the read conditions, the appliance control unit 213 outputs the request for acquisition of the appliance state information to the appliance 500 via the communication unit 202 and the network 20.

The appliance control unit 213 of the verification server device 200 receives the appliance state information from the appliance 500 via the network 20 and the communication unit 202. Subsequently, the appliance control unit 213 generates a message including the appliance state information thus received. Subsequently, the appliance control unit 213 transmits the message thus generated to the terminal device 300 via the communication unit 202 and the network 20.

(Processing Related to Remote Control of Appliance 500)

The appliance control unit 213 repeats the following processing procedures (a) through (d) for all the control rule information sets contained in the control rule management table 281.

(a) The appliance control unit 213 reads one control rule information set from the control rule management table 281.

(b) Subsequently, the appliance control unit 213 determines whether the current state of the verification server device 200 satisfies the conditions contained in the control rule information set thus read.

Here, as stated above in the explanation of the acquisition of the information related to the appliance 500, the state of the verification server device 200 is specifically represented by whether the user of the terminal device 300 is logging in the verification server device 200, and whether the unique identifier has been acquired from the memory card 400 attached to the terminal device 300.

The method for the determination is as described above.

For example, in the case where the user is not logging in the verification server device 200 and the unique identifier has not been acquired, if the conditions are "login is unnecessary, unique identifier is necessary" or "logging is necessary, unique identifier is necessary", the state of the verification server device 200 does not satisfy the conditions.

In the case where the user is logging in the verification server device 200 and the unique identifier has been acquired, if the conditions are "login is necessary, unique identifier is necessary", the current state of the verification server device 200 satisfies the conditions.

(c) When the current state of the verification server device 200 does not satisfy the read conditions, the appliance control unit 213 extracts the operation information from the read control rule information set. Subsequently, the appliance control unit 213 generates a message indicating that it is impossible to acquire the extracted operation information. Subsequently, the appliance control unit 213 transmits the message thus generated to the terminal device 300 via the communication unit 202 and the network 20.

(d) When the current state of the verification server device 200 satisfies the read conditions, the appliance control unit 213 extracts the operation information and the item from the read control rule information set. Subsequently, the appliance control unit 213 generates a message indicating the operation information and the item thus extracted. Subsequently, the appliance control unit 213 outputs the message thus generated to the appliance 500 via the communication unit 202 and the network 20.

The appliance control unit 213 transmits the operational instruction received from the terminal device 300 to the appliance 500 via the communication unit 202 and the network 20.

(Processing for Appliance Control Rule Change)

The appliance control unit 213 determines whether the user of the terminal device 300 is successfully logging in. The appliance control unit 213 also determines whether the unique identifier has been acquired.

When the user is not successfully logging in, the appliance control unit 213 generates a message indicating that the user is not successfully logging in. Subsequently, the appliance control unit 213 transmits the message thus generated to the terminal device 300 via the communication unit 202 and the network 20.

When the unique identifier has not been acquired, the appliance control unit 213 generates a message indicating that the unique identifier has not been acquired. Subsequently, the appliance control unit 213 transmits the message thus generated to the terminal device 300 via the communication unit 202 and the network 20.

When the user is successfully logging in and the unique identifier has been acquired, the appliance control unit 213 reads the control rule management table 281 from the appliance information storage unit 212. Subsequently, the appliance control unit 213 transmits the control rule management table 281 thus read to the terminal device 300 via the communication unit 202 and the network 20.

<1.4 Terminal Device 300>

Figure 9:
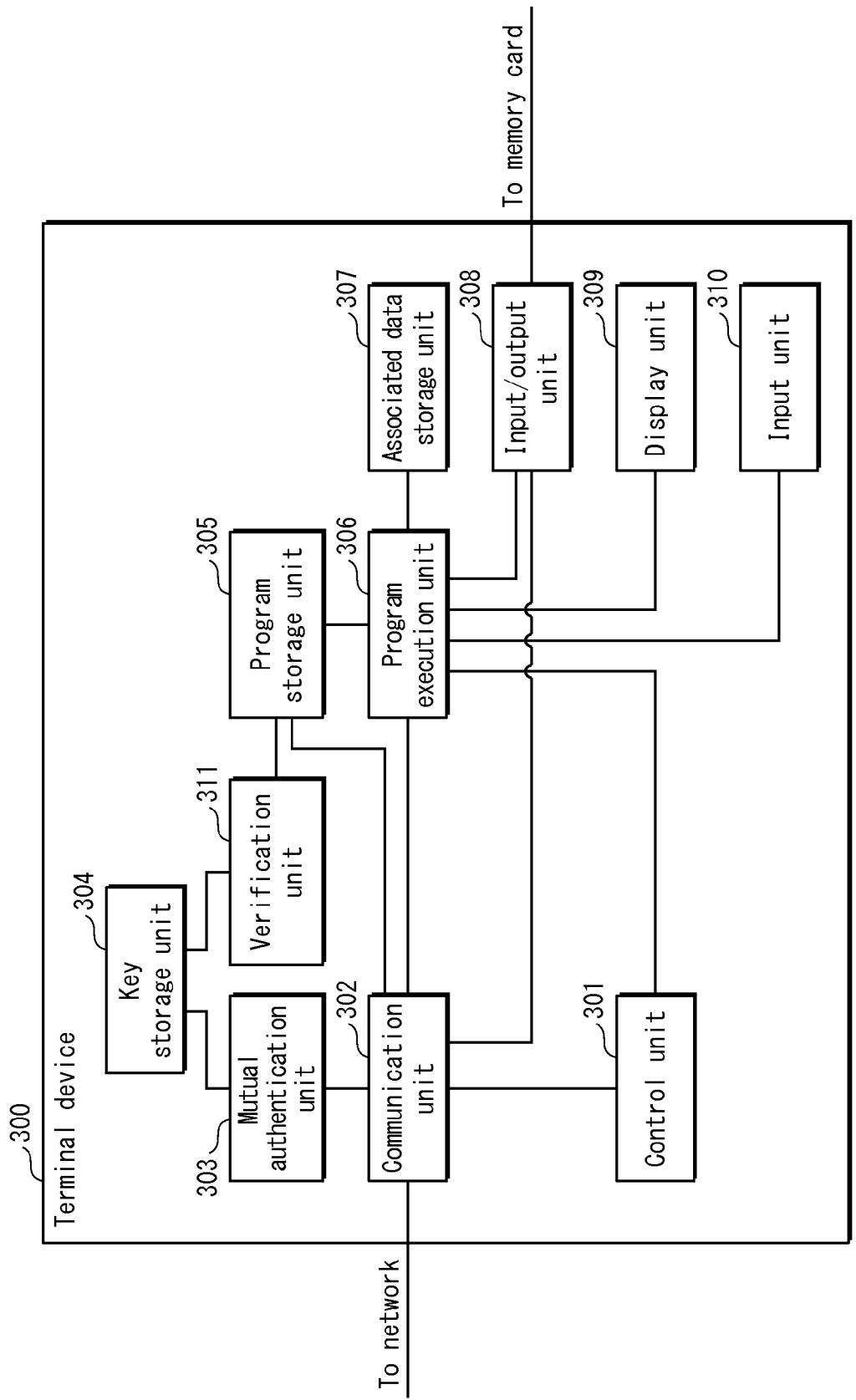
FIG. 9 is a block diagram showing the structure of a terminal device 300.

As shown in FIG. 9, the terminal device 300 includes a control unit 301, a communication unit 302, a mutual authentication unit 303, a key storage unit 304, a program storage unit 305, a program execution unit 306, an associated data storage unit 307, an input/output unit 308, a display unit 309, an input unit 310 and a verification unit 311.

The terminal device 300 is specifically realized as a computer system including a microprocessor, ROM, RAM, a hard disk device, a display device, an input device, and so on. The RAM or the hard disk device stores a computer program. The microprocessor operates according to the computer program and thereby realizes the functions of the terminal device 300.

(1) Key Storage Unit 304, Program Storage Unit 305, and Associated Data Storage Unit 307

(Key Storage Unit 304)

The key storage unit 304 is specifically realized as a hard disk device, for example. The key storage unit 304 stores therein a public key of the verification server device 200 for example. The key storage unit 204 also stores the system key Ksc in advance.

(Program Storage Unit 305)

The program storage unit 305 is specifically realized as a hard disk device, for example. The program storage unit 305 has regions for storing the control program 231 transmitted from the distribution server device 100 and the control program 331 installed in the terminal device 300.

The control program 231 has a data structure shown in FIG. 4. The control program 331 has a data structure shown in FIG. 10.

(Associated Data Storage Unit 307)

The associated data storage unit 307 is specifically realized as a hard disk device, for example. The associated data storage unit 307 has regions for storing the associated data 251 and the random number R shown in FIG. 5.

(2) Communication Unit 302

The communication unit 302 exchanges information with the distribution server device 100 and the verification server device 200 via the network 20.

The communication unit 302 specifically transmits, under the control of the control unit 301, the request for a control program, the connection request for operating the appliance, the login necessity information, the operational instruction, and the evaluation value S' to the distribution server device 100 via the network 20.

The communication unit 302 also transmits, under the control of the control unit 301, the user identifier and the password to the distribution server device 100 via the network 20 by using a secure means.

The communication unit 302 also receives various messages from the verification server device 200 via the network 20. Subsequently, the communication unit 302 outputs the received message to the display unit 309.

The communication unit 302 also receives the control program, the associated data and the random number R from the distribution server device 100 via the network 20 by using a secure means. Subsequently, the communication unit 302 writes the received control program into the program storage unit 305. The communication unit 302 also writes the received associated data and the random number R into the associated data storage unit 307.

The communication unit 302 also receives information from the verification server device 200 via the network 20, and outputs the received information to the memory card 400 via the input/output unit 308. The communication unit 302 also receives information from the memory card 400 via the input/output unit 308, and transmits the received information to the verification server device 200 via the network 20.

(3) Mutual Authentication Unit 303

The mutual authentication unit 303 has the same structure as the mutual authentication unit 203 of the verification server device 200.

When receiving a request for acquisition of the control program, the mutual authentication unit 303 performs mutual authentication and key sharing with the mutual authentication unit 103 of the distribution server device 100.

When transmitting the connection request for operating the appliance, the mutual authentication unit 303 performs mutual authentication and key sharing with the mutual authentication unit 203 of the verification server device 200.

Furthermore, when acquiring the unique identifier, the mutual authentication unit 303 performs mutual authentication and key sharing with the mutual authentication unit 403 of the memory card 400.

(4) Verification Unit 311

Upon receiving a request for starting up the control program 331, the verification unit 311 reads the public key assigned to the verification server device 200 from the key storage unit 304. Subsequently, the verification unit 311 applies digital signature verification Vrfy to the signature data 334a stored in the signature region 334 of the control program 331 installed in the program storage unit 305, the execution region 332, and the first data region 333 by using the public key thus read.

When the digital signature verification Vrfy fails, the verification unit 311 generates a message indicating that the verification has failed, and outputs the generated message to the display unit 309. Accordingly, the terminal device 300 terminates the processing.

When the digital signature verification Vrfy is successful, the terminal device 300 continues its processing.

The verification unit 311 outputs the verification result, which indicates a failure or a success of the verification, to the program execution unit 306.

(5) Program Execution Unit 306

The program execution unit 306 installs the control program 231 into the program storage unit 305. As a result, the control program 331 is stored in the program storage unit 305 as shown in FIG. 10. At this point, the second data region 335 and the third data region 336 store no associated data and data.

The program execution unit 306 receives the verification result, which indicates a failure or a success of the verification, from the verification unit 311. When the received verification result indicates a failure of the verification, the program execution unit 306 terminates the subsequent processing of the terminal device 300.

When the received verification result indicates a success of the verification, the program execution unit 306 puts the control program 331 into the execution state.

Figure 11:
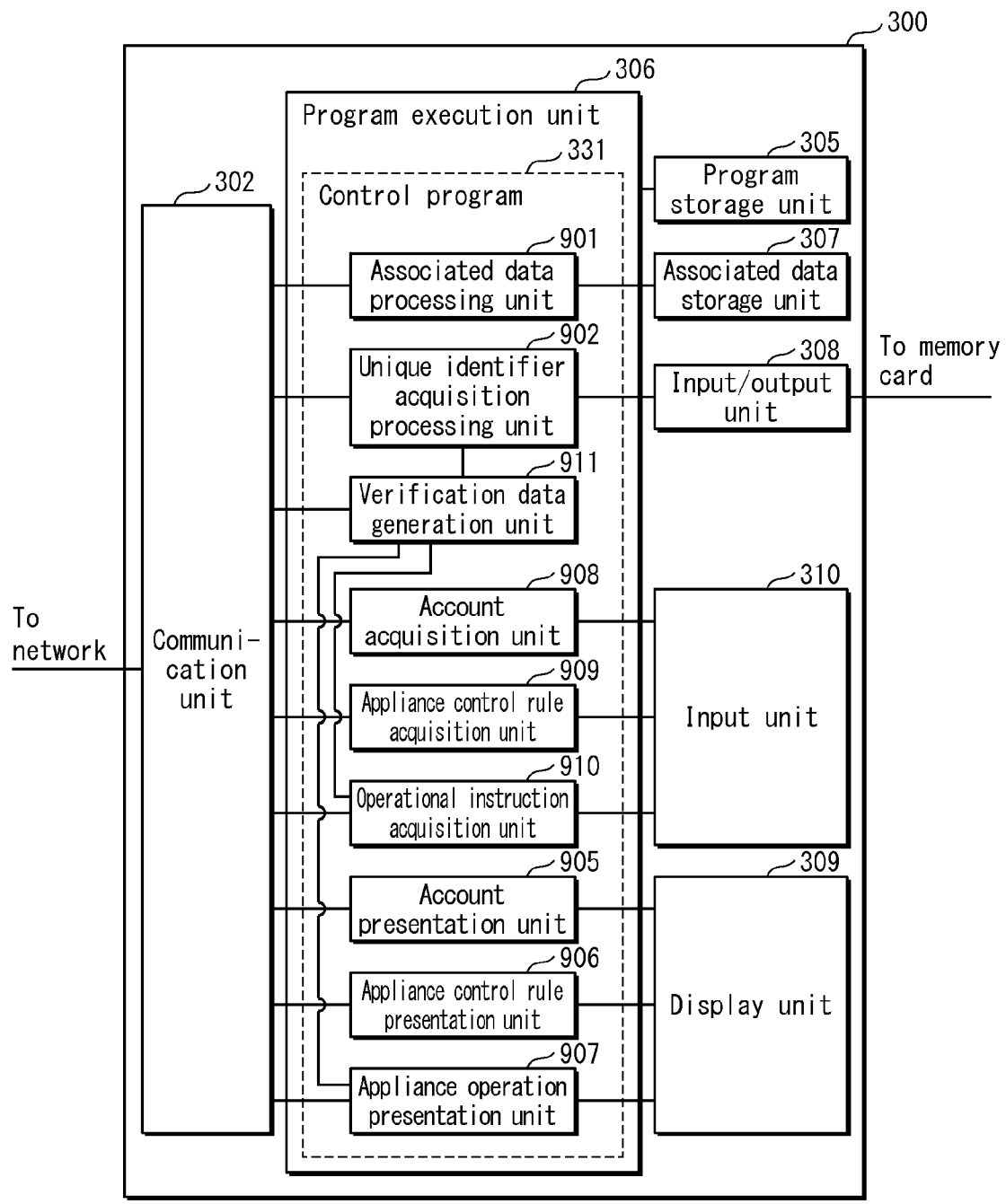
FIG. 11 shows a functional structure of the control program 331 that runs in the terminal device 300.

The program execution unit 306 executes the control program 331 and thereby realizes the functions of an associated data processing unit 901, a unique identifier acquisition processing unit 902, an account presentation unit 905, an appliance control rule presentation unit 906, an appliance operation presentation unit 907, an account acquisition unit 908, an appliance control rule acquisition unit 909, an operational instruction acquisition unit 910, and a verification data generation unit 911 as shown in FIG. 11.

(Associated Data Processing Unit 901)

The associated data processing unit 901 determines whether the associated data is stored in the associated data storage unit 307. When the associated data is stored in the associated data storage unit 307, the associated data processing unit 901 overwrites the associated data 335a of the second data region in the control program 331 with the associated data stored in the associated data storage unit 307. When the associated data is not stored in the associated data storage unit 307, the associated data processing unit 901 does not perform the overwriting with the associated data.

The associated data processing unit 901 receives the associated data and the random number R from the verification server device 200 via the network 20 and the communication unit 302 by using a secure means.

Subsequently, the associated data processing unit 901 determines whether the associated data and the random number R have been received.

When the associated data and the random number R have been received, the associated data processing unit 901 writes the received associated data into the associated data storage unit 307. Subsequently, the associated data processing unit 901 writes the received random number R into the associated data storage unit 307.

When the associated data and the random number R have not been received, the associated data processing unit 901 does not perform the writing of the associated data and the random number R.

(Unique Identifier Acquisition Processing Unit 902)

When receiving the operational instruction from the user, the unique identifier acquisition processing unit 902 outputs a request for the unique identifier to the memory card 400 via the input/output unit 308. Immediately after outputting the request for the unique identifier, the unique identifier acquisition processing unit 902 provisionally sets "0" to the unique identifier Y' as a variable.

The unique identifier acquisition processing unit 902 determines whether the unique identifier has been received from the memory card 400. Here, the unique identifier to be received is denoted as unique identifier Y'. When receiving the unique identifier Y', the unique identifier acquisition processing unit 902 calculates the hash value H' by applying the hash operation Hash to the memory and the data stored in the execution region 332, the first data region 333, the signature region 334 and the second data region 335 of the control program 331 stored in the program storage unit 305.

Hash Value H'=Hash(Memory and Data Stored in Execution Region 332, First Data Region 333, Signature Region 334 and Second Data Region 335 of Control Program 331 stored in Program Storage Unit 305)

The third data region 336 is excluded from the hash operation Hash because the data stored in the third data region 336 varies depending on the execution status of the control program 331.

Here, examples of the hash operation Hash include SHA-1. The hash operation Hash may be SHA-2, SHA-256, or the like.

Note that the hash operation Hash applied here should be the same as the hash operation Hash applied by the authenticity evaluation unit 210.

Subsequently, the unique identifier acquisition processing unit 902 calculates the evaluation value S' by using the unique identifier Y', the hash value H' and the random number R.

$$S' = Y' \text{ XOR Oneway}(H', R)$$

Here, one-way operation Oneway(A, B) denotes the value obtained by applying a one-way operation to data A and data B. For example, the one-way operation Oneway(A, B) is a hash value obtained by applying a keyed hash operation to the data A, using the data B as the key. The one-way operation Oneway(A, B) may be a hash value obtained by applying a hash operation to the concatenated data obtained by joining the data A and the data B in this order. Alternatively, the one-way operation Oneway(A, B) may be a hash value obtained by generating a ciphertext by using the data B as the key and an encryption algorithm according to the AES as the secret key cryptosystem, and applying the hash operation SHA-1 to the generated ciphertext.

Note that the one-way operation Oneway applied here should be the same as the one-way operation Oneway applied by the authenticity evaluation unit 210.

Subsequently, the unique identifier acquisition processing unit 902 transmits the evaluation value S' to the verification server device 200 via the communication unit 302 and the network 20.

(Account Presentation Unit 905)

The account presentation unit 905 outputs the user identifier and the password input by the user, to the display unit 309, and causes the display unit 309 to display them.

(Appliance Control Rule Presentation Unit 906)
(Appliance Control Rule Change)

The appliance control rule presentation unit 906 receives the control rule management table from the verification server device 200 via the network 20 and the communication unit 302. Subsequently, the appliance control rule presentation unit 906 generates a control rule change screen 361 by using the control rule management table thus received.

Figure 13:
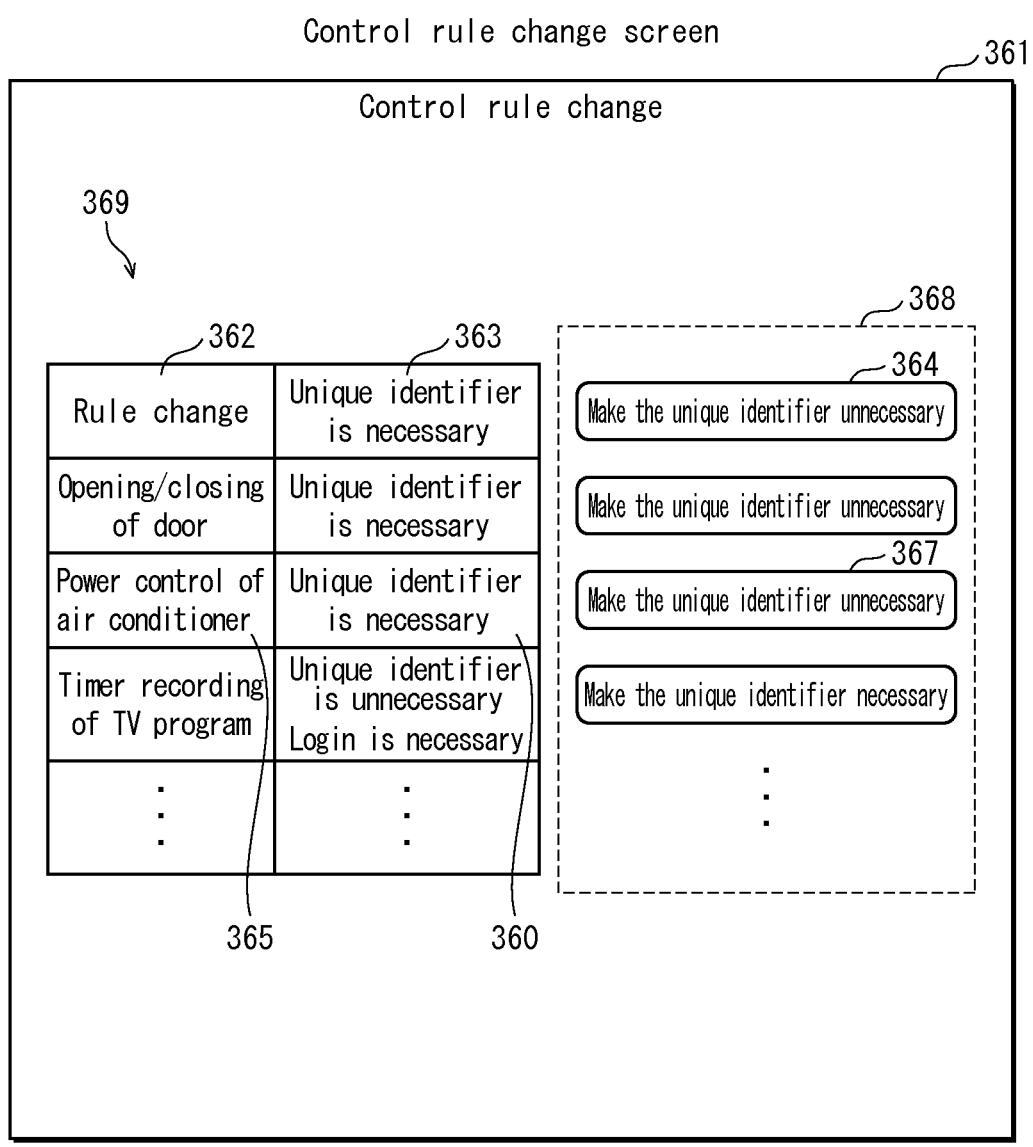
FIG. 13 shows a control rule change screen 361 displayed on the terminal device 300.

FIG. 13 shows an example of the control rule change screen 361. As shown in the drawing, the control rule change screen 361 contains a plurality of fields. The fields respectively correspond to the control rule information sets of the control rule management table. The fields include combinations of a display field and a button field. The display field displays the operation information and the conditions. The button field displays the information about the changing of the conditions.

The appliance control rule presentation unit 906 generates the fields of the control rule change screen 361 for each of the control rule information sets contained in the control rule management table. Specifically, the appliance control rule presentation unit 906 generates the display field from the operation information and the conditions contained in the control rule information set. That is, the contents of the display field are the operation information and the conditions. The appliance control rule presentation unit 906 generates the button field from the conditions contained in the control rule information set. That is, the appliance control rule presentation unit 906 generates candidate conditions for the condition changing, from conditions not contained in the control rule information set, and displays the generated candidate conditions in the button field.

The control rule change screen 361 contains fields 371 and 372, for example.

The display field contained in the field 371 displays operation information 362 "Rule change" and conditions 363 "unique identifier is necessary", and the button field contained in the field 371 displays a condition change 364 "Make the unique identifier unnecessary".

The display field contained in the field 372 displays operation information 365 "Power control of air conditioner" and conditions 366 "Unique identifier is necessary", and the button field contained in the field 372 displays a condition change 367 "Make the unique identifier unnecessary".

As described above, each field shows the restriction for the corresponding item. The restriction determines whether login is required or not and whether the unique identifier is required or not. The button field displays candidate conditions for changing the current restriction. The user can change the current restriction by pressing the button field.

(Appliance Operation Presentation Unit 907)
<Processing for Appliance Information Acquisition>

The appliance operation presentation unit 907 receives the message indicating that it is impossible to acquire the appliance state information, from the verification server device 200 via the network 20 and the communication unit 302. The appliance state information shows the state of the appliance. Subsequently, the appliance operation presentation unit 907 outputs the received message to the display unit 309.

The appliance operation presentation unit 907 receives the message containing the appliance state information, from the verification server device 200 via the network 20 and the communication unit 302. Subsequently, the appliance operation presentation unit 907 outputs the received message to the display unit 309.

<Processing Related to Remote Control of Appliance 500>

The appliance operation presentation unit 907 receives the message that indicates that it is impossible to acquire the appliance state information and that contains the operation information and the item which have been acquired, from the verification server device 200 via the network 20 and the communication unit 302. Subsequently, the appliance operation presentation unit 907 generates an appliance operation menu by using, from among the received messages, the message containing the operation information and the item.

Figure 12:
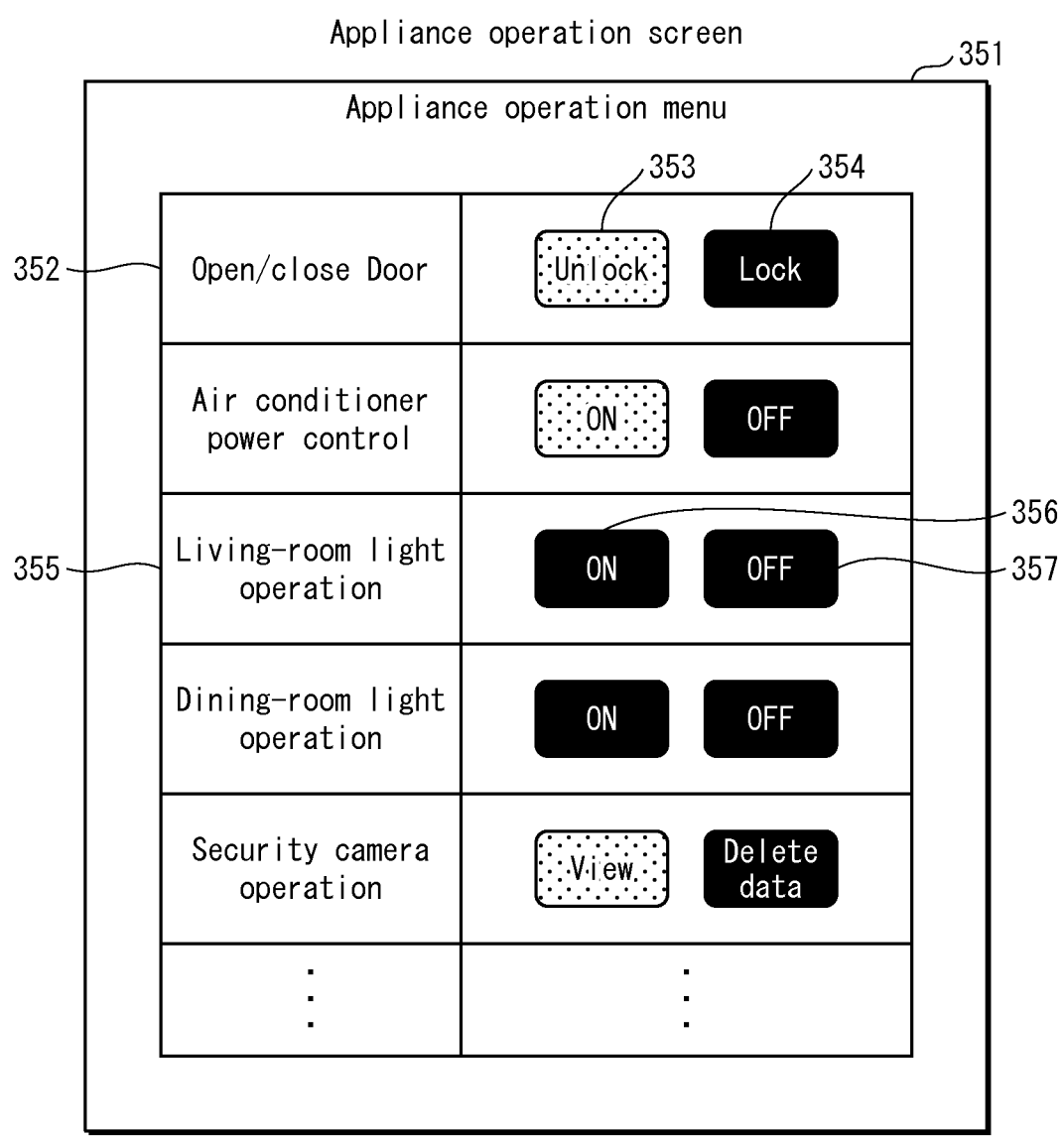
FIG. 12 shows an appliance operation screen 351 displayed on the terminal device 300.

FIG. 12 shows an appliance operation screen 351 as an example appliance operation menu.

The appliance operation screen 351 contains a plurality of fields. Each field corresponds to an operation of an appliance, and also corresponds to a single message. Each field contains operation information and an operation button.

The appliance operation presentation unit 907 generates a single field corresponding to a received single message. The operation information contained in the message is assigned to the operation information of the field, and the item contained in the message is assigned to the operation button.

The appliance operation screen 351 shown in FIG. 12 displays the operation information and the operation button in correspondence with each appliance. The button field displays the candidate conditions for changing the current restriction. The user can change the current restriction by pressing the operation button.

The appliance operation screen 351 contains fields 358 and 359, for example. The field 358 contains operation information 352 "Open/close door", and an operation button 353 "Unlock" and an operation button 354 "Lock" corresponding to the operation information 352. The operation button 353 is displayed in grey color (halftone), showing that the operation button 353 is inactive. The user can not operate the operation button 353. The operation button 354 "Lock" is displayed with increased contrast, showing that the operation button 354 is active. The user can operate the operation button 354. Instead of the colors of the operation buttons, sizes or shapes of the operation buttons may be changed in order to show whether the buttons are active or inactive.

The field 359 contains operation information 355 "Livingroom light operation", and an operation button 356 "ON" and an operation button 357 "OFF" corresponding to the operation information 355. The user can operate the operation button 356 and the operation button 357.

In FIG. 12, the appliance operation screen 351 displays the operation information and the operation button in correspondence with operations of each appliance. However, the appliance operation screen 351 may display the operation information and the operation button in correspondence with the functions of each appliance. For example, when the appliance is a TV receiver, the operation information and the operation button may be displayed for each of the functions such as channel changing and timer recording of a program.

In the present description, the appliance operation screen 351 is generated by the terminal device 300. However, this is not essential. The appliance operation screen 351 may be generated by the verification server device 200 and transmitted to the terminal device 300. The terminal device 300 receives the appliance operation screen 351, and displays the appliance operation screen 351 thus received.

(Account Acquisition Unit 908)

The account acquisition unit 908 receives a request for the user identifier and the password from the distribution server device 100 via the network 20 and the communication unit 302. Upon receiving the user identifier and the password, the account acquisition unit 908 controls the input unit 310 to receive the user identifier and the password.

When a request for starting up the control program is received and the connection request for connecting to the verification server device 200 is transmitted, the account acquisition unit 908 controls the input unit 310 to receive login necessity information indicating whether the login is necessary. Subsequently, the account acquisition unit 908 receives the login necessity information from the input unit 310. Subsequently, the account acquisition unit 908 transmits the login necessity information to the verification server device 200 via the communication unit 302 and the network 20.

The account acquisition unit 908 determines whether the received login necessity information indicates that the login is necessary. When the received login necessity information indicates that the login is necessary, the account acquisition unit 908 controls the input unit 310 to receive the user identifier and the password. When the received login necessity information indicates that the login is unnecessary, the account acquisition unit 908 does not provide the input unit 310 with a request to receive the user identifier and the password.

The account acquisition unit 908 receives the user identifier and the password from the input unit 310. Subsequently, the account acquisition unit 908 transmits the user identifier and the password thus received to the distribution server device 100 via the communication unit 302 and the network 20 by using a secure means.

(Appliance Control Rule Acquisition Unit 909)

The appliance control rule acquisition unit 909 receives an instruction to change the control rule from the input unit 310. Subsequently, the appliance control rule acquisition unit 909 transmits the instruction to change the control rule to the verification server device 200 via the communication unit 302 and the network 20.

(Operational Instruction Acquisition Unit 910)

When receiving an operational instruction that is not an instruction to terminate the processing, the operational instruction acquisition unit 910 transmits the received operational instruction to the verification server device 200 via the communication unit 302 and the network 20.

When receiving an operational instruction to terminate the processing from the input unit 310, the operational instruction acquisition unit 910 performs control for terminating the processing by the terminal device 300.

(Verification Data Generation Unit 911)

The verification data generation unit 911 has a function of repeatedly generating the verification data at predetermined intervals (e.g. 1 minute) during the execution of the control program 331. The verification data generation unit 911 generates the verification data by the following method, for example.

The verification data generation unit 911 acquires the unique identifier Y' from the unique identifier acquisition processing unit 902.

When receiving the unique identifier Y', the verification data generation unit 911 generates N data portions P' i (N being a predetermined integer equal to or greater than 1, and i being from 0 to N-1) divided from the memory and the data in the execution region 332, the first data region 333, the signature region 334 and the second data region 335 of the control program 331 stored in the program storage unit 305. Note that the number of the data portions should be the same as the number of the data portions related to the verification unit 218. The value of N may be stored in, for example, the control programs 231 and 331 in advance. Alternatively, the value of N generated by the verification server device 200 may be added to the associated data 335a or the data 336a, and the control program 331 may read the value from the associated data 335a or the data 336a.

The verification data generation unit 911 generates data T' by adding an elapsed period TE to time TA' at which the previous verification data was transmitted. The verification data generation unit 911 calculates a hash value H'i by applying the hash operation Hash to data D'i obtained by combining one of the data portions P'i and the data T'.

$$H'i = \mathrm{Hash}(D'i)$$

Note that the hash operation Hash used here should be the same as the hash operation Hash used by the verification unit 218.

Subsequently, the verification data generation unit 911 calculates verification data S'i by using the unique identifier Y', the hash value H'i and the random number R.

$$S'i = Y' \text{ XOR } \mathrm{Oneway}(H'i, R)$$

Note that the one-way operation Oneway applied here should be the same as the one-way operation Oneway applied by verification unit 218.

Subsequently, the verification data generation unit 911 transmits the verification data S'i thus generated to the verification server device 200 via the communication unit 302 and the network 20.

(6) Control Unit 301

The control unit 301 controls the communication unit 302, the mutual authentication unit 303, the key storage unit 304, the program storage unit 305, the program execution unit 306, the associated data storage unit 307, the input/output unit 308, the display unit 309, the input unit 310, and the verification unit 311.

The control unit 301 receives various messages from the distribution server device 100 via the network 20 and the communication unit 302. Subsequently, the control unit 301 outputs the received message to the display unit 309.

The control unit 301 outputs to the display unit 309 a message indicating that the user is successfully logging in. The control unit 301 also outputs to the display unit 309 a message indicating that the unique identifier has not been acquired.

(7) Input Unit 310, Display Unit 309 and Input/Output Unit 308

The input unit 310 receives the operational instruction and data from the user of the terminal device 300.

Specifically, the input unit 310 receives an instruction to acquire the control program, the user identifier and the password, the login necessity information, an instruction to start up the control program, a request to acquire the appliance information, an instruction related to the remote control of the appliance, and an instruction to change the control rule. Subsequently, the input unit 310 outputs the operational instruction and the data thus received to the control unit 301. Examples of the instruction related to the remote control of the appliance include an instruction to remotely control the appliance. Specifically, examples of the remote control instruction include an instruction to power on or off the appliance 500a as a TV receiver, an instruction to power on or off the appliance 500b as an air conditioner, an instruction to power on or off the appliance 500c as a living-room light, and so on.

The display unit 309 receives various messages from the control unit 301 or the communication unit 302. Subsequently, the display unit 309 displays the received message. Examples of the message include a message indicating that the user is not logging in, a message indicating that the unique identifier has not been acquired, and so on.

The display unit 309 displays the appliance operation screen 351 shown in FIG. 12 as an appliance operation menu. The display unit 309 also displays the control rule change screen 361 shown in FIG. 13, which is used for changing the control rule.

The input/output unit 308 relays information exchanged between the memory card 400 and the program execution unit 306, between the memory card 400 and the communication unit 302, or between the memory card 400 and the control unit 301.

<1.5 Memory Card 400>

Figure 14:
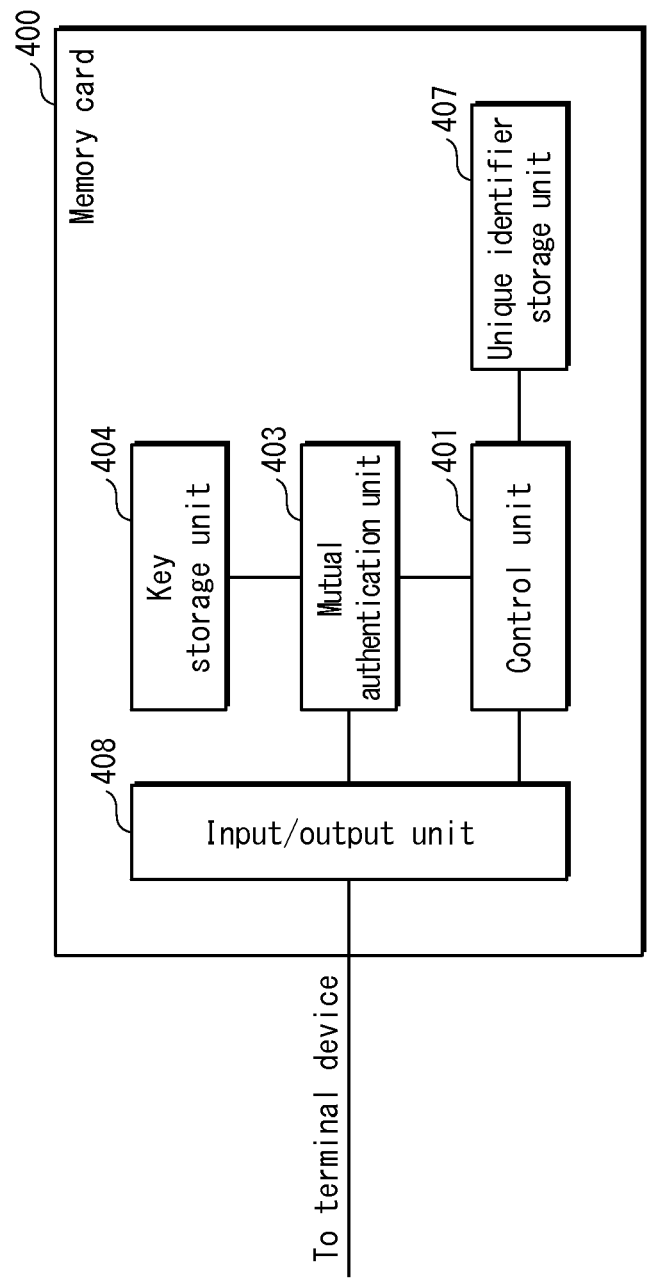
FIG. 14 is a block diagram showing the structure of a memory card 400.

As shown in FIG. 14, the memory card 400 includes a control unit 401, a mutual authentication unit 403, a key storage unit 404, a unique identifier storage unit 407 and an input/output unit 408.

The memory card 400 is specifically realized as a computer system including a microprocessor, ROM, RAM, an input/output device, and so on. The RAM stores the computer program. The microprocessor operates in accordance with the computer program to have the memory card 400 realize the functions.

(1) Unique Identifier Storage Unit 407 and Key Storage Unit 404

The unique identifier storage unit 407 includes a non-volatile semiconductor memory. The unique identifier storage unit 407 stores a unique identifier that is unique to the memory card 400. The unique identifier has a length of 32 bits, for example.

The key storage unit 404 stores the system key Ksc written in advance.

(2) Control Unit 401

The control unit 401 controls the mutual authentication unit 403, the key storage unit 404, the unique identifier storage unit 407 and the input/output unit 408.

The control unit 401 also receives a request for the unique identifier from the verification server device 200 via the network 20, the terminal device 300 and the input/output unit 408. Upon receiving a request for the unique identifier, the control unit 401 attempts to read the unique identifier from the unique identifier storage unit 407. When successfully reading the unique identifier, the control unit 401 transmits the unique identifier thus read to the verification server device 200 via the input/output unit 408, the terminal device 300 and the network 20 by using a secure means. When failing to read the unique identifier, the control unit 401 transmits a message indicating that there is no unique identifier, to the verification server device 200 via the input/output unit 408, the terminal device 300 and the network 20 by using a secure means.

The control unit 401 also receives a request for the unique identifier from the terminal device 300 via the input/output unit 408. Upon receiving a request for the unique identifier, the control unit 401 attempts to read the unique identifier from the unique identifier storage unit 407. When successfully reading the unique identifier, the control unit 401 outputs the unique identifier thus read to the terminal device 300 by using a secure means. When failing to read the unique identifier, the control unit 401 outputs a message indicating that there is no unique identifier, to the terminal device 300 by using a secure means.

(3) Mutual Authentication Unit 403

When the connection request is transmitted to the verification server device 200 from the terminal device 300, the mutual authentication unit 403 performs mutual authentication with the mutual authentication unit 203 of the verification server device 200 according to a request from the verification server device 200, and shares a shared key with the verification server device 200.

Also, when an operational instruction to operate the appliance 500 is transmitted to the verification server device 200 from the terminal device 300, the mutual authentication unit 403 performs mutual authentication with the mutual authentication unit 303 of the terminal device 300 according to a request from the terminal device 300, and shares a shared key with the terminal device 300.

As shown in FIG. 15, the mutual authentication unit 403 includes an encryptor B11, a random number generator B12, a decryptor B13, a random number comparer B14, a key sharer B15 and an encryptor/decryptor B16.

The encryptor B11 receives the random number R1 from the other party in terms of the mutual authentication. Upon receiving the random number R1, the encryptor B11 encrypts the random number R1 according to an encryption algorithm E3 by using the system key Ksc, thereby generating an encrypted random number E3(Ksc, R1), and transmits the generated encrypted random number E3(Ksc, R1) to the other party.

Here, the encryption algorithm E3 is an algorithm according to a secret key cryptosystem. The encryption algorithm E3 is, for example, an algorithm conforming to the AES. E3(K, A) denotes a ciphertext generated by applying the encryption algorithm E3 to a plaintext A by using a key K.

The random number generator B12 generates a random number R2. The random number generator B12 subsequently outputs the random number R2 thus generated to the random number comparer B14. The random number generator B12 also transmits the random number R2 thus generated to the mutual authentication unit of the other party in terms of the mutual authentication.

The decryptor B13 receives an encrypted random number E4(Ksc, R2) from the other party in terms of the mutual authentication. Subsequently, the decryptor B13 decrypts the encrypted random number E4(Ksc, R2) according to a decryption algorithm D3 by using the system key Ksc, and thereby generates a plaintext R2'=D4(Ksc, E4(Ksc, R2)). The decryptor B13 subsequently outputs the plaintext R2' thus generated to the random number comparer B14.

Here, the decryption algorithm D4 is an algorithm according to a secret key cryptosystem. The encryption algorithm D4 is, for example, an algorithm conforming to the AES. E4(K, A) denotes a ciphertext generated by applying the encryption algorithm E4 to a plaintext A by using a key K. D4(K, B) denotes a plaintext generated by applying a decryption algorithm D4 to a ciphertext B by using a key K.

The random number comparer B14 receives the random number R2 and the plaintext R2'. The random number comparer B14 compares the random number R2 with the plaintext R2'. When the random number R2 matches the plaintext R2', the mutual authentication unit 403 determines that the other party is valid. When the random number R2 does not match the plaintext R2', the mutual authentication unit 403 determines that the other party is invalid.

When the mutual authentication is successful, the key sharer B15 performs the key sharing, and calculates the shared key k'. When the mutual authentication fails, the key sharer B15 does not calculate the shared key k'.

When the mutual authentication is successful, the encryptor/decryptor B16 encrypts data by using the shared key k' thus calculated, and thereby generates encrypted data. The encrypted data is transmitted to the other party. The encryptor/decryptor B16 receives encrypted data from the other party. Subsequently, the encryptor/decryptor B16 decrypts the encrypted data by using the shared key k' thus calculated, and generates the original data.

(4) Input/Output Unit 408

The input/output unit 408 receives information from the terminal device 300, and outputs the received information to the control unit 401 or the mutual authentication unit 403.

The input/output unit 408 also receives information from the control unit 401 or the mutual authentication unit 403, and outputs the received information to the terminal device 300.

<1.6 Appliance 500>

The following describes the appliance 500 as the representative of the appliances 500a, 500b, 500c, 500d and 500e.

Figure 16:
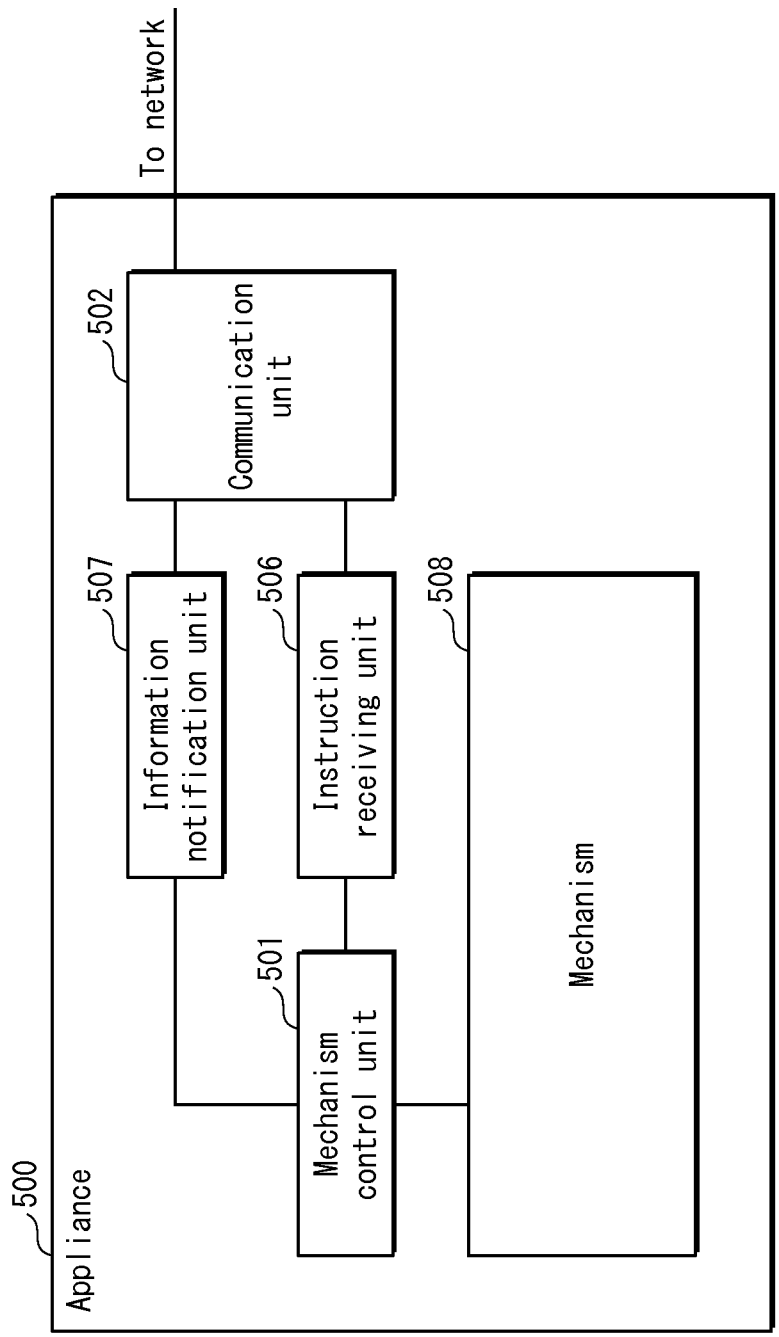
FIG. 16 is a block diagram showing the structure of an appliance 500.

As shown in FIG. 16, the appliance 500 includes a mechanism control unit 501, a communication unit 502, an instruction receiving unit 506, an information notification unit 507, and a mechanism 508.

The mechanism 508 is the principal part for achieving the functions of the appliance 500. When the appliance 500 is a lighting device, the mechanism 508 is a lighting mechanism. When the appliance 500 is a TV receiver, the mechanism 508 receives broadcast waves, and from the received broadcast waves, extracts a program on a channel desired by the user and plays back and displays the extracted program. When the appliance 500 is a door, the mechanism 508 is a lock system for controlling locking and unlocking of the door.

The mechanism 508 receives an operational instruction, including the remote control instruction, from the mechanism control unit 501, and operates according to the remote control instruction included in the received operational instruction.

The communication unit 502 exchanges information with the verification server device 200 via the network 20.

The information notification unit 507 receives, from the mechanism control unit 501, appliance state information indicating the state of the mechanism 508 of the appliance, and transmits the received appliance state information to the verification server device 200 via the communication unit 502 and the network 20.

The instruction receiving unit 506 receives, from the verification server device 200, a remote control instruction for controlling the mechanism 508 of the appliance via the network 20 and the communication unit 502, and outputs the received remote control instruction to the mechanism control unit 501.

The mechanism control unit 501 receives the remote control instruction from the instruction receiving unit 506, and controls the mechanism 508 according to the received remote control instruction. Also, the mechanism control unit 501 acquires, from the mechanism 508, the appliance state information indicating the state of the mechanism 508, and outputs the acquired appliance state information to the information notification unit 507.

The mechanism control unit 501 receives a request for acquisition of the appliance state information from the verification server device 200 via the network 20, the communication unit 502 and the instruction receiving unit 506. Subsequently, the mechanism control unit 501 extracts, from the request for acquisition of the appliance state information, appliance information related to the target appliance, and acquires the appliance state information corresponding to the extracted appliance information from the mechanism 508. Subsequently, the mechanism control unit 501 transmits the acquired appliance state information to the verification server device 200 via the information notification unit 507, the communication unit 502 and the network 20.

<1.7 Operations of Remote Control System 10>

Figure 17:
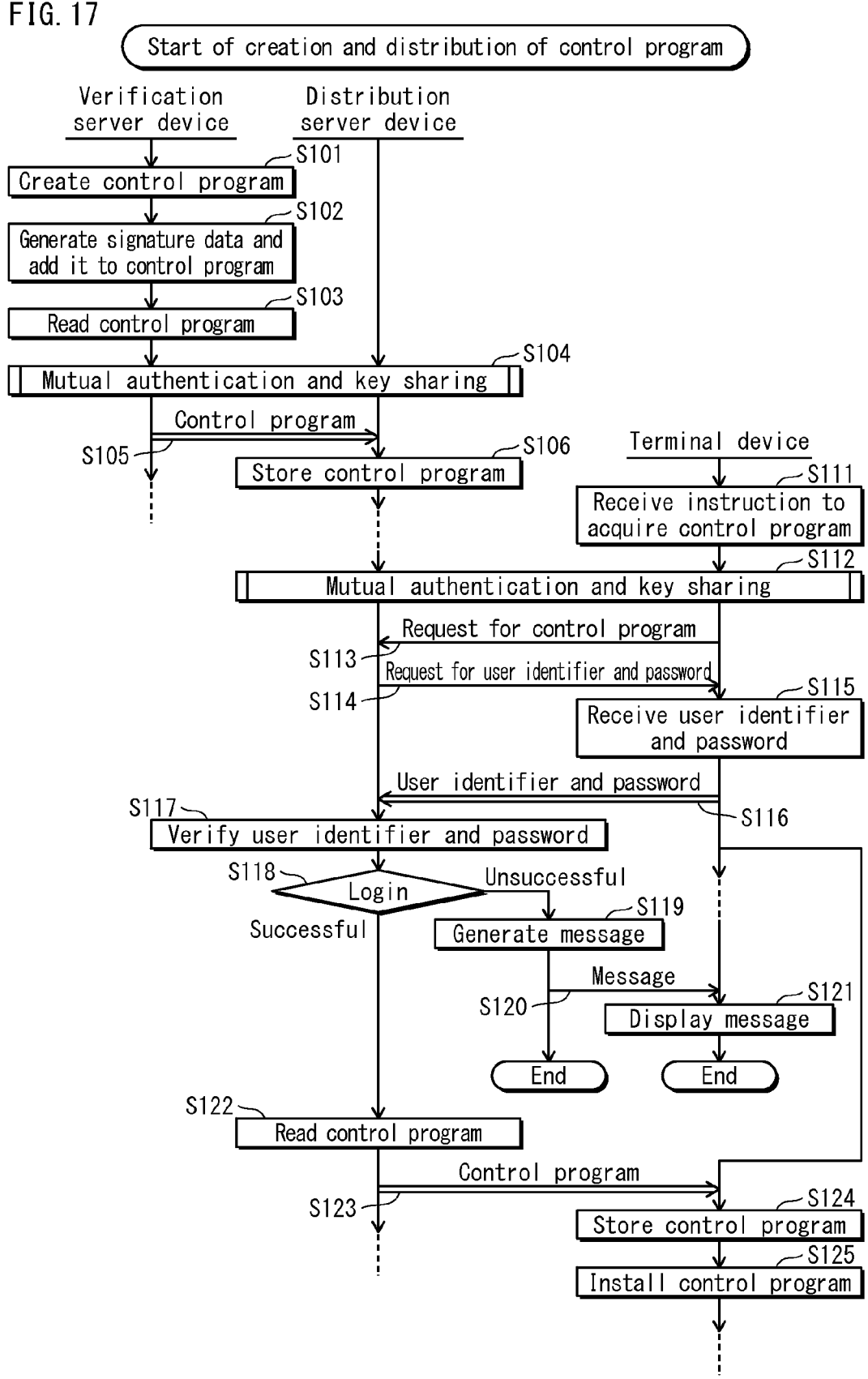
FIG. 17 is a sequence diagram showing procedures performed within the remote control system 10 to create and distribute a control program.
Figure 18:
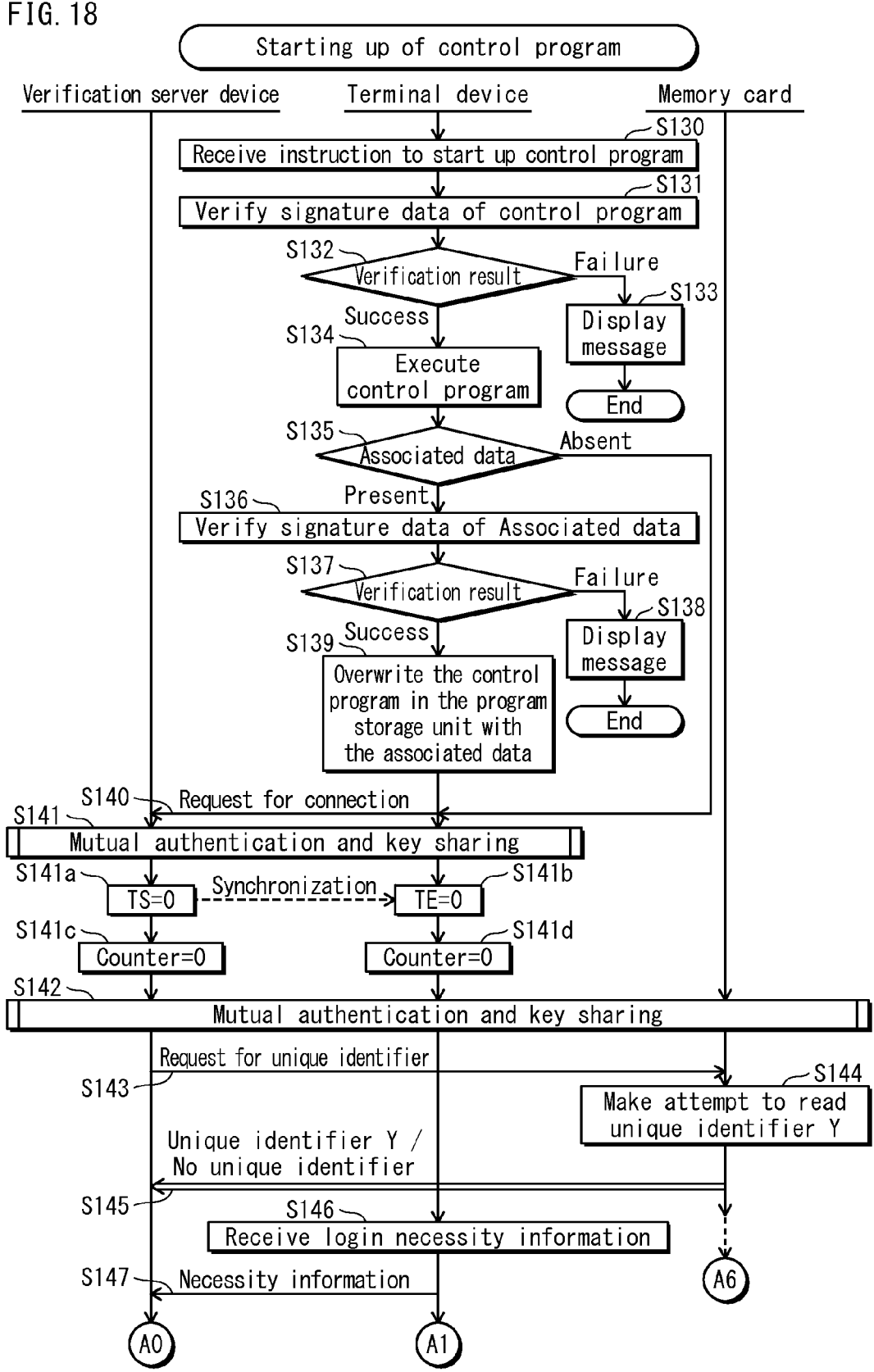
FIG. 18 is a sequence diagram (Part 1) showing procedures performed within the remote control system 10 when starting up the control program, followed by FIG. 19.
Figure 19:
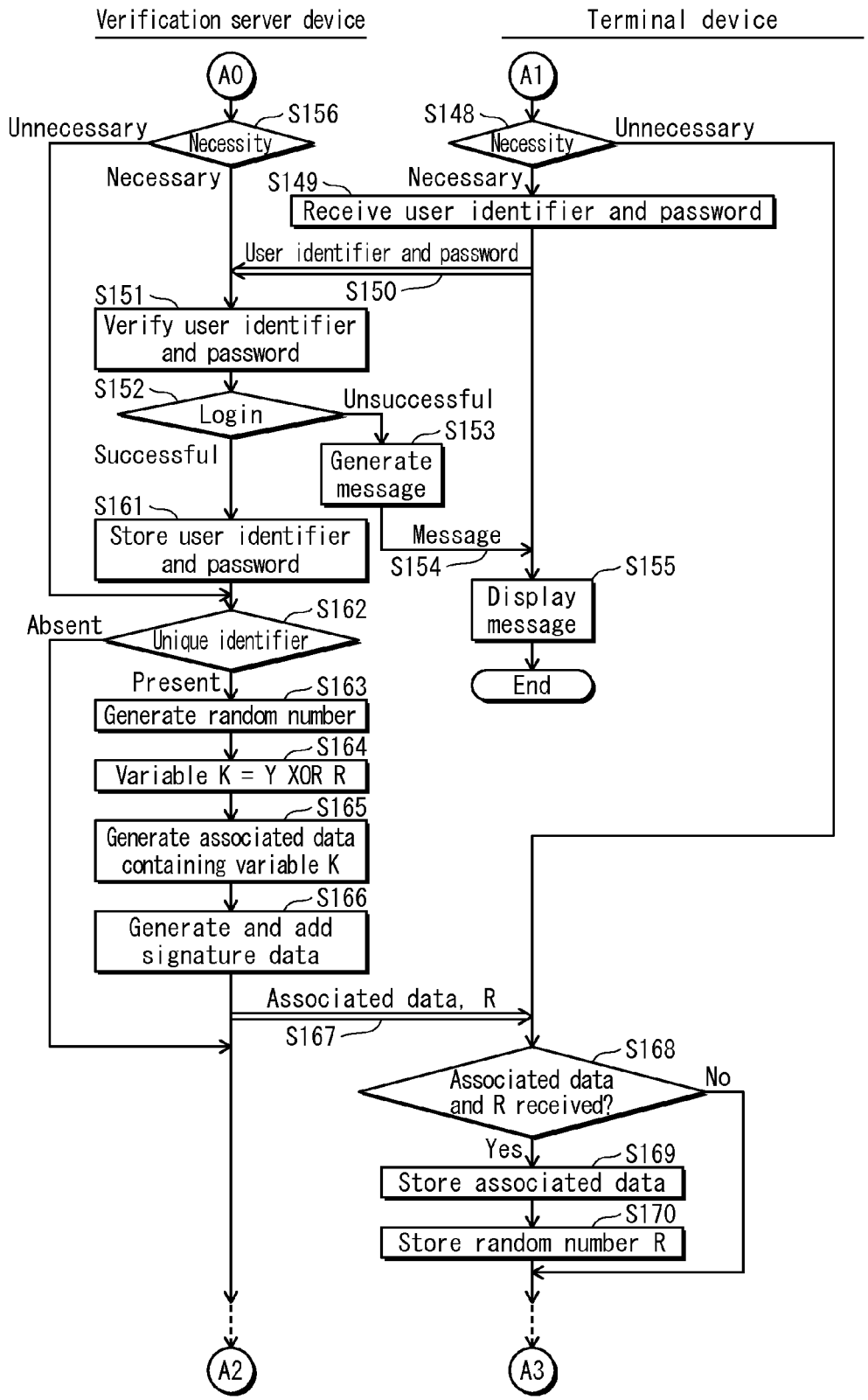
FIG. 19 is a sequence diagram (Part 2) showing procedures performed within the remote control system 10 when starting up the control program, followed by FIG. 20.
Figure 20:
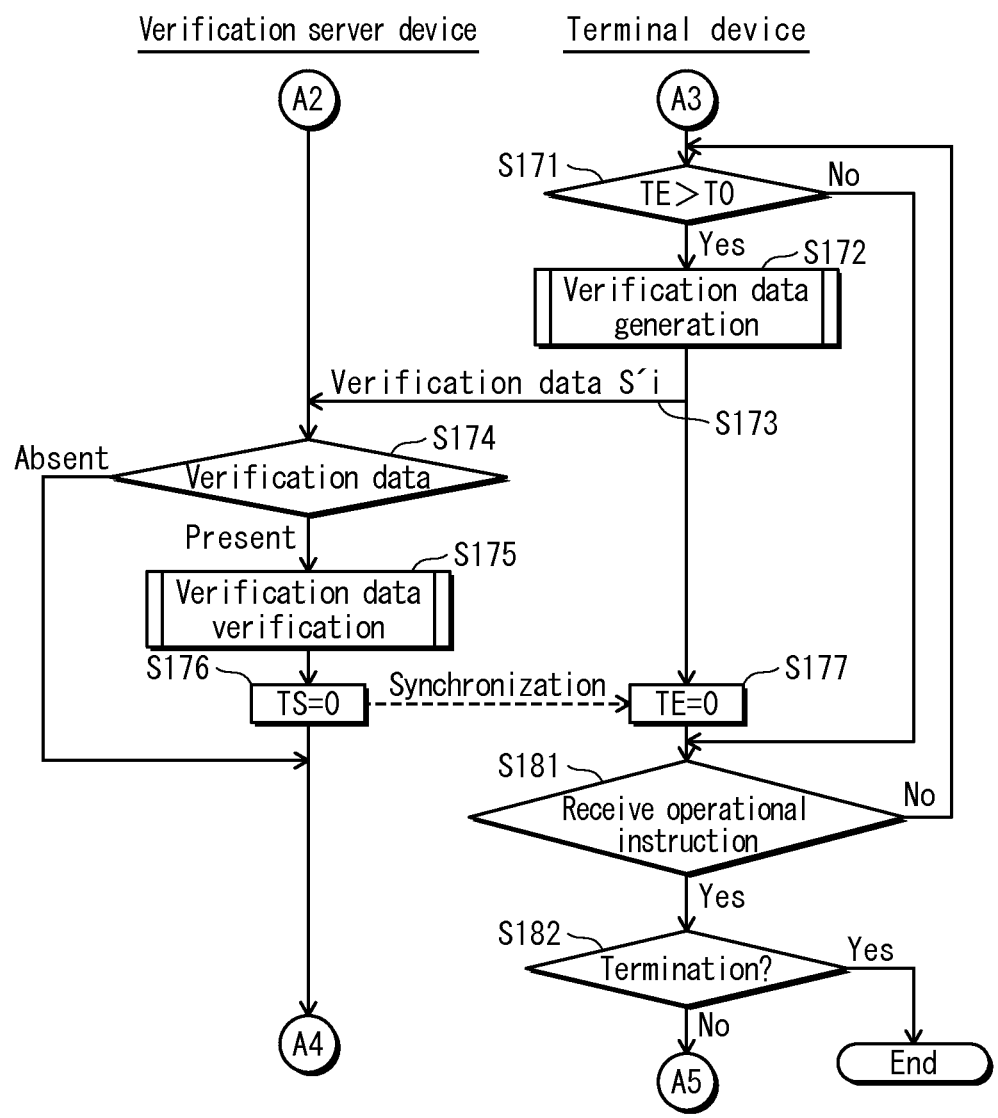
FIG. 20 is a sequence diagram (Part 3) showing procedures performed within the remote control system 10 when starting up the control program, followed by FIG. 21.
Figure 21:
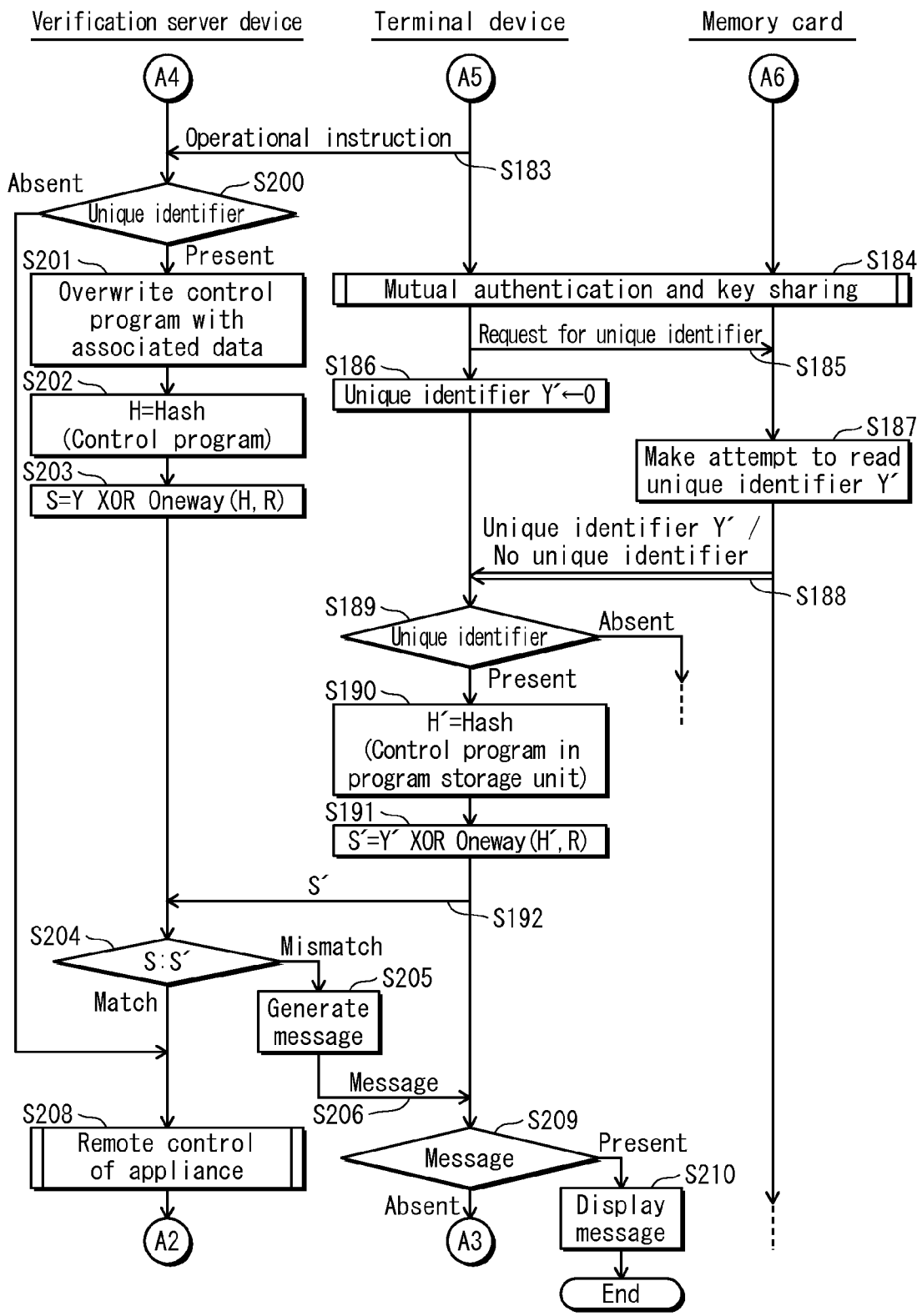
FIG. 21 is a sequence diagram (Part 4) showing procedures performed within the remote control system 10 when starting up the control program.

(1) Procedures for Creation of Control Program and Distribution of Control Program The following explains the procedures for creation of the control program and the distribution of the control program with reference to the sequence diagram shown in FIG. 17.

The program creation unit 206 of the verification server device 200 creates a control program according to operations by the user of the verification server device 200. Subsequently, the program creation unit 206 writes the control program thus created into the program storage unit 207 (Step S101).

The signature generation unit 214 reads the private key assigned to the verification server device 200 from the key storage unit 204, and reads the control program from the program storage unit 207. Subsequently, the signature generation unit 214 generates the signature data by applying the digital signature Sign to the read control program, by using the read private key. Subsequently, the signature generation unit 214 adds the signature data thus generated to the control program, and overwrites the control program stored in the program storage unit 207 with the control program to which the signature data has been added (Step S102).

Subsequently, the mutual authentication unit 203 of the verification server device 200 and the mutual authentication unit 103 of the distribution server device 100 perform mutual authentication and key sharing (Step S103). The details of the mutual authentication and the key sharing will be described later.

Subsequently, the communication unit 202 reads the control program from the program storage unit 207 (Step S104).

Subsequently, the communication unit 202 of the verification server device 200 transmits the read control program to the distribution server device 100 via the network 20 by using a secure means (Step S105). Subsequently, the communication unit 102 of the distribution server device 100 receives the control program from the verification server device 200 via the network 20 by using a secure means (Step S105).

The communication by using a secure means is realized by the following method.

The mutual authentication unit 203 encrypts the control program by using the shared key generated in the mutual authentication and the key sharing shown in Step S103, thereby generating an encrypted control program. In Step S105, the communication unit 202 transmits the encrypted control program to the distribution server device 100 via the network 20. Subsequently, the communication unit 102 receives the encrypted control program from the verification server device 200 via the network 20. The mutual authentication unit 103 decrypts the encrypted control program by using the shared key generated in the mutual authentication and the key sharing shown in Step S103, thereby generating the control program.

Subsequently, the communication unit 102 writes the received control program into the storage unit 105 (Step S106).

By the procedures described above, the control program is transmitted from the verification server device 200 to the distribution server device 100.

Subsequently, the input unit 310 of the terminal device 300 receives, from the user of the terminal device 300, an instruction to acquire the control program (Step S111).

Subsequently, the mutual authentication unit 103 of the distribution server device 100 and the mutual authentication unit 303 of the terminal device 300 perform mutual authentication and key sharing (Step S112).

Subsequently, under the control of the control unit 301, the communication unit 302 transmits a request for the control program to the distribution server device 100 via the network 20 (Step S113). The control unit 101 of the distribution server device 100 receives the request for the control program from the terminal device 300 via the network 20 and the communication unit 102 (Step S113).

Subsequently, the control unit 101 transmits a request for the user identifier and the password to the terminal device 300 via the communication unit 102 and the network 20 (Step S114). The account acquisition unit 908 receives the request for the user identifier and the password from the distribution server device 100 via the network 20 and the communication unit 302 (Step S114).

Subsequently, the input unit 310 receives the user identifier and the password from the user of the terminal device 300 (Step S115). The account acquisition unit 908 transmits the user identifier and the password thus received to the distribution server device 100 via the communication unit 302 and the network 20 by using a secure means (Step S116). The account verification unit 107 receives the user identifier and the password from the terminal device 300 via the network 20 and the communication unit 102 by using a secure means (Step S116). Here, the secure means is realized by the above-described method using encryption and description.

Subsequently, the account verification unit 107 determines whether the user identifier and the password thus received are stored in the account storage unit 106 (Step S117). If the user identifier and the password thus received are not stored in the account storage unit 106, the account verification unit 107 determines that the login has failed (i.e. unsuccessful login). If the user identifier and the password thus received are stored in the account storage unit 106, the account verification unit 107 determines that the login has been successful (i.e. successful login).

In the case of the unsuccessful login (Step S118: Unsuccessful), the account verification unit 107 generates a message showing the unsuccessful login (Step S119). Subsequently, the account verification unit 107 transmits the message to the terminal device 300 via the communication unit 102 and the network 20 (Step S120). Accordingly, the terminal device 100 terminates the processing.

The control unit 301 of the terminal device 300 receives the message from the distribution server device 100 via the network 20 and the communication unit 302 (Step S120). Subsequently, the display unit 309 displays the received message (Step S121). Accordingly, the terminal device 300 terminates the processing.

In the case of the successful login (Step S118: Successful), the control unit 101 reads the control program from the storage unit 105 (Step S122). Subsequently, the control unit 101 transmits the control program thus read to the terminal device 300 via the communication unit 102 and the network 20 by using a secure means (Step S123). The communication unit 302 receives the control program from the distribution server device 100 via the network 20 by using a secure means (Step S123). Here, the secure means is the same as described above. Subsequently, the communication unit 302 writes the received control program into the program storage unit 305 (Step S124). Subsequently, the program execution unit 306 installs the control program into the program storage unit 305 (Step S125).

By the procedures described above, the control program is transmitted from the distribution server device 100 to the terminal device 300.

(2) Procedures for Starting up the Control Program

The following describes the procedures for starting up the control program with reference to the sequence diagram shown in FIGS. 18 through 21.

The input unit 310 of the terminal device 300 receives, from the user of the terminal device 300, an instruction to start up the control program (Step S130).

The verification unit 311 reads the public key assigned to the verification server device 200 from the key storage unit 304. Subsequently, the verification unit 311 applies the digital signature verification Vrfy to the signature data 334$a$ stored in the signature region 334 of the control program 331 installed in the program storage unit 305, the execution region 332, and the first data region 333 by using the public key thus read (Step S131). When the digital signature verification Vrfy fails (Step S132: Failure), the verification unit 311 generates a message indicating that the verification has failed, and the display unit 309 displays the message (Step S133). Accordingly, the terminal device 300 terminates the processing.

When the digital signature verification Vrfy is successful (Step S132: Success), the program execution unit 306 puts the control program 331 into the execution state (Step S134). The associated data processing unit 901 determines whether the associated data is stored in the associated data storage unit 307 (Step S135).

When the associated data is stored in the associated data storage unit 307 (Step S135: Present), the verification unit 311 reads the public key assigned to the verification server device 200 from the key storage unit 304. Subsequently, the verification unit 311 applies the digital signature verification Vrfy to the signature data stored in the signature region of the associated data in the associated data storage unit 307, and to the variable K stored in the variable number region, by using the read public key (Step S136). When the digital signature verification Vrfy fails (Step S137: Failure), the verification unit 311 generates a message indicating that the verification has failed, and the display unit 309 displays the message (Step S138). Accordingly, the terminal device 300 terminates the processing.

When the digital signature verification Vrfy is successful (Step S137: Success), the associated data processing unit 901 overwrites the associated data 335a in the second data region 335 of the control program 331 with the associated data stored in the associated data storage unit 307 (Step S139).

When the associated data is not stored in the associated data storage unit 307 (Step S135: Absent), the verification unit 311 does not perform the verification and the associated data processing unit 901 does not perform the overwriting with the associated data.

The control unit 301 transmits the connection request for the remote control of the appliance 500 to the verification server device 200 via the communication unit 302 and the network 20 (Step S140). The control unit 201 receives the connection request from the terminal device 300 via the network 20 and the communication unit 202 (Step S140).

Subsequently, the mutual authentication unit 203 of the verification server device 200 and the mutual authentication unit 303 of the terminal device 300 perform mutual authentication and key sharing (Step S141).

When the mutual authentication between the verification server device 200 and the terminal device 300 is established, the control unit 201 initializes the value of the timer TS (TS=0) (Step S141a). Then the control unit 201 transmits to the terminal device 300 a signal for synchronization of the initialization of the value of the timer TE, and accordingly the terminal device 300 initializes the value of its timer TE (TE=0) in synchronization of the initialization of the value of the timer TS of the verification server device 200 (Step S141b). Note that the timers TS and TE are used for measuring the elapsed time.

Subsequently, the control unit 201 of the verification server device 200 and the control unit 301 of the terminal device 300 initialize their respective variables "Counter" to 0 (Counter=0) (Step S141c, Step S141d).

Subsequently, the mutual authentication unit 203 of the verification server device 200 and the mutual authentication unit 403 of the memory card 400 perform mutual authentication and key sharing (Step S142).

The control unit 201 of the verification server device 200 transmits a request for the unique identifier to the memory card 400 via the communication unit 202, the network 20 and the terminal device 300 (Step S143). The control unit 401 of the memory card 400 receives the request for the unique identifier from the verification server device 200 via the network 20, the terminal device 300 and the input/output unit 408 (Step S143). Subsequently, the control unit 401 attempts to read the unique identifier Y from the unique identifier storage unit 407 (Step S144). The control unit 401 transmits the unique identifier Y thus read to the verification server device 200 via the input/output unit 408, the terminal device 300 and the network 20 by using a secure means (Step S145). When failing to read the unique identifier Y, the control unit 401 transmits a message indicating that there is no unique identifier, to the verification server device 200 via the input/output unit 408, the terminal device 300 and the network 20 by using a secure means (Step S145).

The control unit 201 receives the unique identifier Y or the message indicating that there is no unique identifier, from the memory card 400 via the terminal device 300, the network 20 and the communication unit 202 by using a secure means. When the control unit 201 does not receive the unique identifier Y or the message indicating that there is no unique identifier from the memory card 400 until even after a predetermined period has elapsed since transmitting the request for the unique identifier to the memory card 400, the control unit 201 generates a message indicating that there is no unique identifier (Step S145).

Subsequently, the input unit 310 of the terminal device 300 receives, from the user of the terminal device 300, an instruction to acquire the login necessity information (Step S146). Subsequently, the account acquisition unit 908 transmits the login necessity information to the verification server device 200 via the communication unit 302 and the network 20 (Step S147).

Subsequently, the account acquisition unit 908 determines whether the received login necessity information indicates that the login is necessary (Step S148).

When the logging necessity information indicates that the logging is necessary (Step S148: Necessary), the input unit 310 receives the user identifier and the password from the user of the terminal device 300 (Step S149). Subsequently, the account acquisition unit 908 transmits the received user identifier and password to the verification server device 200 via the communication unit 302 and the network 20 by using a secure means (Step S150).

The account verification unit 215 receives login necessity information from the terminal device 300 via the network 20 and the communication unit 202 (Step S150).

The account verification unit 215 determines whether the received login necessity information indicates that the login is necessary (Step S156).

When the logging necessity information indicates that the login is unnecessary (Step S156: Unnecessary), the control moves to Step S162.

When the login necessity information indicates that the login is necessary (Step S156: Necessary), the account verification unit 215 receives the user identifier and the password from the terminal device 300 via the network 20 and the communication unit 202 by using a secure means (Step S150). Subsequently, the account verification unit 215 determines whether the pair of the user identifier and the password is contained in the account management table 261 (Step S151). When the received user identifier and password are not stored in the account management table 261, the account verification unit 215 determines that the login has failed (i.e. unsuccessful login). When the received user identifier and password are stored in the account management table 261, the account verification unit 215 determines that the login has been successful (i.e. successful login).

In the case of the unsuccessful login (Step S152: unsuccessful), the account verification unit 215 generates a message showing the unsuccessful login (Step S153). Subsequently, the account verification unit 215 transmits the message to the terminal device 300 via the communication unit 202 and the network 20 (Step S154). Accordingly, the verification server device 200 terminates the processing.

The communication unit 302 of the terminal device 300 receives the message from the verification server device 200 via the network 20 (Step S154). Subsequently, the display unit 309 displays the message (Step S155). Accordingly, the terminal device 300 terminates the processing.

In the case of the successful login (Step S152: Successful), the control unit 101 stores the user identifier and the password (Step S161).

Subsequently, the associated data generation unit 208 determines whether the unique identifier has been received from the memory card 400 (Step S162). When the unique identifier has been received (Step S162: Present), the associated data generation unit 208 generates the random number R (Step S163), and calculates Variable K=Unique Identifier Y XOR Random Number R (Step S164). Subsequently, the associated data generation unit 208 generates the associated data containing the variable K thus calculated (Step S165). Subsequently, the signature generation unit 214 applies the digital signature Sign to the associated data to generate the signature data, and adds the signature data thus generated to the associated data (Step S166). Subsequently, the associated data generation unit 208 transmits the associated data and the random number R to the terminal device 300 via the communication unit 202 and the network 20 by using a secure means (Step S167).

When the unique identifier has not been received (Step S162: Absent), none of the generation of the random number R, the calculation of the variable K, the generation of the associated data, the generation of the signature data and the transmission of the associated data random number R is performed.

In some cases, the associated data processing unit 901 receives the associated data and the random number R from the verification server device 200 via the network 20 and the communication unit 302 by using a secure means (Step S167).

Subsequently, the associated data processing unit 901 determines whether the associated data and the random number R have been received (Step S168).

When the associated data and the random number R have been received (Step S168: Yes), the associated data processing unit 901 writes the received associated data into the associated data storage unit 307 (Step S169). Subsequently, the associated data processing unit 901 writes the received random number R into the associated data storage unit 307 (Step S170).

When the associated data and the random number R have not been received (Step S168: No), the associated data processing unit 168 does not perform the writing of the associated data and the random number R.

Subsequently, the control unit 301 of the terminal device 300 determines whether the elapsed time indicated by the timer TE is greater than a threshold value T0 which has been set in advance (Step S171).

When TE>T0 is satisfied (Step S171: Yes), the verification data generation unit 911 realized by the control program executed in the terminal device 300 performs processing for generating the verification data (Step S172). The processing for generating the verification data will be described later.

The verification data generation unit 911 transmits the verification data S'i generated by the verification data generation processing to the verification server device 200 via the communication unit 302 (Step S173).

The verification unit 218 of the verification server device 200 determines whether the verification data S'i has been received from the terminal device 300 via the communication unit 202 (Step S174).

When the verification data has been received (Step S174: Present), the verification unit 218 performs processing for verifying the verification data (Step S175). The processing for verifying the verification data will be described later.

Upon completion by the verification unit 218 of the verification of the verification data, the control unit 201 initializes the value of the timer TS to 0 (TS=0) (Step S176), and transmits a synchronization signal to the terminal device 300. Accordingly, the control unit 301 of the terminal device 300 initializes the value of the timer TE to 0 (TE=0) in synchronization with the timer TS (Step S177).

When the verification data has not been received (Step S174: Absent), the verification unit 218 does not perform the verification of the verification data, and the verification server device 200 waits for the verification data and the operational instruction from the terminal device 300.

When TE>T0 is not satisfied (Step S171: No), the verification data generation unit 911 does not perform the processing for generating the verification data, and the processing moves to Step S181.

The input unit 310 of the terminal device 300 determines whether the operational instruction has been input by the user of the terminal device 300 (Step S181).

If the operational instruction has not been input (Step S181: No), Steps S171 to S181 are repeatedly performed until the input of the operational instruction.

On the other hand, when the input unit 310 has received the operational instruction (Step S181: Yes) and the operational instruction is an instruction to terminate the processing (Step S182: Yes), the terminal device 300 terminates the processing.

When the operational instruction is not an instruction to terminate the processing (Step S182: No), the operational instruction acquisition unit 910 transmits the received operational instruction to the verification server device 200 via the communication unit 302 and the network 20 (Step S183).

The appliance control unit 213 of the verification server device 200 receives the operational instruction from the terminal device 300 via the network 20 and the communication unit 202 (Step S183). Subsequently, the authenticity evaluation unit 210 determines whether the unique identifier has been received (Step S200).

When the unique identifier has been received (Step S200: Present), the associated data generation unit 208 overwrites the control program stored in the program storage unit 207 with the associated data (Step S201). Subsequently, the authenticity evaluation unit 210 applies the hash operation Hash to the control program, and thereby calculates the hash value H (Step S202). Subsequently, the authenticity evaluation unit 210 calculates S=Y XOR Oneway(H, R) (Step S203).

After transmitting the operational instruction at Step S183, the mutual authentication unit 303 of the terminal device 300 and the mutual authentication unit 403 of the memory card 400 perform mutual authentication and key sharing (Step S184).

Subsequently, the unique identifier acquisition processing unit 902 of the terminal device 300 outputs a request for the unique identifier to the memory card 400 via the input/output unit 308 (Step S185). Subsequently, the control unit 401 of the memory card 400 receives the request for the unique identifier from the terminal device 300 via the input/output unit 408 (Step S185).

After outputting the request for the unique identifier at Step S185, the unique identifier acquisition processing unit 902 sets "0" to the unique identifier Y' (Step S186).

The control unit 401 of the memory card 400 attempts to read the unique identifier from the unique identifier storage unit 407 (Step S187). Here, it is assumed that the unique identifier Y' is to be read. The control unit 401 outputs the unique identifier Y' thus read to the terminal device 300 by using a secure means. When failing to read the unique identifier, the control unit 401 outputs a message indicating that there is no unique identifier, to the terminal device 300 by using a secure means (Step S188).

Subsequently, the unique identifier acquisition processing unit 902 determines whether the unique identifier Y' has been received from the memory card 400 (Step S189). When receiving the unique identifier Y' (Step S189: Present), the unique identifier acquisition processing unit 902 calculates Hash Value H'=Hash (Control Program stored in Program Storage Unit 305) (Step S190). Subsequently, the unique identifier acquisition processing unit 902 calculates S'=Y' XOR Oneway(H', R) (Step S191). Subsequently, the unique identifier acquisition processing unit 902 transmits the evaluation value S' to the verification server device 200 via the communication unit 302 and the network 20 (Step S192).

The authenticity evaluation unit 210 receives the evaluation value S' from the terminal device 300 via the network 20 and the communication unit 202 (Step S192).

Subsequently, the authenticity evaluation unit 210 determines whether the evaluation value S thus calculated matches the evaluation value S' thus received (Step S204).

When the evaluation value S does not match the evaluation value S' (Step S204: Mismatch), the authenticity evaluation unit 210 outputs prohibition information, which prohibits the operation of the appliance, to the appliance control unit 213, and generates a message indicating that the evaluation value S does not match the evaluation value S' (Step S205). Subsequently, the authenticity evaluation unit 210 transmits the message thus generated to the terminal device 300 via the communication unit 202 and the network 20 (Step S206).

The control unit 301 of the terminal device 300 determines whether the message indicating that the evaluation value S does not match the evaluation value S' from the verification server device 200 via the network 20 and the communication unit 302 (Step S209).

When the message has been received (Step S209: Present), the display unit 309 displays the received message (Step S210). Accordingly, the terminal device 300 terminates the processing.

When the message has not been received (Step S209: Absent), the terminal device 300 returns to A3 and repeats the processing.

On the other hand, when the evaluation value S matches the evaluation value S' (Step S204: Match), the authenticity evaluation unit 210 outputs permission information, which permits the operation of the appliance, to the appliance control unit 213, and thus the remote control and so on of the appliance is performed (Step S208). Upon completion of Step S208, the verification server device 200 returns to A2 and repeats the processing.

When the unique identifier has not been received (Step S200: Absent), the authenticity evaluation unit 210 does not perform the overwriting of the associated data, the calculation of the hash value, the calculation of the evaluation value S, and the comparison between the evaluation value S or the evaluation value S'.

At Step S208, the user may terminate the control program after the remote control and so on of the appliance completes. If this is the case, the terminal device 300 terminates the processing without returning to A3. Similarly, upon completion of the processing at Step S208, the verification server device 200 terminates the processing without returning to A2.

(3) Procedures for Generating the Verification Data

Figure 22:
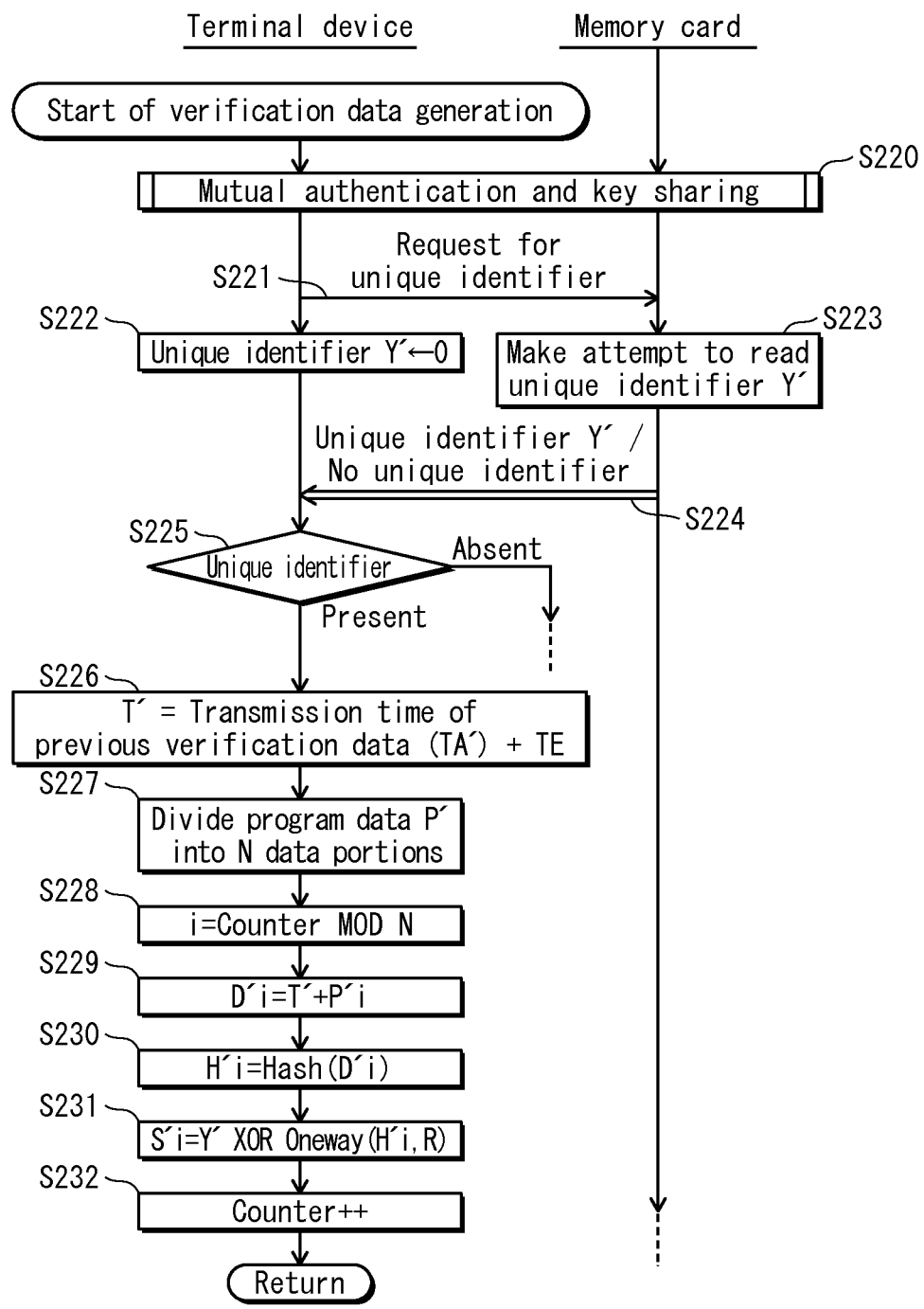
FIG. 22 is a sequence diagram showing procedures performed within the remote control system 10 when generating verification data.

The following explains the procedures for generating the verification data performed by the terminal device 300, with reference to the sequence diagram shown in FIG. 22. Note that the following description of the verification data generation shows the details of Step S172 shown in FIG. 20.

The mutual authentication unit 303 of the terminal device 300 and the mutual authentication unit 403 of the memory card 400 perform mutual authentication and key sharing (Step S220).

Subsequently, the unique identifier acquisition processing unit 902 of the terminal device 300 outputs a request for the unique identifier to the memory card 400 via the input/output unit 308 (Step S221). Subsequently, the control unit 401 of the memory card 400 receives the request for the unique identifier from the terminal device 300 via the input/output unit 408 (Step S221).

After outputting the request for the unique identifier at Step S221, the unique identifier acquisition processing unit 902 sets "0" to the unique identifier Y' (Step S222).

The control unit 401 of the memory card 400 attempts to read the unique identifier from the unique identifier storage unit 407 (Step S223). Here, it is assumed that the unique identifier Y' is to be read. The control unit 401 outputs the unique identifier Y' thus read to the terminal device 300 by using a secure means. When failing to read the unique identifier, the control unit 401 outputs a message indicating that there is no unique identifier, to the terminal device 300 by using a secure means (Step S224).

Subsequently, the unique identifier acquisition processing unit 902 determines whether the unique identifier Y' has been received from the memory card 400 (Step S225). When the unique identifier Y' has been received (Step S225: Present), the verification data generation unit 911 generates the data T' which indicates the time obtained by adding the elapsed time TE to the time TA' at which the previous verification data was transmitted (Step S226). Note that when this is the initial generation of the verification data since the control program 331 has been started up, the time at which the mutual authentication and the key sharing with the verification server device 200 were established is determined as TA' instead of the time at which the previous verification data was transmitted. Since the time TA' at which the verification data is transmitted needs to be the same as time TA at which the verification server device 200 receives the verification data as described later. Therefore, the time TA' is set in one minute increments.

Subsequently, the verification data generation unit 911 generates N data portions P'i (i being from 0 to N-1) divided from the control program stored in the program storage unit 305 (Step S227). The verification data generation unit 911 sets the remainder of the variable Counter divided by N to i, selects one of the N data portions P'i, and calculates D'i=T'+P'i (Step S229). Subsequently, the verification data generation unit 911 calculates the hash value of D'i, namely H'i(D'i) (Step S230).

Subsequently, the verification data generation unit 911 calculates S'i=Y' XOR Oneway(H'i, R) (Step S231).

The verification data generation unit 911 increments the variable Counter by 1 (Step S232), and returns to the processing for starting up the control program. Note that the verification data S'i thus generated is transmitted to the verification server device 200 at Step S173 shown in FIG. 20 as described above.

(4) Procedures for Verifying the Verification Data

Figure 23:
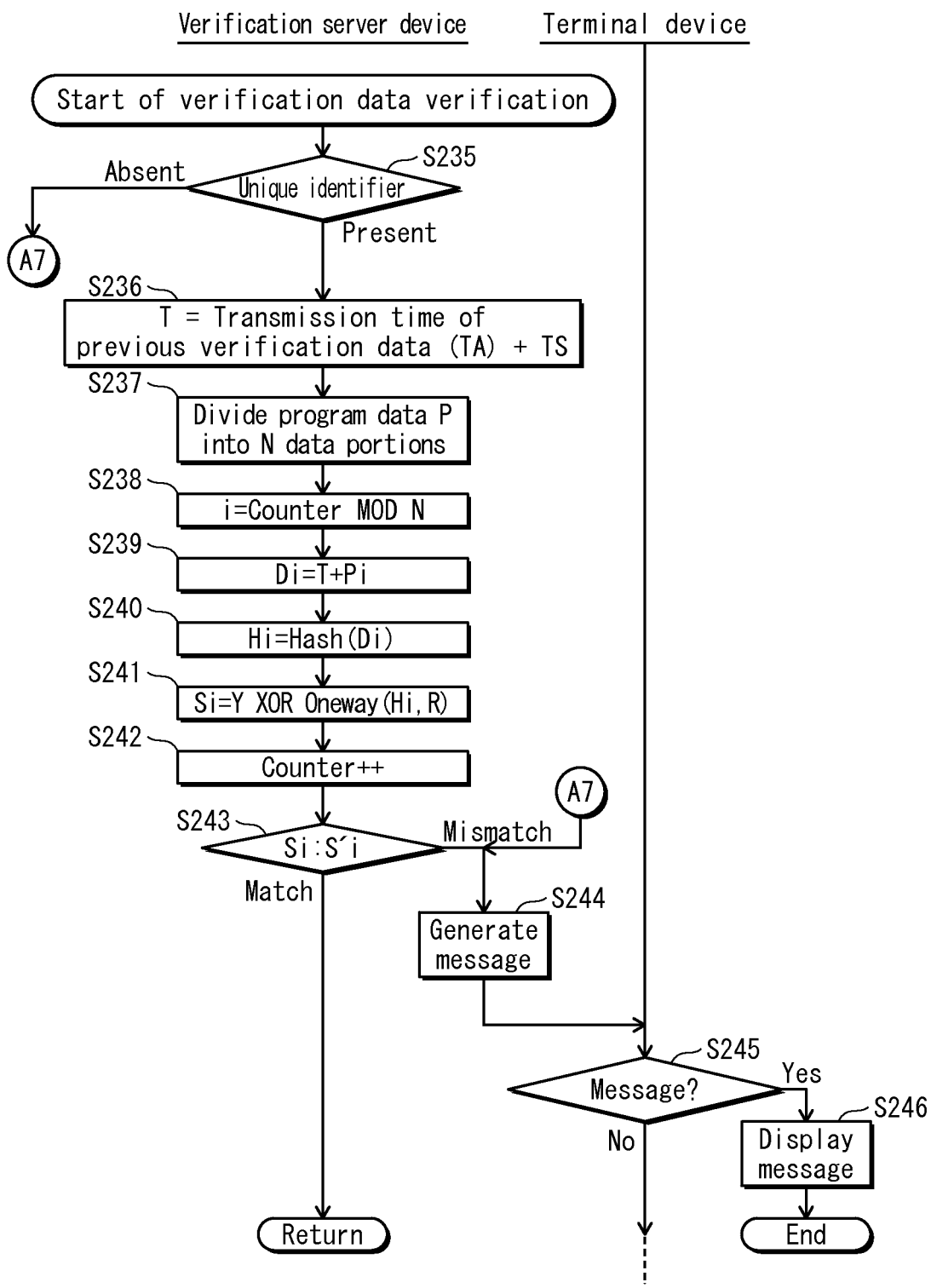
FIG. 23 is a sequence diagram showing procedures performed within the remote control system 10 when verifying the verification data.

The following explains the procedures for verifying the verification data performed by the verification server device 200, with reference to the sequence diagram shown in FIG. 23. Note that the following description of the verification data verification shows the details of Step S175 shown in FIG. 20.

The verification unit 218 of the verification server device 200 determines whether the unique identifier has been received or not (Step S235).

When the unique identifier has been received (Step S235: Present), the verification unit 218 generates the data T indicating the time obtained by adding the elapsed time TS to the time TA at which the previous verification data was received (Step S236). Note that when this is the initial reception by the terminal device 300 of the verification data since the control program 331 has been started up, the time at which the mutual authentication and the key sharing with the verification server device 200 were established is determined as TA instead of the time at which the previous verification data was received. The time TA at which the verification data is received needs to be the same as the time at which the verification data generation unit 911 of the terminal device 300 transmits the verification data. Therefore, considering the delay occurring in the transmission and the reception of the data via the network, the time at which the verification data is set in one minute increments.

Subsequently, the verification unit 218 generates N data portions Pi (N being a predetermined number (e.g. N=10), i being from 0 to N-1) divided from the control program stored in the program storage unit 207 (Step S237). Note that the number N needs to be the same as the number used in the dividing at Step S227 shown in FIG. 22 performed by the terminal device 300 to generate the verification data.

Then the verification unit 218 sets the remainder of Counter divided by N to i (Step S238), selects one of the N data portions P'i (i being from 0 to N-1), and calculates Di=T+Pi (Step S239). Subsequently, the verification unit 218 calculates the hash value of Di, namely Hi(Di) (Step S240).

Subsequently, the verification unit 218 calculates Si=Y XOR Oneway(Hi, R) (Step S241).

Then the verification unit 218 increments the variable Counter by 1 (Step S242). The variable Counter is used for determining the data portion to be used at the next reception of the verification data, from among the data portions divided from the control program. Note that the value of the variable Counter is the same as the value of the variable Counter used in the verification data generation performed in the terminal device 300.

Subsequently, the verification unit 218 determines whether the calculated comparison data Si matches the received verification data S'i (Step S243).

When the comparison data Si does not match the verification data S'i (Step S243: Mismatch) or when it is determined at Step S235 that the unique identifier has not been received (Step S235: Absent), the verification unit 218 outputs the prohibition information which prohibits the operation of the appliance to the appliance control unit 213, generates a message indicating that the comparison data Si does not match the verification data S'i, and outputs the message thus generated to the terminal device 300 via the communication unit 202 and the network 20 (Step S244).

The control unit 301 of the terminal device 300 determines whether the message indicating that the comparison data Si does not match the verification data S'i from the verification server device 200 via the network 20 and the communication unit 302 (Step S245).

When the message has been received (Step S245: Yes), the display unit 309 displays the received message (Step S246). Accordingly, the terminal device 300 terminates the processing.

When the message has not been received (Step S245: No), the terminal device 300 returns to A3 and repeats the processing.

On the other hand, when the comparison data Si matches the verification data S'i (Step S243: Match), the verification unit 218 terminates the verification data verification processing and returns to the processing for starting up the control program, and continues the processing.

(5) Procedures for Remote Control of Appliance and Related Processing

Figure 24:
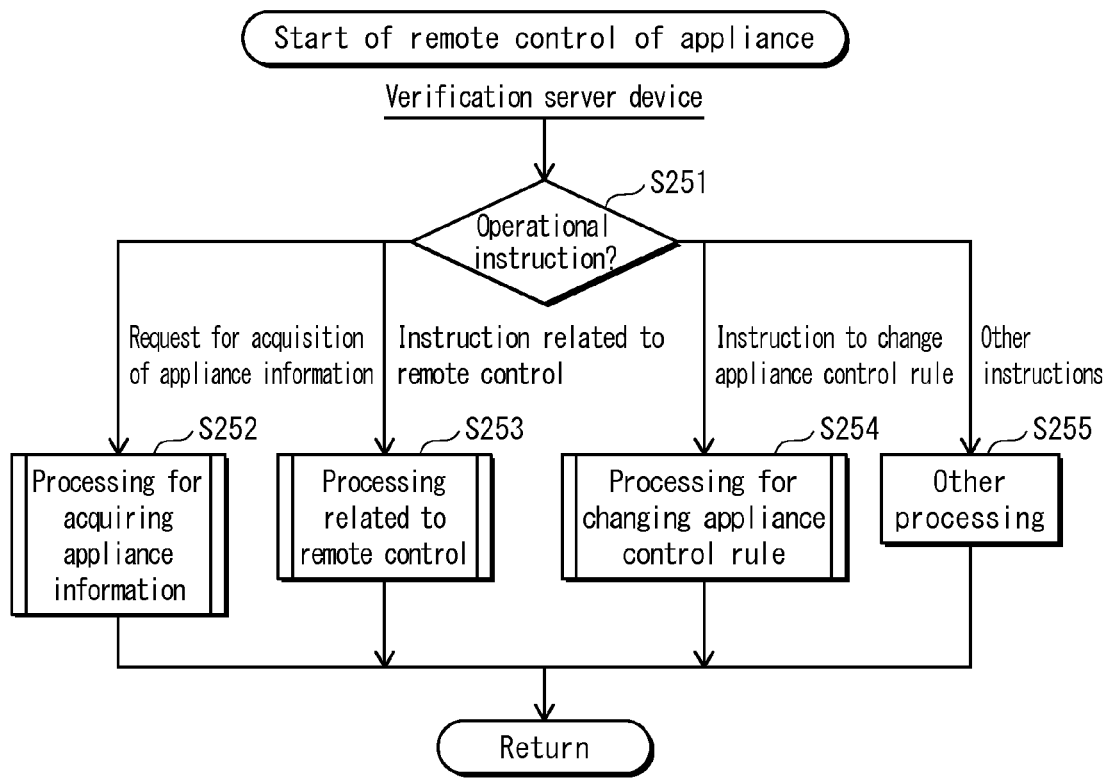
FIG. 24 is a flowchart showing procedures for remote control of appliances and related processing, performed within the remote control system 10.

The following explains the procedures for the remote control of the appliance and the related processing, with reference to the flowchart shown in FIG. 24. Note that the following description of the remote control of the appliance and the related processing shows the details of Step S208 shown in FIG. 21.

The appliance control unit 213 determines whether the operational instruction received from the terminal device 300 via the network 20 and the communication unit 202 is a request for acquisition of information related to the appliance 500, an instruction related to the remote control of the appliance 500, an instruction to change the appliance control rule, or other instructions (Step S251).

When the operational instruction is the request for acquisition of information related to the appliance 500 (Step S251: Request for acquisition of appliance information), the appliance control unit 213 performs processing for acquiring the information related to the appliance 500 (Step S252).

When the operational instruction is the instruction related to the remote control of the appliance 500 (Step S251: Instruction related to remote control), the appliance control unit 213 performs processing related to the remote control of the appliance 500 (Step S253).

When the operational instruction is the instruction to change the appliance control rule (Step S251: Instruction to change the appliance control rule), the appliance control unit 213 performs the processing for changing the appliance control rule (Step S254).

When the operational instruction is another instruction (Step S251: Another instruction), the appliance control unit 213 performs other processing (Step S255).

Accordingly, the procedures for the remote control of the appliance and the related processing are terminated.

(6) Procedures for Acquisition of Information of Appliance 500

Figure 25:
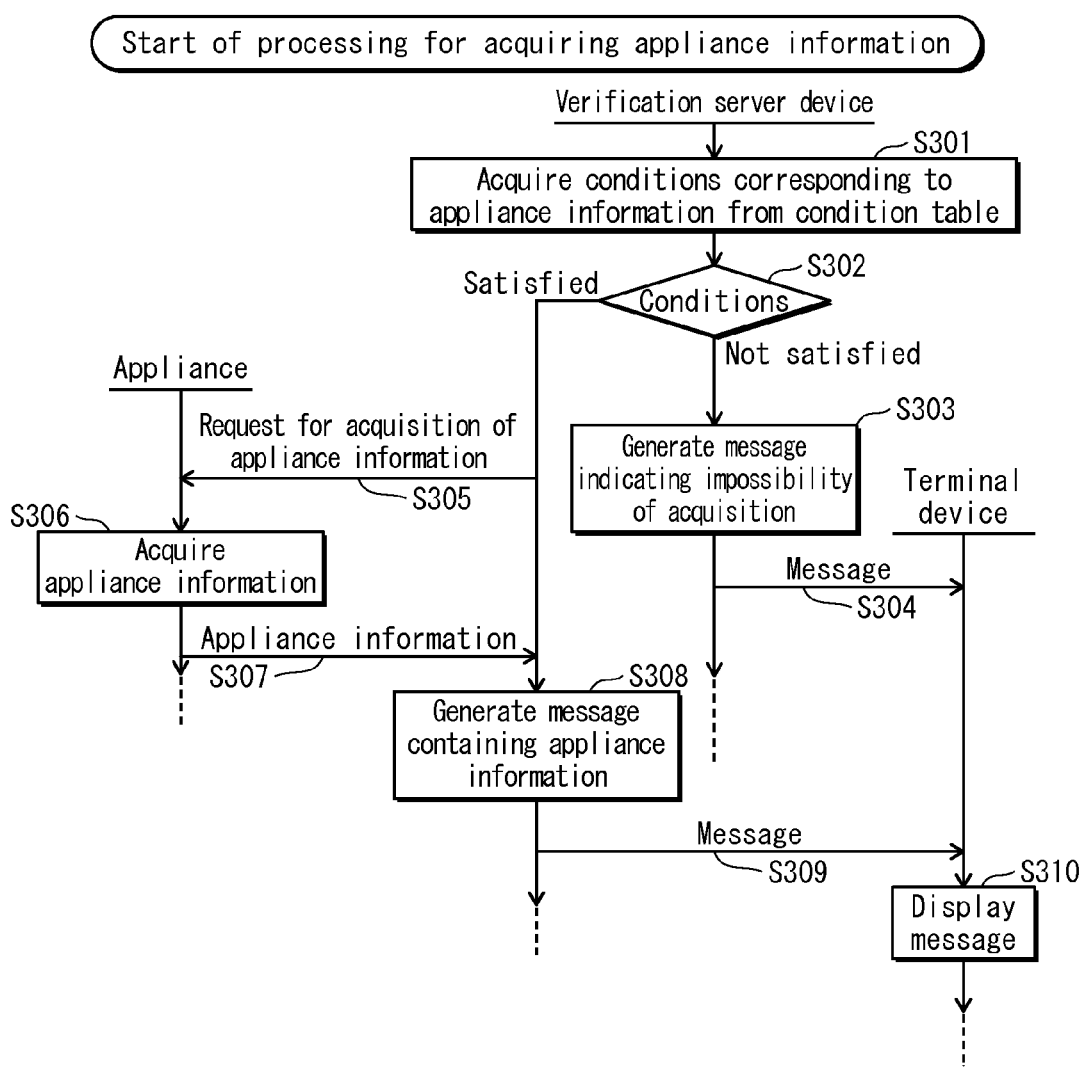
FIG. 25 is a sequence diagram showing procedures for appliance information acquisition performed within the remote control system 10.

The following explains the procedures for acquisition of the information of the appliance 500, with reference to the flowchart shown in FIG. 25. Note that the following description of the procedures for acquisition of the information of the appliance 500 shows the details of Step S252 shown in FIG. 24.

The appliance control unit 213 extracts the appliance information from the request for acquisition of the information of the appliance 500, and reads the conditions corresponding to the extracted appliance information from the condition table 271 (Step S301).

Subsequently, the appliance control unit 213 determines whether the current state of the verification server device 200 satisfies the conditions read from the condition table 271 (Step S302).

When the current state of the verification server device 200 does not satisfy the read conditions (Step S302: Not satisfied), the appliance control unit 213 generates a message indicating that it is impossible to acquire the appliance state information indicating the state of the appliance (Step S303). Subsequently, the appliance control unit 213 transmits the message thus generated to the terminal device 300 via the communication unit 202 and the network 20 (Step S304).

The appliance operation presentation unit 907 of the terminal device 300 receives the message indicating that it is impossible to acquire the appliance state information, from the verification server device 200 via the network 20 and the communication unit 302 (Step S304). Subsequently, the appliance operation presentation unit 907 outputs the received message to the display unit 309. The display unit 309 receives the message, and displays the received message (Step S310). Accordingly, the processing for acquisition of the appliance state information is terminated.

When the current state of the verification server device 200 satisfies the read conditions (Step S302: Satisfied), the appliance control unit 213 outputs the request for acquisition of the appliance state information to the appliance 500 via the communication unit 202 and the network 20 (Step S305).

The mechanism control unit 501 of the appliance 500 receives the request for acquisition of the appliance state information from the verification server device 200 via the network 20, the communication unit 502 and the instruction receiving unit 506 (Step S305). Subsequently, the mechanism control unit 501 extracts, from the request for acquisition of the appliance state information, appliance information related to the target appliance, and acquires the appliance state information corresponding to the extracted appliance information from the mechanism 508 (Step S306). Subsequently, the mechanism control unit 501 transmits the acquired appliance state information to the verification server device 200 via the information notification unit 507, the communication unit 502 and the network 20 (Step S307).

The appliance control unit 213 of the verification server device 200 receives the appliance state information from the appliance 500 via the network 20 and the communication unit 202 (Step S307). Subsequently, the appliance control unit 213 generates a message including the appliance state information thus received (Step S308). Subsequently, the appliance control unit 213 transmits the message thus generated to the terminal device 300 via the communication unit 202 and the network 20 (Step S309).

The appliance operation presentation unit 907 of the terminal device 300 receives the message including the appliance state information from the verification server device 200 via the network 20 and the communication unit 302 (Step S309). Subsequently, the appliance operation presentation unit 907 outputs the received message to the display unit 309. The display unit 309 receives the message, and displays the received message (Step S310). Accordingly, the processing for acquisition of the appliance state information is terminated.

(7) Procedures for Processing related to Remote Control of Appliance 500

Figure 26:
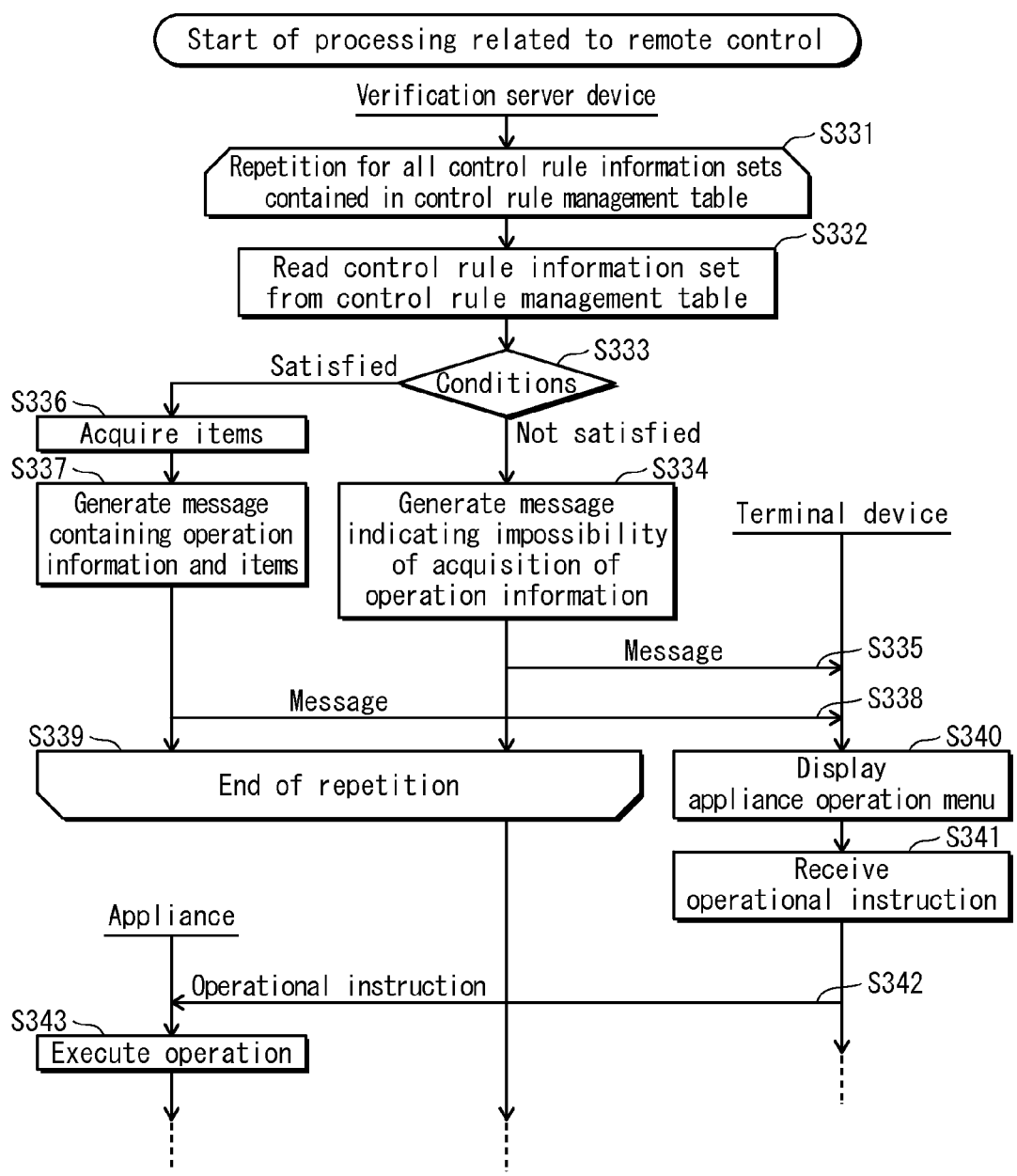
FIG. 26 is a sequence diagram showing procedures for remote control-related processing performed within the remote control system 10.

The following explains the procedures for the processing related to the remote control of the appliance, with reference to the flowchart shown in FIG. 26. Note that the following description of the procedures for the processing related to the remote control of the appliance 500 shows the details of Step S253 shown in FIG. 24.

The appliance control unit 213 repeats Steps S332 through S338 for all the control rule information sets contained in the control rule management table 281 (Steps S331 through S339).

The appliance control unit 213 reads one control rule information set from the control rule management table 281 (Step S332).

Subsequently, the appliance control unit 213 determines whether the current state of the verification server device 200 satisfies the conditions contained in the control rule information set thus read (Step S333).

When the current state of the verification server device 200 does not satisfy the read conditions (Step S333: Not satisfied), the appliance control unit 213 extracts the operation information from the read control rule information set, and generates a message indicating that it is impossible to acquire the operation information thus extracted (Step S334). Subsequently, the appliance control unit 213 transmits the message thus generated to the terminal device 300 via the communication unit 202 and the network 20 (Step S335).

When the current state of the verification server device 200 satisfies the read conditions (Step S333: Satisfied), the appliance control unit 213 extracts the operation information and the items from the read control rule information set (Step S336), and generates a message including the extracted operation information and items (Step S337). Subsequently, the appliance control unit 213 outputs the message thus generated to the appliance 500 via the communication unit 202 and the network 20 (Step S338).

The appliance operation presentation unit 907 of the terminal device 300 receives the message from the verification server device 200 via the network 20 and the communication unit 302 (Steps S335, S338).

Subsequently, using the received message, the appliance operation presentation unit 907 generates an appliance operation menu, and the display unit 309 displays the appliance operation menu (Step S340).

Subsequently, the input unit 310 of the terminal device 300 receives, from the user of the terminal device 300, an operational instruction with respect to the appliance 500 (Step S341). Subsequently, the control unit 301 transmits the operational instruction to the verification server device 200 via the communication unit 302 and the network 20. The appliance control unit 213 of the verification server device 200 transmits the operational instruction to the appliance 500 via the communication unit 202 and the network 20 (Step S342).

The mechanism control unit 501 of the appliance 500 receives a remote control instruction included in the operational instruction from the verification server device 200 via the network 20, the communication unit 502 and the instruction receiving unit 506 (Step S342). Subsequently, the mechanism control unit 501 controls the mechanism 508 according to the remote control instruction included in the operational instruction thus received. The mechanism 508 operates according to the remote control instruction included in the operational instruction (Step S343).

Then the operations related to the remote control of the appliance 500 are terminated.

(8) Procedures for Appliance Control Rule Change

Figure 27:
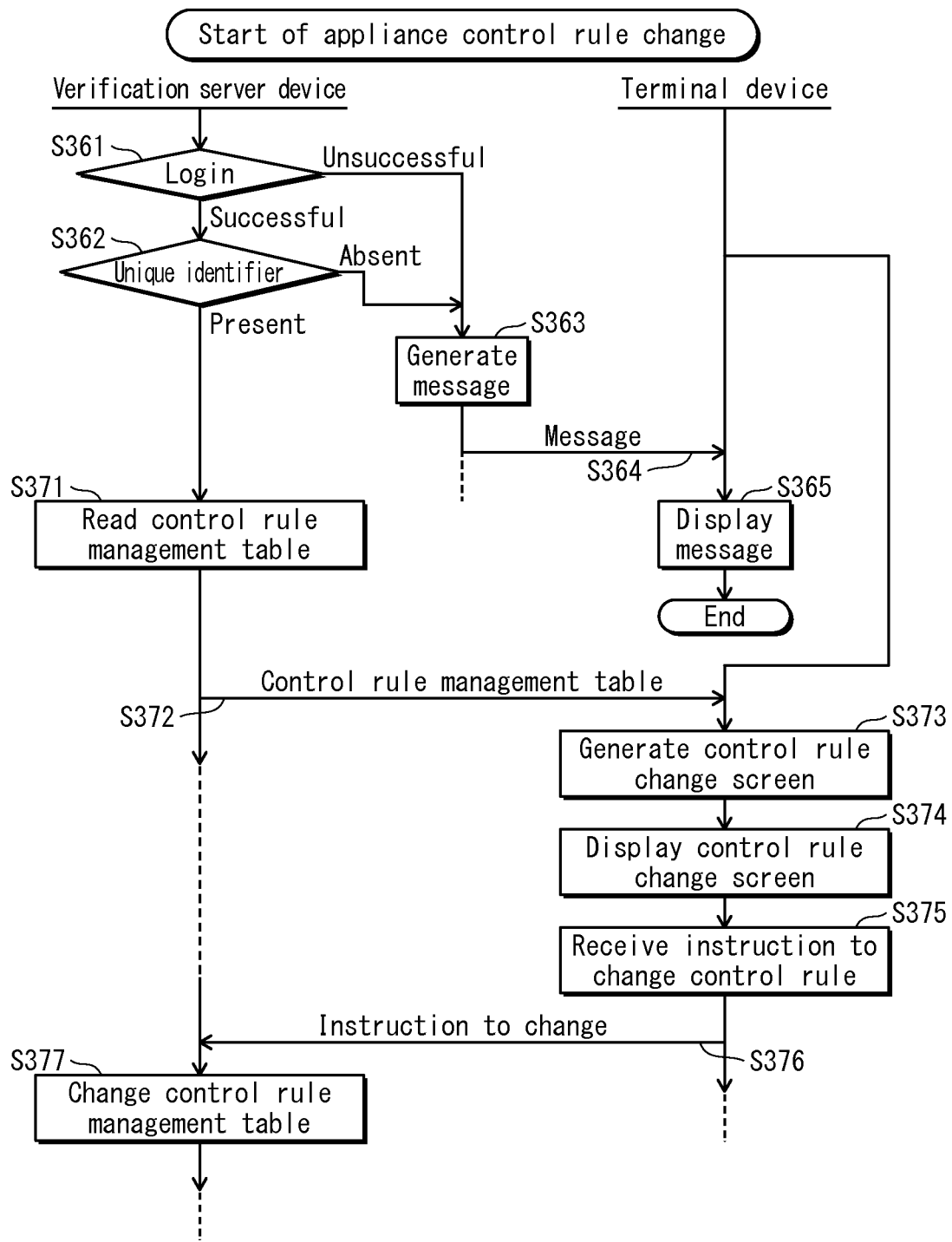
FIG. 27 is a sequence diagram showing procedures for appliance control rule change performed within the remote control system 10.

The following explains the procedures for changing the appliance control rule, with reference to the flowchart shown in FIG. 27. Note that the following description of the procedures for changing the appliance control rule shows the details of Step S254 shown in FIG. 24.

The appliance control unit 213 determines whether the user of the terminal device 300 is successfully logging in (Step S361).

When the user is not successfully logging in (Step S361: Unsuccessful), the appliance control unit 213 generates a message indicating that the user is not successfully logging in (Step S363). Subsequently, the appliance control unit 213 transmits the message thus generated to the terminal device 300 via the communication unit 202 and the network 20 (Step S364). The control unit 301 outputs to the display unit 309 a message indicating that the user is not successfully logging in. The display unit 309 displays the message (Step S365). Then, the processing of changing the appliance control rule is terminated.

When the user is successfully logging in (Step S361: Successful), the appliance control unit 213 determines whether the unique identifier has been acquired (Step S362). When the unique identifier has not been acquired (Step S362: Absent), the appliance control unit 213 generates a message indicating that the unique identifier has not been acquired (Step S363). Subsequently, the appliance control unit 213 transmits the message thus generated to the terminal device 300 via the communication unit 202 and the network 20 (Step S364). The control unit 301 outputs to the display unit 309 the message indicating that the unique identifier has not been acquired.

The display unit 309 displays the message (Step S365). Then, the processing of changing the appliance control rule is terminated.

When the unique identifier has been acquired (Step S362: Present), the appliance control unit 213 reads the control rule management table 281 from the appliance information storage unit 212 (Step S371). Subsequently, the appliance control unit 213 transmits the control rule management table thus read to the terminal device 300 via the communication unit 202 and the network 20 (Step S372).

The appliance control rule presentation unit 906 of the terminal device 300 receives the control rule management table from the verification server device 200 via the network 20 and the communication unit 302 (Step S372).

Subsequently, the appliance control rule presentation unit 906 generates the control rule change screen 361 by using the control rule management table thus received (Step S373). The display unit 309 displays the control rule change screen 361 (Step S374).

Subsequently, the input unit 310 receives an instruction to change the control rule. The appliance control rule acquisition unit 909 receives the instruction to change the control rule (Step S375). Subsequently, the appliance control rule acquisition unit 909 transmits the instruction to change the control rule to the verification server device 200 via the communication unit 302 and the network 20 (Step S376).

The appliance information management unit 217 receives the instruction to change the control rule from the terminal device 300 via the network 20 and the communication unit 202 (Step S376). Subsequently, the appliance information management unit 217 changes the control rule management table 281 stored in the appliance information storage unit 212 according to the received control change instruction (Step S377).

Then, the processing of changing the appliance control rule is terminated.

(9) Procedures for Mutual Authentication and Key Sharing

Figure 28:
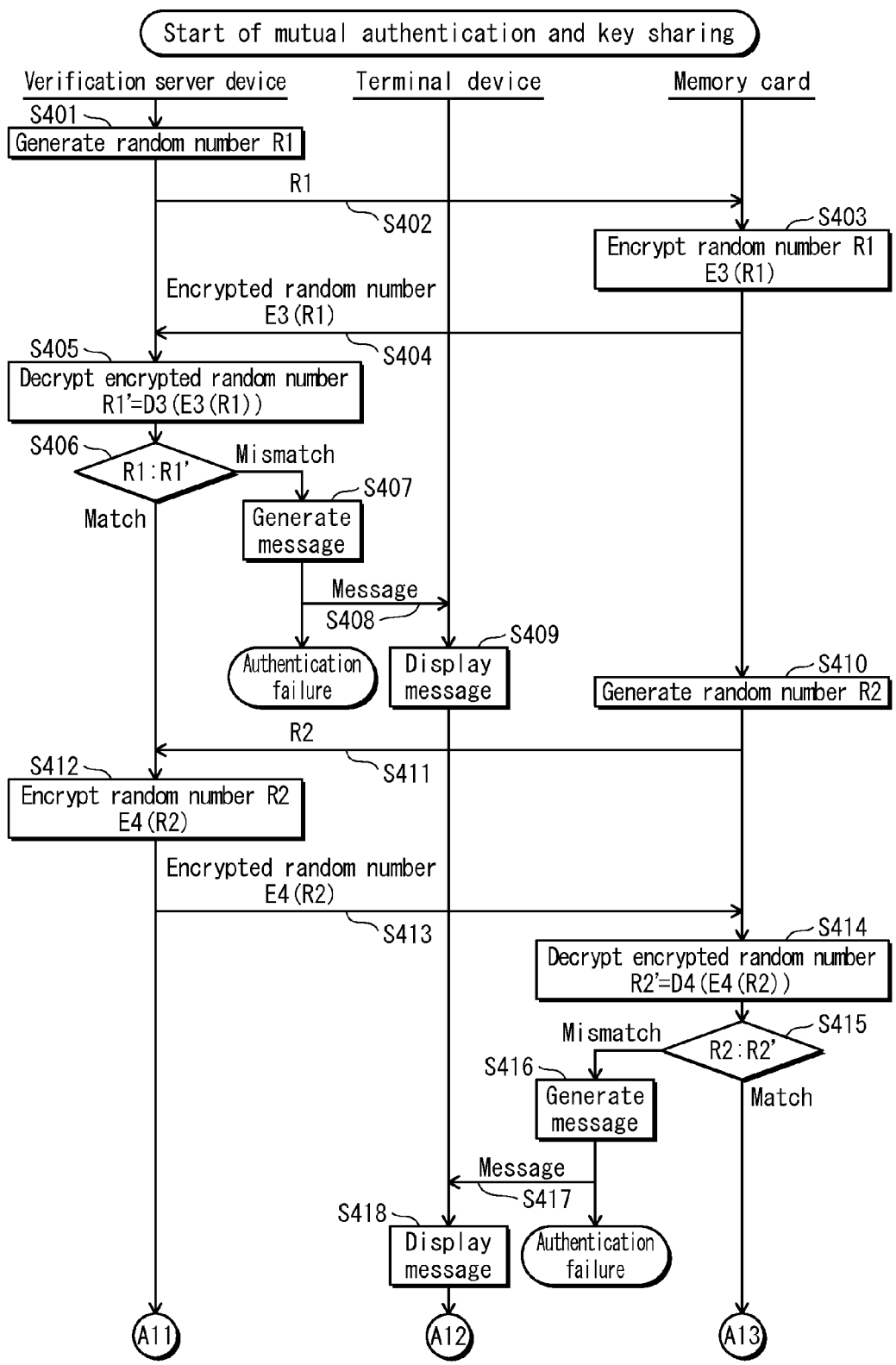
FIG. 28 is a sequence diagram (Part 1) showing procedures for mutual authentication and key sharing between the verification server 200 and the memory card 400 of the remote control system 10, followed by FIG. 29.
Figure 29:
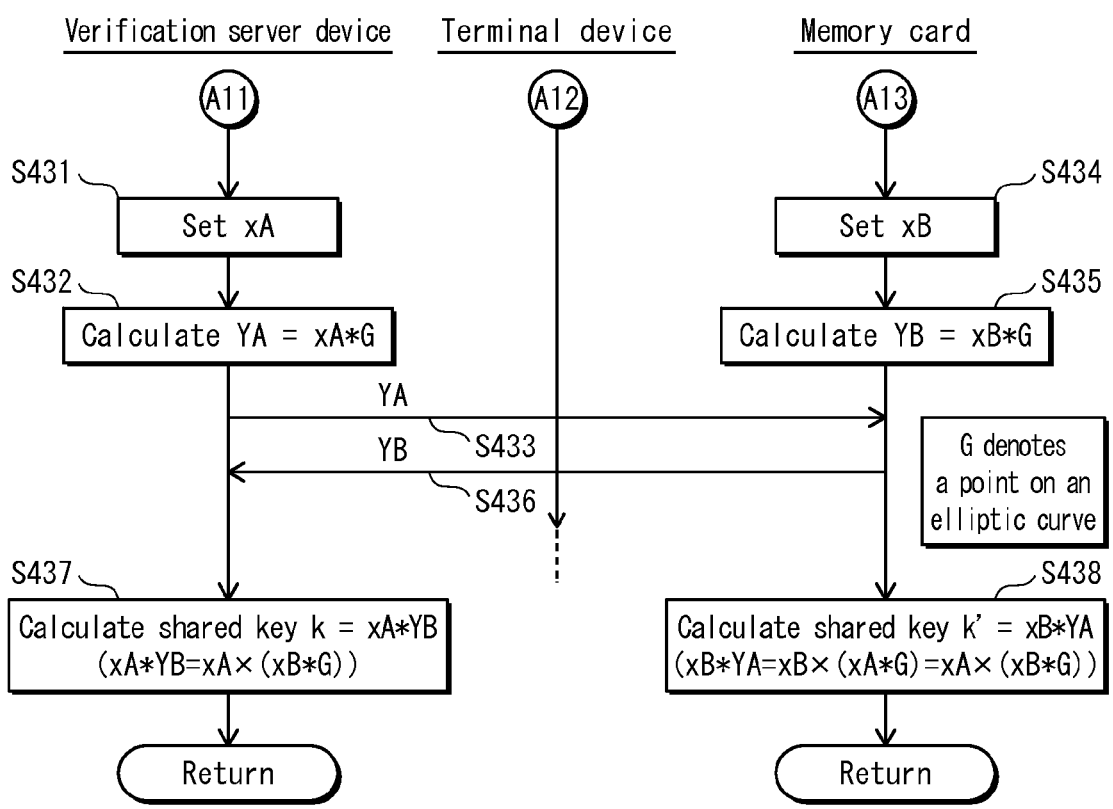
FIG. 29 is a sequence diagram (Part 2) showing procedures for mutual authentication and key sharing between the verification server 200 and the memory card 400 of the remote control system 10.
Figure 30:
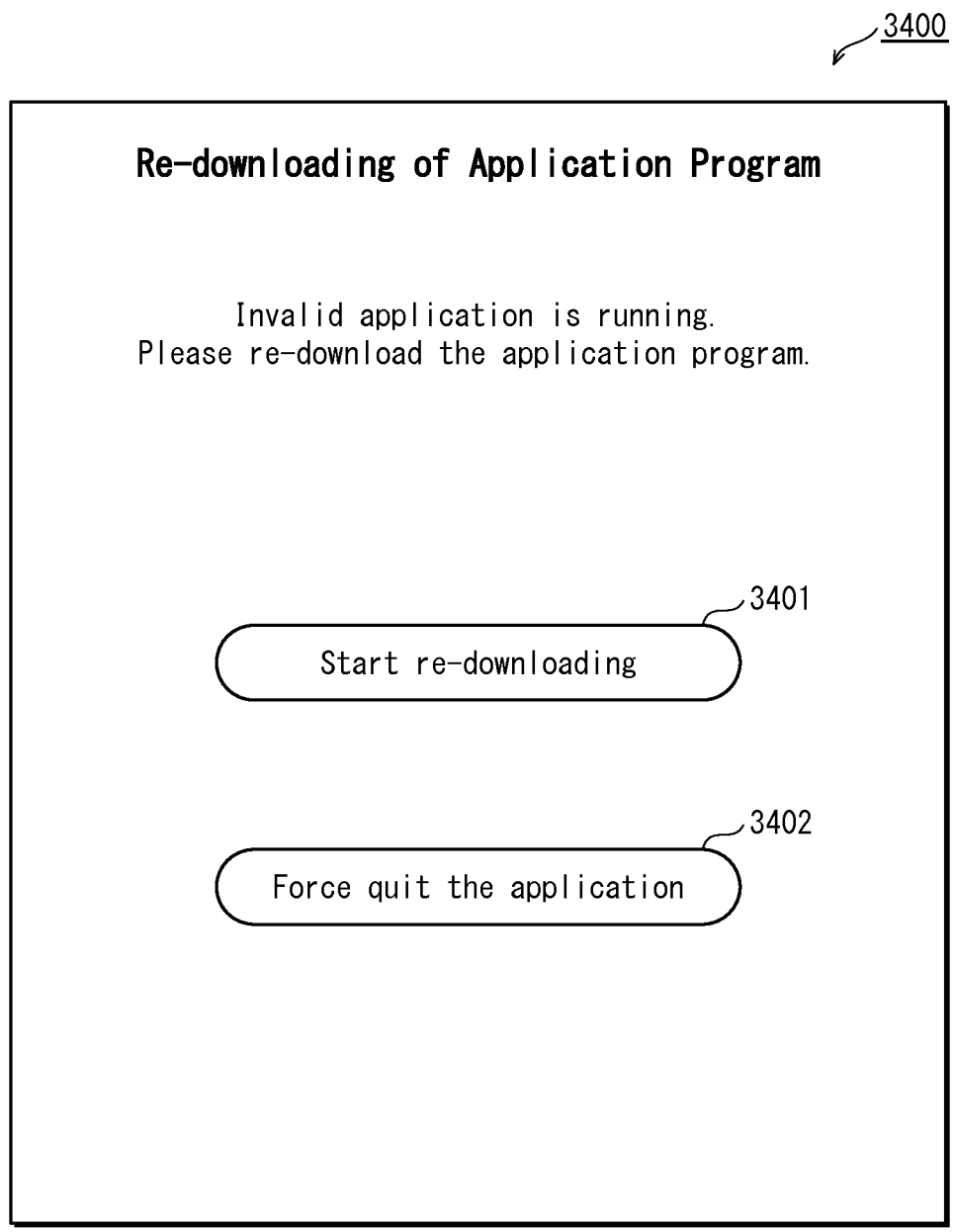
FIG. 30 shows an application program re-download instruction screen 3400 displayed on the terminal device 300 when an unauthorized program is detected.
Figure 31:
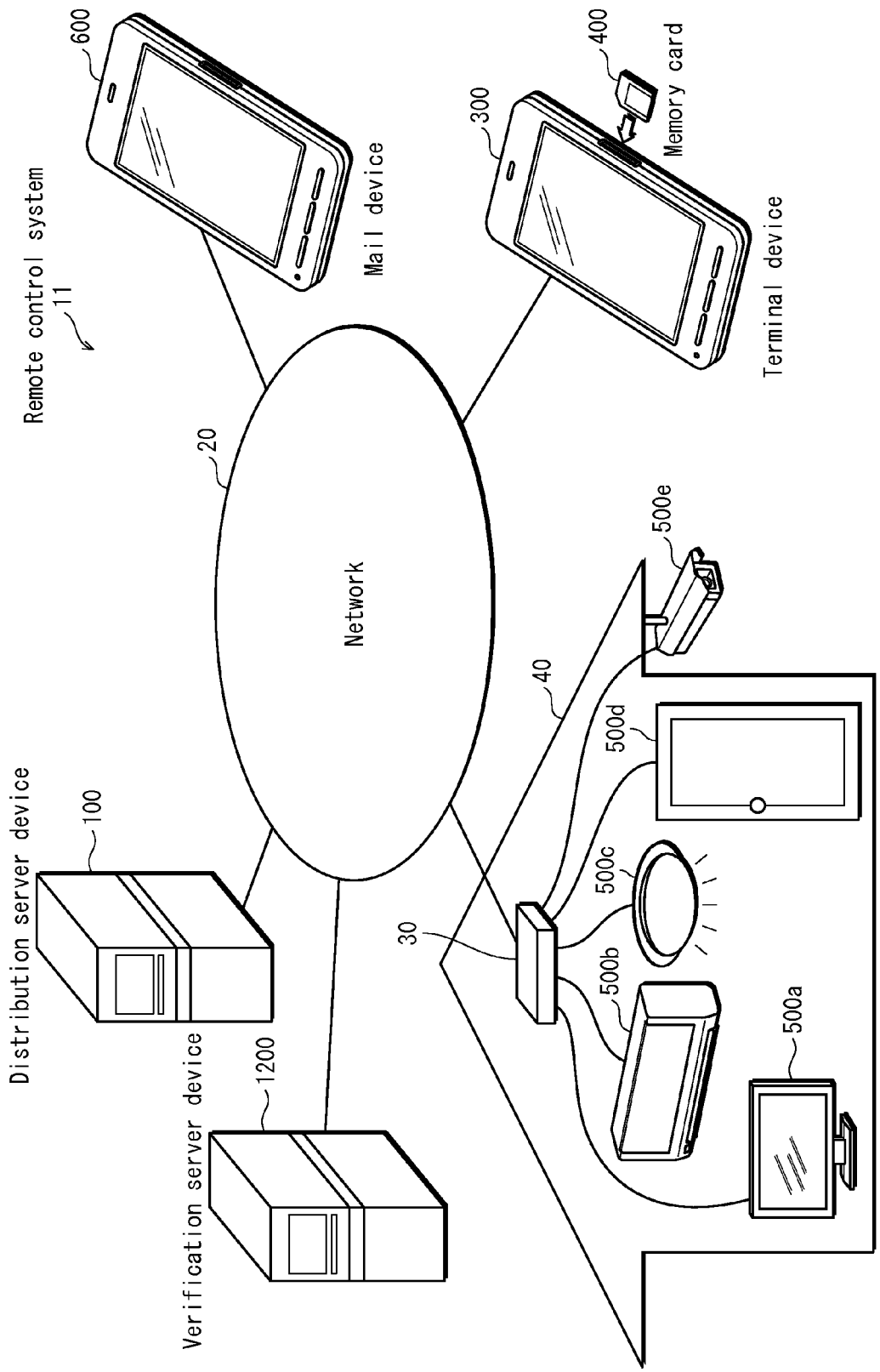
FIG. 31 shows the structure of a remote control system 11 as Embodiment 2 of the present invention.

The following describes procedures for mutual authentication and key sharing performed between the verification server device 200 and the memory card 400 with reference to the sequence diagram shown in FIG. 28 and FIG. 29.

The random number generator A10 generates a random number R1 (Step S401). Subsequently, the random number generator A10 transmits the generated random number R1 to the memory card 400 via the network 20 and the terminal device 300 (Step S402).

The encryptor B11 receives the random number R1 from the verification server device 200 (Step S402). Subsequently, using the system key Ksc, the encryptor B11 encrypts the random number R1 according to the encryption algorithm E3 to generate an encrypted random number E3(Ksc, R1) (Step S403). Subsequently, the encryptor B11 transmits the encrypted random number E3(Ksc, R1) thus generated to the verification server device 200 via the terminal device 300 and the network 20 (Step S404).

The decryptor A13 receives the encrypted random number E3(Ksc, R1) from the memory card 400 (Step S404). Subsequently, the decryptor A13 decrypts the received encrypted random number E3(Ksc, R1) according to a decryption algorithm D3 by using the system key Ksc, and thereby generates a plaintext R1'=D3(Ksc, E3(Ksc, R1)) (Step S405).

The random number comparer A12 compares the random number R1 with the plaintext R1' (Step S406). When the random number R1 does not match the plaintext R1' (Step S406: Mismatch), the mutual authentication unit 203 determines that the memory card 400 is invalid. The mutual authentication unit 203 generates a message indicating that (Step S407), and transmits the message thus generated to the terminal device 300 (Step S408). The terminal device 300 receives the message (Step S408), and the display unit 309 displays the message (Step S409). Then, the mutual authentication is terminated.

Subsequently, the random number generator B10 generates a random number R2 (Step S410). Subsequently, the random number generator B10 transmits the generated random number R2 to the verification server device 200 (Step S411).

When the random number R1 matches the plaintext R1' (Step S406: Match), the mutual authentication unit 203 determines that the other party is valid. The encryptor A14 receives the random number R2 from the other party (Step S411). Subsequently, using the system key Ksc, the encryptor A14 encrypts the random number R2 according to the encryption algorithm E4 to generate an encrypted random number E4(Ksc, R2) (Step S412), and transmits the encrypted random number E4(Ksc, R2) thus generated to the memory card 400 (Step S413).

The decryptor B13 receives the encrypted random number E4(Ksc, R2) from the verification server device 200 (Step S413). Subsequently, the decryptor B13 decrypts the received encrypted random number E4(Ksc, R2) according to a decryption algorithm D4 by using the system key Ksc, and thereby generates a plaintext R2'=D4(Ksc, E4(Ksc, R2)) (Step S414).

The random number comparer B14 compares the random number R2 with the plaintext R2' (Step S415). When the random number R2 does not match the plaintext R2' (Step S415: Mismatch), the mutual authentication unit 403 generates a message indicating that (Step S416). Subsequently, the mutual authentication unit 403 transmits the message thus generated to the terminal device 300 (Step S417). The terminal device 300 receives the message (Step S417), and the display unit 309 displays the message (Step S418). Then, the mutual authentication is terminated.

On the other hand, when the random number R2 matches the plaintext R2' (Step S415: Match), the mutual authentication unit 403 determines that the other party is valid.

When the authentication is successful (Step S406: Match), the key sharer A15 sets xA as a scalar value (Step S431). Subsequently, the key sharer A15 calculates YA=xA*G, which denotes a point on an elliptic curve (Step S432). G denotes a point on an elliptic curve. a*B denotes multiplication on an elliptic curve. Subsequently, the key sharer A15 transmits the point YA on the elliptic curve to the memory card 400 (Step S433).

When the authentication is successful (Step S415: Match), the key sharer B15 sets xB as a scalar value (Step S434). Subsequently, the key sharer B15 calculates YB=xB*G, which denotes a point on an elliptic curve (Step S435). Subsequently, the key sharer B15 transmits the point YB on the elliptic curve to the verification server device 200 (Step S436).

The key sharer A15 calculates a shared key k=xA*YB as a scalar value (Step S437).

The key sharer B15 calculates a shared key k=xB*YA as a scalar value (Step S438). Then, the mutual authentication and key sharing is terminated.

$$\text{Here, shared key } k = xA * YB$$
$$= xA \times (xB * G)$$

-continued $$= xB \times (xA * G)$$
$$= xB * YA$$
$$= \text{Shared key } k'.$$

Note that the same operations as described above are applied to the mutual authentication and key sharing between the verification server device 200 and the distribution server device 100, to the mutual authentication and key sharing between the verification server device 200 and the terminal device 300, and to the mutual authentication and key sharing between the distribution server device 100 and the terminal device 300. Therefore, explanations thereof are omitted.

<2. Embodiment 2>

<2.1 Outline>

A remote control system 11 pertaining to the present embodiment has the same structure as the remote control system 10 pertaining to Embodiment 1 except that a mail device 600 is additionally included in the remote control system 11.

The verification server device 1200 pertaining to the present embodiment is different from the verification server device 200 pertaining to Embodiment 1 in that the mail device 600 is notified when a control program 1331 being executed in the terminal device 300 is determined as not valid.

The mail device 600 receives mails sent to the mail addresses stored in the verification server device 1200 which have been registered in advance by a valid user. Specifically, the mail device 600 is, for example, a portable terminal such as a smartphone and a tablet, a mobile telephone, a personal computer or the like which belongs to the user.

When receiving a notification showing that the control program being executed in the terminal device 300 is not valid, the mail device stops the execution of the control program or makes an instruction to invalidate the unique ID of the memory card stored in the verification server device 1200 according to the user operation, for example.

This allows the valid user to prevent unauthorized execution of the control program from another terminal device.

The following explains the remote control system 11 pertaining to the present embodiment. To simplify the explanation, the same reference signs are given to the same components as the components of the remote control system 10 pertaining to Embodiment 1. The same components as the Embodiment 1 already explained above are omitted here, and the following focuses on the differences.

<2.2 Structure>

(Verification Server Device 1200)

Figure 32:
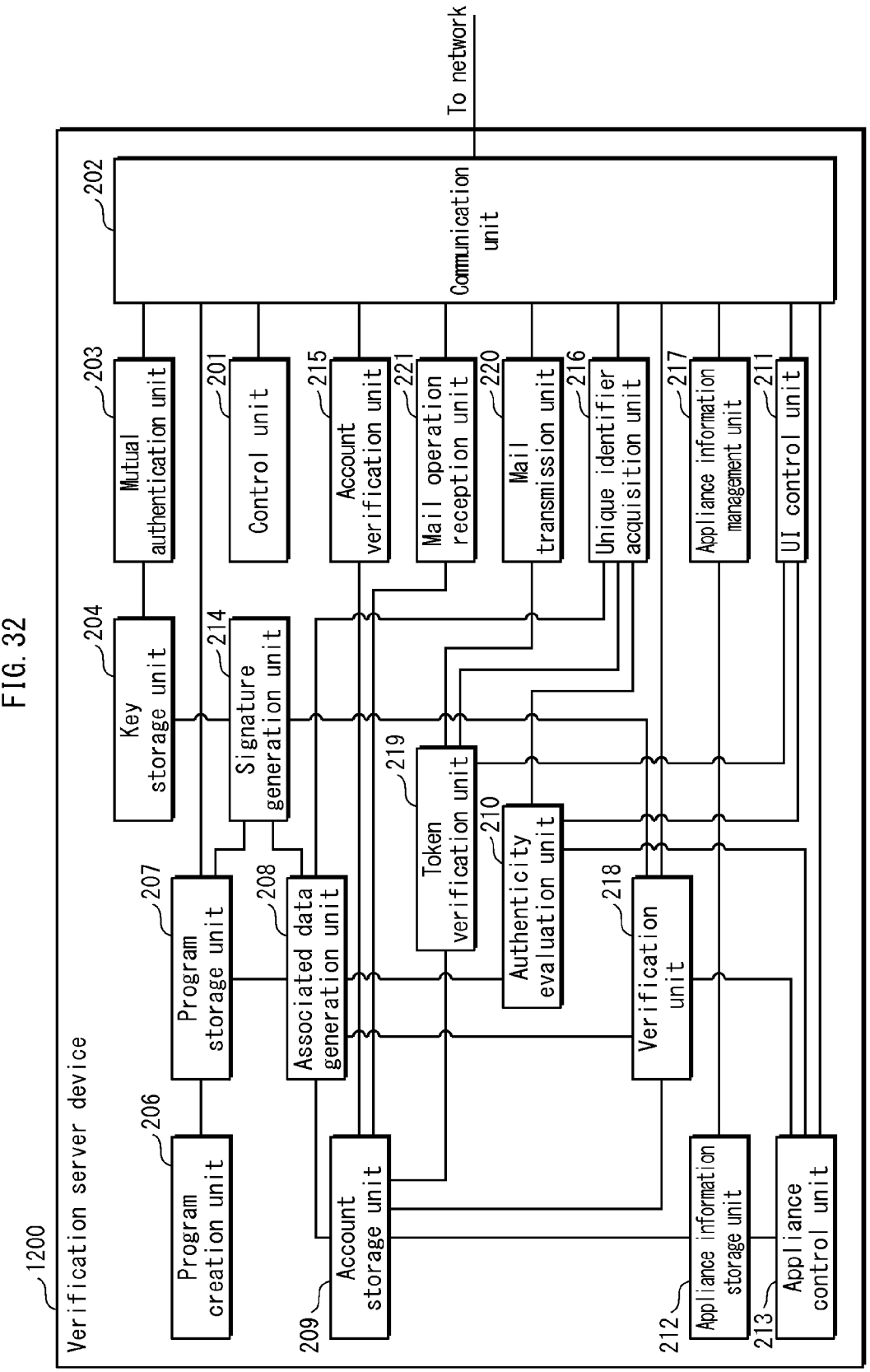
FIG. 32 is a block diagram showing the structure of a verification server 1200.

FIG. 32 is a functional block diagram showing principal components of the verification server device 1200.

The verification server device 1200 includes a UI (User Interface) control unit 211, a token verification unit 219, a mail transmission unit 220 and a mail operation reception unit 221, in addition to the components of the verification server device 200.

The user interface control unit 211 has a function to generate a UI for receiving an operational instruction from the mail device 600 at the destination of the mail, and a UI for receiving an operational instruction from the terminal device 300.

The token verification unit 219 has a function to determine whether the memory card 400 is attached to the terminal device 300 according to information output by the token verification unit 912 of the terminal device 300 and received via the communication unit 202. The information indicates whether the memory card 400 is attached to the terminal device 300 or not.

The token verification unit 912 has a function to, when determining that the memory card 400 is not attached, instructs the mail transmission unit 220 to transmit a mail to the mail address registered in the account management table 1261 (described later in detail) managed by an account generation management unit 209. The token verification unit 912 also has a function to instruct the user interface control unit 211 to display, on the display unit 620 of the mail device 600 at the destination of the mail, a UI for receiving the operational instruction from the mail device 600.

Note that the token in the present embodiment is a device used for identifying the user, and it specifically is a memory card for storing the unique identifier.

The mail transmission unit 220 has a function to transmit a mail to the mail device 600 via the communication unit 202 according to an instruction from the token verification unit 219. Note that the mail thus transmitted contains an URL (Uniform Resource Locator) showing the address of the UI, which is generated by the user interface control unit 211 and used for receiving the operational instruction from the user.

The mail operation reception unit 221 has a function to receive an instruction from the user, whose uses the mail device 600 according to the mail transmitted by the mail transmission unit 220, via the communication unit 202. The mail operation reception unit 221 also has a function to output the instruction from the user thus received to the account generation management unit 209.

Note that the functions of the token verification unit 219, the mail transmission unit 220 and the mail operation reception unit 221 described above are realized by the CPU of the verification server device 1200 executing their corresponding programs.

(Mail Device 600)

Figure 33:
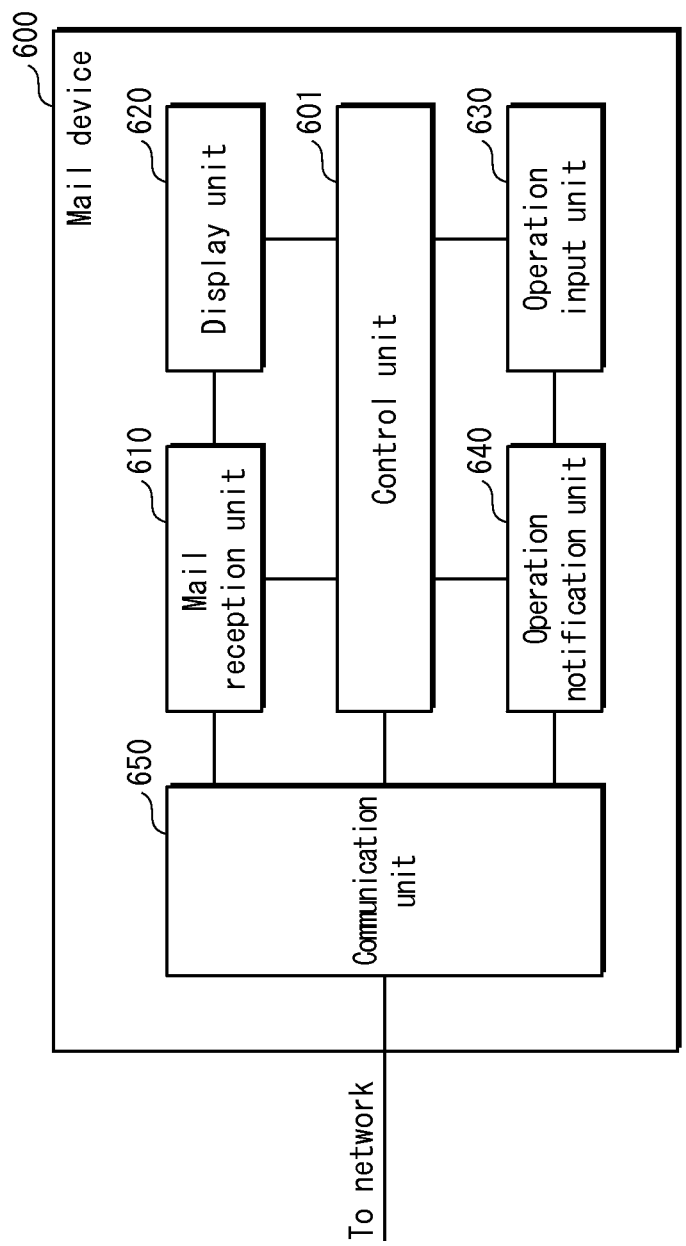
FIG. 33 is a block diagram showing the structure of a mail device 600.

FIG. 33 is a functional block diagram showing principal components of the verification server device 600.

The mail device 600 includes a control unit 601, a mail reception unit 610, a display unit 620, an operation input unit 630, an operation notification unit 640, and a communication unit 650.

The control unit 601 has a function to control the respective functions of the mail reception unit 610, the display unit 620, the operation input unit 630, the operation notification unit 640, and the communication unit 650.

The mail reception unit 610 has a function to receive the mail from the mail transmission unit 220 of the verification server device 1200 via the communication unit 650, and to output the contents of the mail to the display unit 620.

The display unit 620 includes a display such as an LCD (Liquid Crystal Display), and has a function to show the contents of the mail output by the mail reception unit 610 on the display. The display unit 620 also has a function to show the UI generated by the user interface control unit 211 of the verification server device 1200 on the display.

The operation input unit 630 includes a touchpad or a keyboard, for example, and has a function to receive a user operation input to the UI displayed on the display of the display unit 620.

The operation notification unit 640 has a function to output the user operation from the operation input unit 630 to the mail operation reception unit 221 of the verification server device 1200 via the communication unit 650.

The communication unit 650 includes an LSI (Large Scale Integration) for communications, and has a function to transmit, to the network, the information output by the operation notification unit 640, which shows the operation input by the user. The communication unit 650 also has a function to receive the mail from the verification server device 1200 via the network and to output the mail to the mail reception unit 610. The communication unit 650 also has a function to transmit or receive information of the URL via the network.

Note that the respective functions of the control unit 601, the mail reception unit 610, the display unit 620, the operation input unit 630 and the operation notification unit 640 are realized by the CPU of the mail device 600 executing their corresponding programs.

(Terminal Device 300)

Figure 34:
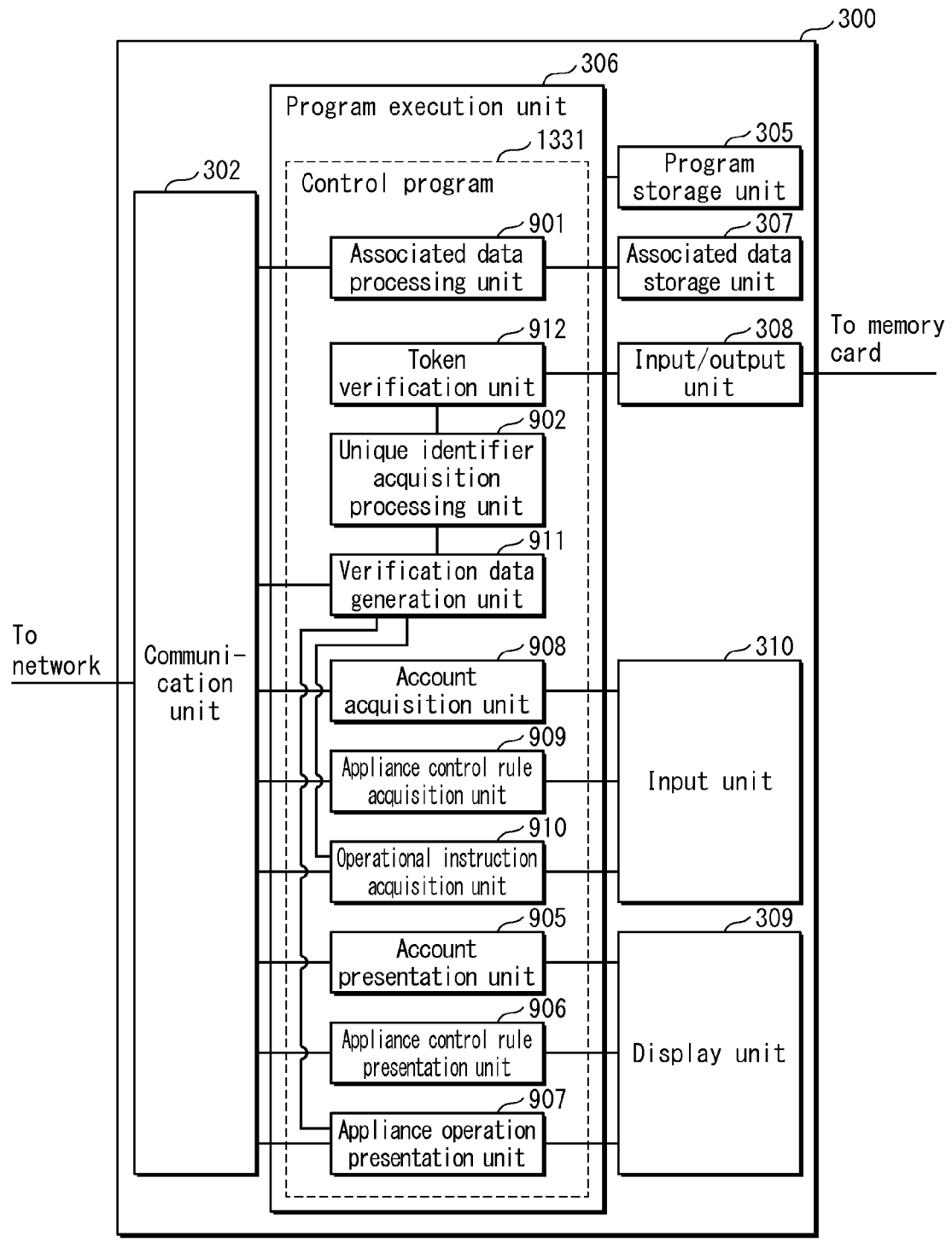
FIG. 34 shows a functional structure of a control program 1331 that runs in the terminal device 300.

FIG. 34 is a functional block diagram showing principal components of the terminal device 300 and the control program 1331.

The structure of the terminal device 300 pertaining to the present embodiment is the same as the terminal device 300 pertaining to Embodiment 1. However, there are different in the control program executed by the program execution unit 306.

The control program executed by the program execution unit 306 of the terminal device 300 pertaining to the present embodiment additionally includes the token verification unit 912 when compared with the control program 331 executed by the program execution unit 306 of the terminal device 300 pertaining to Embodiment 1.

The token verification unit 912 has a function to repeatedly determine whether the memory card 400 is attached the terminal device 300 at predetermined intervals (e.g. 250 ms) during the execution of the control program 1331. The token verification unit 912 also has a function to, when determining that the memory card 400 is not attached, output the information indicating that to the token verification unit 219 of the verification server device 1200 via the unique identifier acquisition processing unit 902 and the communication unit 302.

<2.3 Data Structure>

(Account Management Table 1261)

FIG. 35 shows the data structure of the account management table 1261 and example contents thereof.

Compared with the account management table 261, the account management table 1261 additionally includes an E-mail address as an item of the account information set.

The example contents of the account information set 1262 shown in the drawing correspond to the example contents of the account information set 262 of the account management table 261. Similarly, the user identifier 1263, the password 1264, the time-varying parameter 1265 and the unique identifier 1266 respectively correspond to the user identifier 263, the password 264, the time-varying parameter 265 and the unique identifier 266. The example in the drawing shows the value of the E-mail address 1267 associated with the account information set 1262 including the user identifier 1263 having the value "SATO" is "sato@example1.com".

That is, when the user has the user identifier 1263 having the value "SATO", the E-mail is sent to "sato@example1.com".

<2.4 Operations>

<2.4.1 Processing for Token Verification performed by Terminal Device 300>

Figure 36:
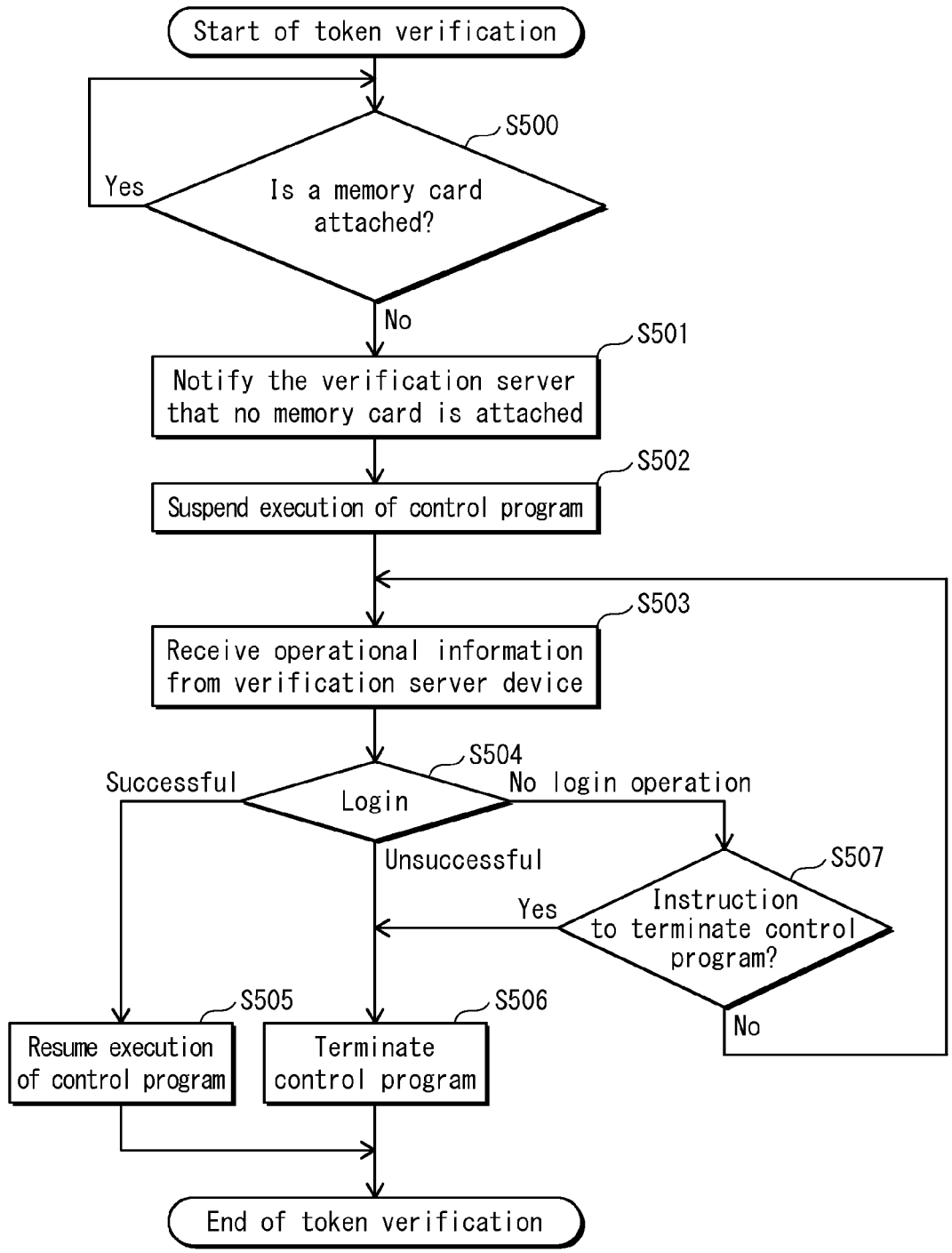
FIG. 36 is a flowchart showing procedures for token verification performed by the terminal device 300.

FIG. 36 is a flowchart showing the processing for the token verification.

The token verification is performed by the token verification unit 912 during the execution of the control program 1331 by the program execution unit 306 of the terminal device 300.

Note that the token verification is interruption processing performed at predetermined intervals (e.g. 250 ms) during the execution of the control program 1331.

The token verification unit 912 determines whether the memory card 400 is attached to the input/output unit 308 (Step S500). Specifically, the input/output unit 308 has an insertion slot provided with a mechanical switch that indicates ON when the memory card 400 is in the slot and indicates OFF when the memory card 400 is not in the slot. The token verification unit 912 determines whether the memory card 400 is attached or not according to whether the switch indicates "ON" or "OFF".

When determining that the memory card 400 is attached (Step S500: Yes), the token verification unit 912 waits for the subsequent interruption processing.

When determining that the memory card 400 is not attached (Step S500: No), the token verification unit 912 transmits information indicating that the memory card 400 is not attached, to the token verification unit 219 of the verification server device 1200 via the communication unit 302 (Step S501).

Then the token verification unit 219 puts the control program 1331 in the waiting state, and thereby causes the program execution unit 306 to suspend the execution of the control program 1331 (Step S502).

Subsequently, the token verification unit 912 receives operational information from the verification server device 1200 (Step S503). The operational information indicates the operational instruction input by the user from the mail device 600 to the verification server device 1200. The operational instruction input by the user from the mail device 600 will be described later.

When the operational information thus received indicates that the login to the verification server device 1200 has been successful (Step S504: Successful), the token verification unit 912 causes the program execution unit 306 to resume the execution of the control program 1331 which has been suspended (Step: S505).

When the received operational information indicates that the logging to the verification server device 1200 has been unsuccessful (login failure) (Step S504: Unsuccessful), the token verification unit 912 causes the program execution unit 306 to terminate the execution of the control program 1331 (Step S506).

When the received operational information is not related to the login (Step S504: No login operation), the token verification unit 912 determines whether the received operational information is an instruction to terminate the control program 1331 (Step S507).

When the received operational information is the instruction to terminate the control program 1331 (Step S507), the token verification unit 912 performs Step S506 in the same manner as when it is determined that the login has been unsuccessful at Step S504.

When Step S507 is "No", the token verification unit 912 returns to Step S503, and waits for the operational information from the verification server device 1200.

<2.4.2 Token Verification Performed by Verification Server Device 1200>

Figure 37:
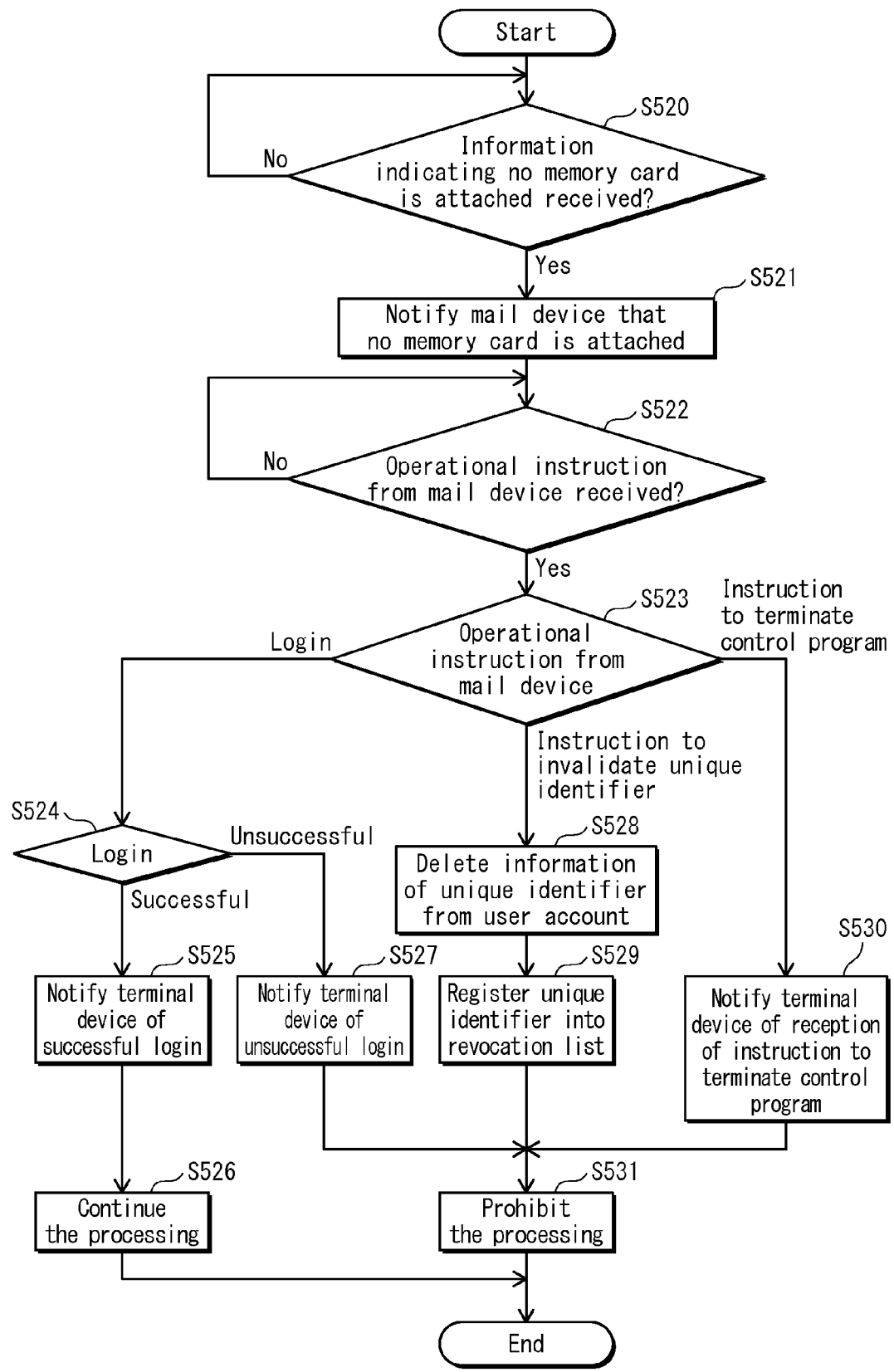
FIG. 37 is a flowchart showing procedures for processing related to the token verification, performed by the terminal device 1200.

FIG. 37 is a flowchart showing the processing for the token verification performed by the verification server device 1200.

The token verification unit 219 determines whether it has received information indicating that the memory card 400 is not attached from the token verification unit 912 of the terminal device 300 (Step S520). When not receiving the information, the token verification unit 219 waits for the information (Step S520: No).

When the token verification unit 219 receives the information indicating that the memory card 400 is not attached (Step S520: Yes), the mail transmission unit 220 creates an E-mail containing information indicating that the memory card 400 is not attached and the URL generated by the user interface control unit 211. The URL generated by the user interface control unit 211 indicates the address of the UI for receiving an operational instruction from the user. The mail transmission unit 220 transmits the created E-mail to the E-mail address shown in the account management table 1261 managed by the account generation management unit 209 (Step S521). Note that the user receives this E-mail by using the mail device 600.

The operational instruction that the user provides by accessing the URL will be described in "Processing of Operational Instruction Performed by Mail Device 600" below.

Subsequently, the mail operation reception unit 221 waits for the operational instruction from the mail device 600 (Step S522: No). When receiving the operational instruction from the mail device 600 (Step S522: Yes), the mail operation reception unit 221 determines the details of the operational instruction (Step S523).

Specifically, the mail operation reception unit 221 determines whether the operational instruction is the instruction to log in the verification server device 1200, the instruction to invalidate the unique identifier, or the instruction to terminate the control program 1331.

When the operational instruction received from the mail device 600 is the instruction to log in the verification server device 1200 (Step S523: Login), the account generation management unit 209 of the verification server device 1200 performs login authentication to determine whether the user ID and the password input by the user are valid by comparing them with the information stored in the account management table 1261 (Step S524). When the login authentication is successful (Step S524: Successful), the account generation management unit 209 transmits information indicating that the login has been successful to the terminal device 300 via the communication unit 202 (Step S525), and continues the processing for the remote control (Step S526).

When the login authentication is unsuccessful (Step S524: Unsuccessful), the account generation management unit 209 transmits information indicating that the login has failed to the terminal device 300 via the communication unit 202 (Step S527), and the appliance control unit 213 is prohibited from performing the remote control of the appliance 500 even when receiving the remote control instruction from the terminal device 300 (Step S531).

When the operational instruction from the mail device 600 is the instruction to invalidate the unique identifier (Step S523: Instruction to invalidate the unique identifier), the account generation management unit 209 deletes, from the account management table 1261, the unique identifier 1266 associated with the user identifier 1263 indicating the corresponding user (Step S528). Specifically, when the value of the user identifier 1263 is "SATO" for example, the account generation management unit 209 deletes "8DA4" as the value of the unique identifier 1266, and writes "−1" as the value of the unique identifier 1266. According to the present embodiment, when the value of the unique identifier 1266 is "−1", it denotes that no unique identifier is registered.

Furthermore, the account generation management unit 209 registers the unique identifier thus deleted into a revocation list (Step S529). Note that the revocation list is a list of invalid unique identifiers. When the remote control instruction is made by a terminal device to which a memory card having any of the unique identifiers registered in this list, the instruction is regarded as an instruction from an invalid terminal device so that the remote control is not performed.

Then, the appliance control unit 213 performs Step S531 in the same manner as when the login is unsuccessful.

When the operational instruction from the mail device 600 is an instruction to terminate the control program 1331 (Step S523: Instruction to terminate the control program), the account generation management unit 209 transmits an instruction to terminate the control program 1331, which is being executed, to the terminal device 300 via the communication unit 202 (Step S530).

Then, the appliance control unit 213 performs Step S531 in the same manner as when the login is unsuccessful.

<2.4.3 Operational Instruction Processing Performed by Mail Device 600>

Figure 38:
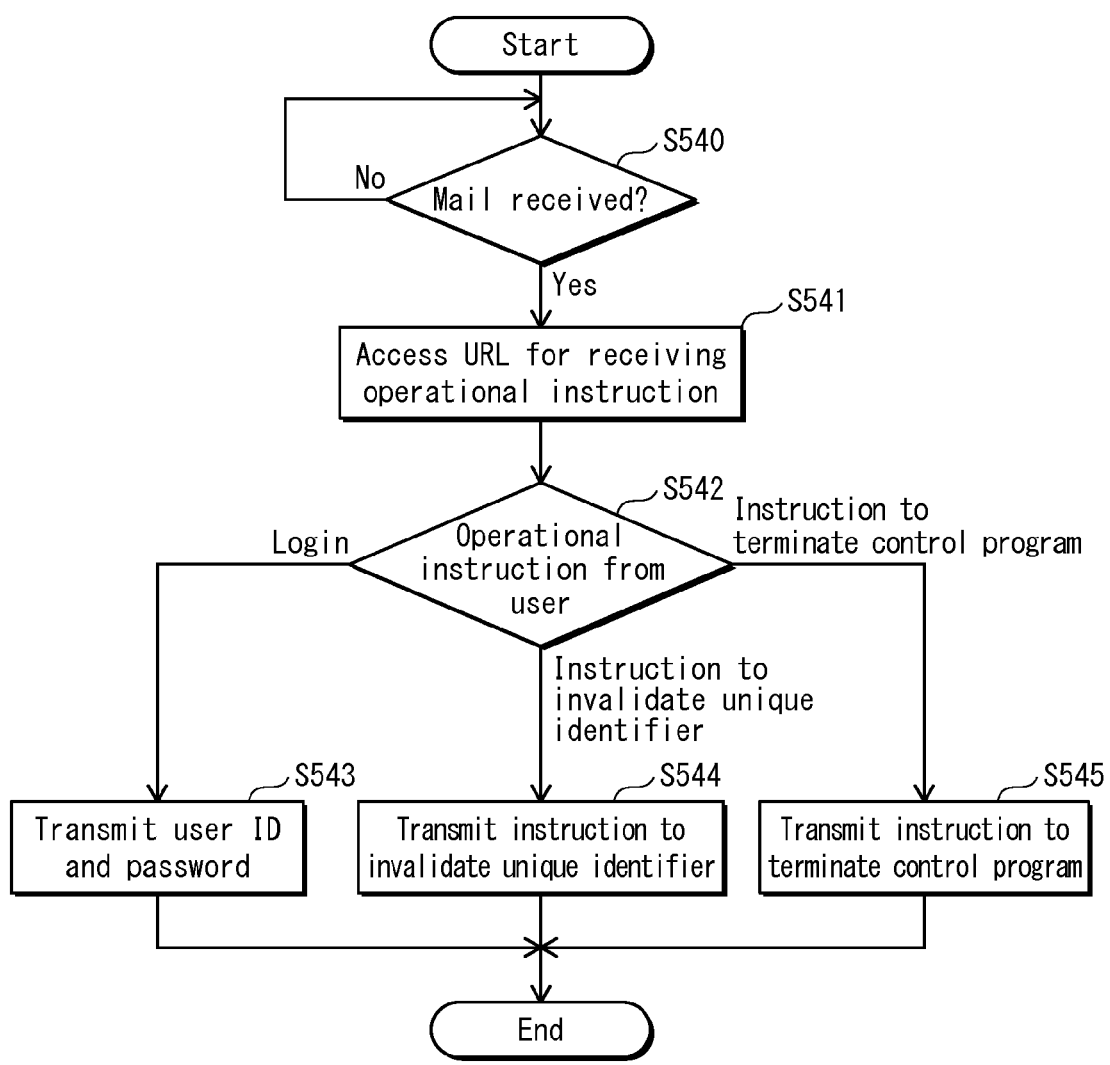
FIG. 38 is a flowchart showing procedures for operational instruction processing performed by the mail device 600.

FIG. 38 is a flowchart showing the operational instruction processing performed by the mail device 600.

This processing is performed when the mail device 600 receives, from the verification server device 1200, the mail indicating that no memory card is attached to the terminal device 300.

First, the mail reception unit 610 of the mail device 600 waits for the mail transmitted by the verification server device 1200 at Step S521 shown in FIG. 37 (Step S540: No).

When the mail reception unit 610 receives the mail from the verification server device 1200 (Step S540: Yes), the display unit 620 displays the contents of the mail on the display of the display unit 620 according to the operation by the user. When the user performs an operation for accessing the URL described in the received mail, the control unit 601 accesses the URL, and the display unit 620 displays the UI for receiving the operational instruction according to the URL (Step S541).

Figure 39:
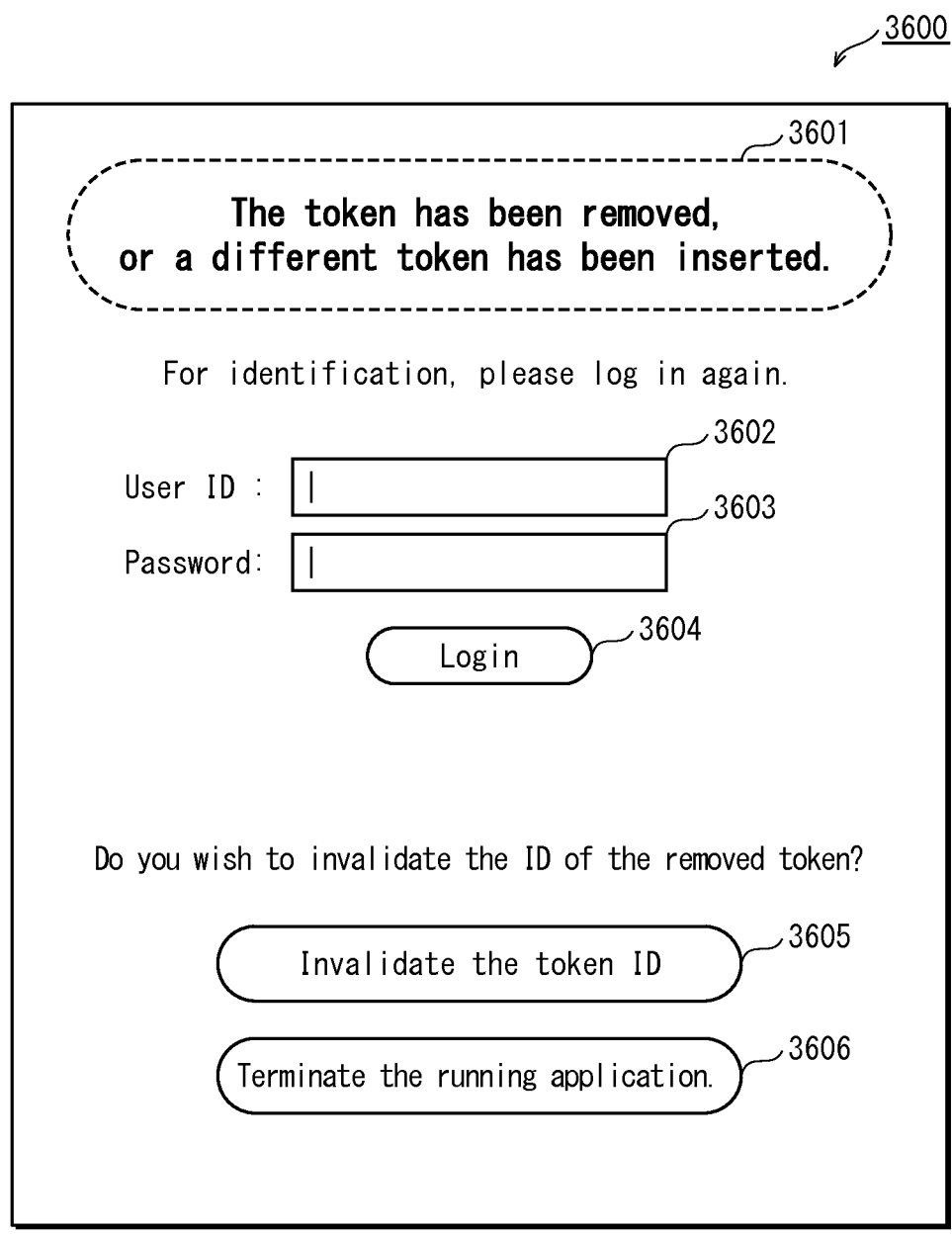
FIG. 39 shows an example of a user interface (UI) for receiving operational instructions, displayed on the mail device 600 when the token is not normal.

FIG. 39 shows an example UI displayed on the display of the display unit 620, which is used for receiving an operational instruction. The UI for receiving the operational instruction is composed of HTML (HyperText Markup Language), for example. The UI is displayed when the user accesses the URL specified in the received mail by using an internet browser of the mail device 600. The user inputs operational instructions from this UI. For example, from UI 3600 shown in FIG. 39, the user can input either one of the following operational instructions: login to the verification server device 1200; invalidation of the ID of the token; and termination of the control program that is being executed. The display area 3601 of the UI 3600 shows a message saying that a valid memory card is not attached to the terminal device 300.

Subsequently, the control unit 601 determines whether the operation input unit has received an operational instruction from the user (Step S542). Specifically, the control unit 601 determines whether the operational instruction from the user is the instruction to log in the verification server device 1200, the instruction to invalidate the unique identifier, or the instruction to terminate the control program.

When logging into the verification server device 1200, the user inputs his/her user ID to the user ID field 3602, inputs his/her password into the password field 3603, and touches on the login button 3604, thereby making the operational instruction for login.

When making the operational instruction for invalidating the token ID, the user touches on the button 3605 labelled with "Invalidate the token ID".

When making the operational instruction for terminating the control program 1331 that is being executed in the terminal device 300, the user touches on the button 3606 labelled with "Terminate the running application".

For example, on the UI 3600 shown in FIG. 39, when the user touches on the login button 3604, the control unit 601 determines that the operational instruction is made for the login. When the user touches on the button 3605, the control unit 601 determines that the operational instruction is made for the invalidation of the unique identifier. When the user touches on the button 3606, the control unit 601 determines that the operational instruction is made for the termination of the control program 1331.

When the control unit 601 determines that the operational instruction from the user is made for the login (Step S543: Login), the operation notification unit 640 transmits the user ID and the password received by the operation input unit 630 to the verification server device 1200 via the communication unit 650 (Step S544).

When the control unit 601 determines that the operational instruction from the user is the instruction to invalidate the unique identifier (Step S543: Instruction to invalidate the unique identifier), the operation notification unit 640 transmits the operational instruction for the invalidation of the unique identifier to the verification server device 1200 via the communication unit 650 (Step S545).

When the control unit 601 determines that the operational instruction from the user is the instruction to terminate the control program 1331 (Step S543: Instruction to terminate the control program), the operation notification unit 640 transmits the operational instruction for the termination of the control program 1331 to the verification server device 1200 via the communication unit 650 (Step S546).

<2.5 Conclusion>

As described above, when an invalid memory card is used or when the terminal device is used without a memory card for example, the remote control system 11 pertaining to the present embodiment determines such an operation as an unauthorized operation, and sends a mail to the mail address registered in advance by an authorized user to notify the user. Based on this notification, the authorized user can invalidate the unique identifier of the invalid memory card or terminate the remote control program that is running by using the mail device belonging to the user.

<3. Modifications>

A remote control system pertaining to the present invention has been described above based on the embodiments. However, the present invention may be modified in the following manner, and should not be limited to the embodiments described above.

(1) In the embodiments described above, one example of the memory card is an SD card. However, the memory card is not necessarily an SD card. Any devices that can store the unique identifier may be used instead of an SD card. For example, a portable medium other than a SD card, a hard disk device, or a built-in memory device may be used.

The memory card and the portable medium are not necessarily designed to be inserted into the slot of the terminal device 300. For example, the memory card and the portable device may be capable of performing non-contact communication such as near field communication with the terminal device 300 when they are located near the terminal device 300. If this is the case, the determination is performed on whether the communication is normally performed or not, instead of whether the memory card is inserted in the slot or not.

Instead of the memory card and the portable medium, a portable terminal device storing the unique identifier may be used.

In Embodiment 2, it is assumed that the token is a memory card. However, the token is not necessarily a memory card. The token may be a device or a recording medium storing the unique identifier described above, or a device that generates the unique identifier, such as a one-time password generator.

(2) In Embodiment 2, the determination on whether the memory card 400 is attached or not is performed by using a mechanical switch. However, the determination as to the memory card 400 is not necessarily performed in this way. It suffices if it is possible to determine whether the memory card 400 and the terminal device 300 are connected with each other. For example, the unique identifier acquisition processing unit 219 may make a request to read the unique identifier. When successfully acquiring the unique identifier from the memory card 400, the unique identifier acquisition processing unit 219 determines that the memory card 400 is attached, and otherwise determines that the memory card 400 is not attached.

In this way, the token verification unit 219 may determine that the memory card 400 is not attached to the terminal device 300 not only when the memory card 400 is physically not attached to the terminal device 300, but also when the terminal device 300 cannot read the unique identifier from the memory card 400.

(3) In Embodiment 2, it is assumed that the mail device 600 and the terminal device 300 are separate devices. However, the terminal device 300 may have the functions of the mail device 600. That is, the mail device 600 and the terminal device 300 may be integrated as one device.

If this is the case, when the authorized user attempts to perform the remote control from the terminal device 300 that is invalid, the terminal device 300 receives a mail notifying an unauthorized operation. Therefore, even when the memory card has been replaced or removed before the authorized user recognizes it, the authorized user will be notified of the abnormality of the memory card or the control program, and hence the user can invalidate the unique identifier of the memory card or terminate the execution of the control program.

(4) In Embodiment 2, the UI 3600 shown in FIG. 39, which is used for encouraging the user to re-log in the system, is explained as an example UI from which the user using the mail device 600 makes an operational instruction when it is determined that the memory card in use is not valid. However, the UI is not limited to this example. Any UI suffices if it enables the user to input an instruction to prevent the operations of the running control program. For example, UI 3700 shown in FIG. 40 may be used.

The UI 3700 includes a message display area 3701, a button 3702 and a button 3703.

Figure 40:
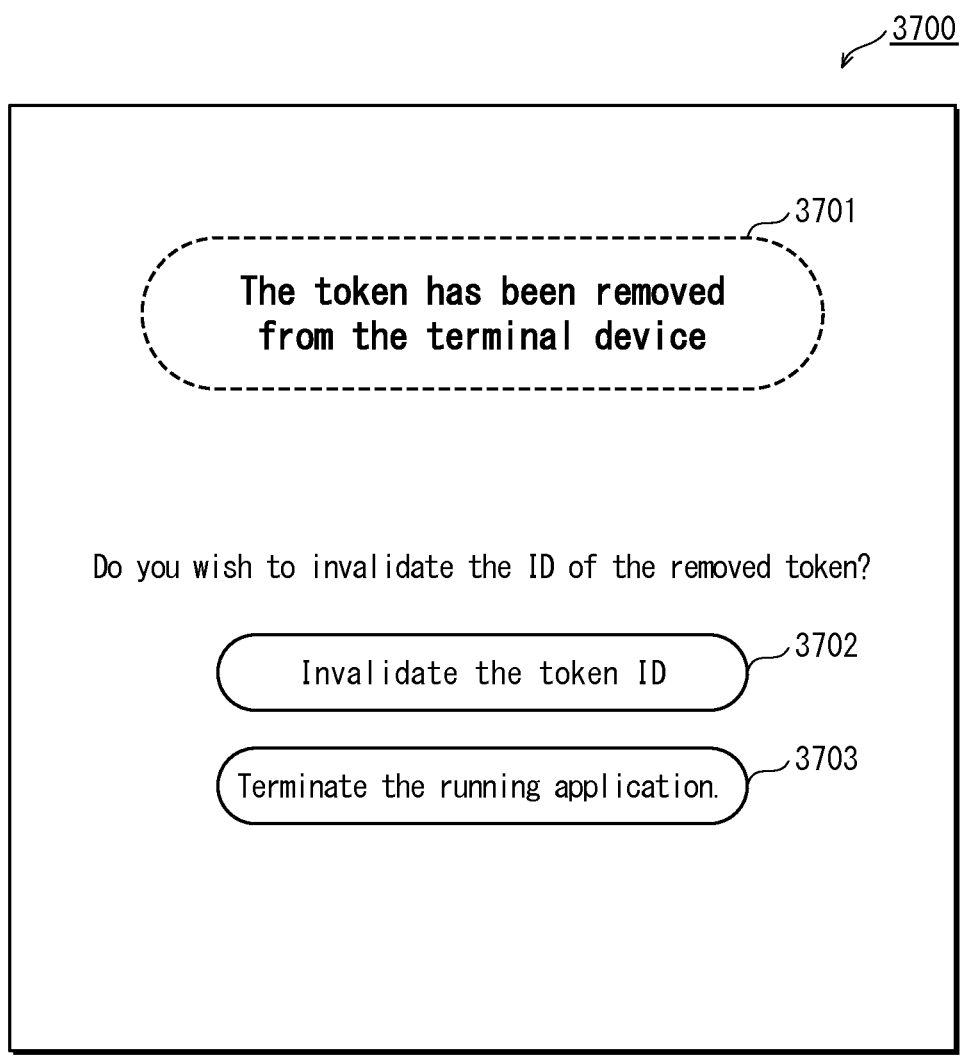
FIG. 40 shows a modified example of a UI for receiving operational instructions, displayed on the mail device 600 when the token is not normal.

The message display area 3701 displays a notification to the user when an unauthorized operation is detected. FIG. 40 shows an example message saying, "Token has been removed from the terminal device". This notification enables the user to recognize that the memory card is not attached to the terminal device.

The button 3702 is used for performing the same processing as the button 3605 shown in FIG. 39.

The button 3703 is used for performing the same processing as the button 3606 shown in FIG. 39.

The user can immediately prohibit the execution of the control program by simply pressing the button on the UI 3700.

(5) Each device described above may be realized as a computer system including a microprocessor, ROM, RAM, a hard disk device, and so on. The RAM or the hard disk device stores a computer program that causes the microprocessor of each device to perform the processing shown in FIGS. 17 through 29 and FIGS. 36 through 38. The microprocessor operates according to the computer program and thereby realizes the functions of each device. The computer program is made up of a plurality of bundled instruction codes for making instructions to the computer so as to realise a predetermined function.

(6) The components of each device described above may be realized in whole or in part as a single system large scale integration (LSI). The system LSI is a super-multifunction LSI in which a plurality of components are integrated on a single chip. The system LSI is specifically realized as a computer system including a microprocessor, ROM, RAM, and so on. The RAM stores the computer program. The microprocessor operates according to the computer program and thereby realizes the functions of the system LSI.

The components of the above-described devices may be realised individually as separate chips, or else a subset of or all of the components may be realised as a single chip.

Although it is stated above that the components of each device described above may be realized in whole or in part as a single system LSI, the components may be realized with IC, LSI, super LSI, or ultra LSI whose degree of integration is different from the system LSI.

Also, the integration method is not limited to LSI. A dedicated circuit or general-purpose processor may also be used. It is also possible to use a Field Programmable Gate Array (FPGA) which can be programed after manufacturing, or a reconfigurable processor whose internal circuit cells are reconfigurable in terms of their connections and settings.

Further still, advances and discoveries in semiconductor technology may lead to a new technology replacing LSI. Functional blocks may, of course, be integrated using such future technology.

(7) The components of each of the above-described devices may be in whole or in part realized as a removable IC card or as a simple module. The IC card and the module are each configured as a computer system having a microprocessor, ROM, RAM, and so on. The IC card and the module may also include the aforementioned super-multifunctional LSI. The microprocessor operates according to the computer program and thereby realizes the functions of the IC card or the module. The IC card and the module may be temper resistant.

(8) The computer program may be recorded on a computer readable recording medium, such as a flexible disk, a hard disk, a CD-ROM, an MO disc, a DVD, DVD-ROM, DVD-RAM, a Blu-ray Disc (BD)(registered trademark), semiconductor memory, and so on.

The computer program may be transmitted via electrical signal lines, wireless or wired communication lines, a network such as the Internet, or a data broadcasting network.

Also, the computer program may be recorded onto the recording medium and transferred, or may be transferred over a network, so as to be executed by another, independent computer system.

(9) The above-described Embodiments and Modifications may be freely combined.

<4. Supplemental Descriptions>

The following describes the structure of a verification method as an embodiment of the present invention, and modifications and advantageous effects thereof.

(1) A verification method pertaining to the present invention is a verification method for verifying validity of a control program, the control program being executed by a terminal device to remotely control an appliance via a server device, the verification method comprising: a unique identifier acquiring step of acquiring a unique identifier from a unique identifier storage device that stores therein the unique identifier, the unique identifier being assigned to a user of the terminal device; a parameter acquiring step of acquiring a parameter generated by the server device, the parameter being assigned to the control program; a generating step of repeatedly generating verification data during execution of the control program based on partial data, the unique identifier, and the parameter, the partial data being at least a portion of the control program; a transmitting step of transmitting the verification data to the server device every time the verification data is generated; a comparison data generating step of, every time the server device receives the verification data, generating comparison data by using at least one of: an ID stored in correspondence with an authorized user of the control program; the parameter; and a portion of a control program stored in the server device, the control program stored in the server device being in correspondence with the control program executed by the terminal device, and the portion of the control program stored in the server device being in correspondence with the partial data; a determining step of determining whether the control program stored in the terminal device is valid by comparing the verification data with the comparison data; and a controlling step of prohibiting the terminal device from remotely controlling the appliance when the control program is determined as not valid in the determining step.

According to this method, the validity of the control program that is being executed is determined by repeatedly comparing the verification data, which is generated by the terminal device based on: the unique identifier assigned to the user; the parameter assigned to the control program used by the user; and data of the control program, with the comparison data generated by the server device, during the execution of the control program, and when the control program is determined as not valid, the remote control according to the control program will be prohibited.

(2) The terminal device may have execution memory, the control program may be loaded to the execution memory before being executed, and in the generating step, at least a portion of the control program stored in the execution memory may be used as the partial data.

According to this verification method, the verification data is generated by using the partial data, which is at least a portion of data of the control program in the execution memory of the terminal device. Therefore, it is possible to verify the validity of the control program that is actually being executed, instead of a control program stored in a storage device such as ROM (Read Only Memory), a hard disk device, or an SSD (Solid State Drive).

(3) In the generating step, a portion of the control program used as the partial data at each time may be different from a portion of the control program previously used as the partial data.

According to this verification method, in the generating step, a portion of the running control program used for generating the verification data at each time is different from a portion previously used. Therefore, tamper-resistant verification data can be generated.

(4) The parameter may be a random number, and in the generating step, the verification data may be generated by using a predetermined one-way function defined with the random number, the unique identifier and the partial data, and in the comparison data generating step, the comparison data may be generated by using a same function as the predetermined one-way function.

According to this verification method, a random number generated by the server device is used as the parameter for generating the verification data, and at the generation of the verification data and the comparison data, the same one-way function is used for the calculation. Therefore, it is easy to perform the matching between the verification data and the comparison data.

(5) The terminal device may acquire the control program from a distribution server device, the control program stored in the server device may be the same as the control program acquired by the terminal device from the distribution server device, and in the comparison data generating step, the comparison data may be generated by using a portion of the control program stored in the server device, the portion of the control program stored in the server device being in correspondence with the partial data.

According to this method, the comparison data is generated by using data of the valid control program stored in the server device.

Therefore, the comparison data with authenticity can be generated, and this makes it easy to determine the validity of the control program executed by the user.

(6) The verification method may further comprise: a notifying step of issuing a notification showing that the control program is not valid when the control program is determined as not valid in the determining step.

Therefore, when the control program that is being executed has been tampered with, the user can recognize that the control program is an invalid control program.

(7) The verification method may further comprise: an updating step of, when the notification is issued, making an inquiry with a user of the terminal device as to whether to update the control program stored in the terminal device, and when receiving permission for updating from the user in response to the inquiry, acquiring a latest version of the control program from the distribution server and updating the control program stored in the terminal device to the latest version.

Therefore, on receipt of the notification indicating that the control program is invalid, the user can replace the invalid control program with a valid control program by updating.

(8) The verification method may further comprise: a parameter updating step of updating the parameter to a new parameter when the control program is determined as not valid in the determining step.

According to this verification method, when the control program is determined as invalid, the parameter that has been used can be changed to a different value. Therefore, it is possible to more securely generate the verification data and the comparison data.

(9) The verification method may further comprise: an outputting step of outputting a remote control instruction to the appliance to remotely control the appliance, wherein in the controlling step, the terminal device may be prohibited from remotely controlling the appliance by preventing the remote control instruction from being output to the appliance.

According to this verification method, when the control program is determined as invalid, the instruction for remotely controlling the appliance is not sent to the appliance. Therefore, it is possible to prevent unauthorized remote control of the appliance.

(10) The terminal device may store therein a condition for each of a plurality of user instructions made to remotely control the appliance, the condition being related to the unique identifier and being used for determining whether to accept each of the user instructions, and the verification method may further comprise: an accepting step of accepting a user instruction from among the plurality of user instructions, and in the accepting step, when the user instruction is determined as not satisfying the condition based on the condition and the unique identifier, the user instruction may be prevented from being accepted.

By using this verification method, it is possible to limit the controllable functions of the appliance according to whether the unique identifier is present or not.

(11) The server device may store IDs in one-to-one correspondence with users, and the verification method may further comprise: a login operation receiving step of receiving a login operation from each user; a user authentication step of, before execution of the control program, receiving a login operation from one of the users, specifying an ID corresponding to the one of the users by referring to the IDs stored in the server device, and performing ID verification by determining whether the unique identifier matches the ID; and a prohibiting step of prohibiting the execution of the control program when the unique identifier is determined as not matching the ID in the user authentication step.

According to the verification method, the user can log in the server device, and when the login fails, the execution of the control program will be prohibited.

Therefore, it is possible to prevent the appliance from being remotely controlled by an unauthorized third party.

(12) The unique identifier storage device may be a recording medium device having a tamper-resistant storage area in which the unique identifier is stored, the terminal device may have an interface for connection with the recording medium device, and in the unique identifier acquiring step, the unique identifier may be acquired from the recording medium device connected to the terminal device.

According to this verification method, the unique identifier for the use is stored in the tamper-resistant storage area. Therefore, it is possible to more securely generate the verification data.

(13) The verification method may further comprise: a detecting step of detecting a connection state showing whether the recording medium device is connected to the terminal device, wherein when the recording medium device is determined as not connected to the terminal device in the detection step, the login operation may be received from the one of the users in the login operation receiving step, and the ID verification may be performed in the user authentication step.

According to this verification method, when the recording medium device is not connected to the terminal device and the unique identifier cannot be obtained, a request for logging in is issued to the user, and authentication is performed to verify the validity of the user. Therefore, this method improves protection against unauthorized remote control by a third party.

(14) The server device may store therein revocation information specifying a unique identifier for which remote control of the appliance is prohibited, and in the user authentication step, even when the unique identifier acquired from the recording medium device is determined as matching the ID corresponding to the one of the users in the ID verification, user authentication may fail when the unique identifier acquired from the recording medium device matches the unique identifier specified by the revocation information.

According to this verification method, the unique identifier acquired from the recording medium device is compared with the revocation information in which invalid unique identifiers are registered, and when the acquired unique identifier matches any of the invalid unique identifiers in the revocation information, the user is determined as not an authorized user. Therefore, this method improves protection against unauthorized remote control by a third party.

(15) The verification method may further comprise: a recording step of, when the unique identifier of the recording medium device is not stored in the server device, recording the unique identifier of the recording medium device in association with the one of the users.

By using this verification method, the unique identifier used by the user can be stored in the server device in association with the user. Therefore, the method makes it easy to verify the validity of the user even when the user is a new user.

(16) The verification method may further comprise: a detecting step of detecting a connection state showing whether the recording medium device is connected to the terminal device; and a dissociating step of dissociating the unique identifier of the recording medium device from the one of the users when the recording medium device is determined as not being connected to the terminal device in the detecting step.

According to this verification method, when the control program for remote control is executed without the recording medium device storing the unique identifier, the unique identifier associated with the user can be removed. Therefore, the recording medium belonging to the user is prevented from being used without authority.

(17) The server device may store therein a destination of a notification for each user and information identifying a terminal device used by the user, the verification method may further comprise a terminal device identifier acquiring step of acquiring a terminal device identifier identifying a terminal device allowed to access the server device, and in the user authentication step, determination may be made on whether the terminal device identifier acquired in the terminal device identifier acquiring step matches the information identifying the terminal device used by the user, and when the terminal device identifier acquired in the terminal device identifier acquiring step is determined as not matching the information identifying the terminal device used by the user, a notification indicating the mismatch may be sent to the destination of the notification for the user in the notifying step.

According to this verification method, when the control program is executed by a terminal device that is different from a terminal device that is usually used by the user, the user is notified.

Therefore, this method improves protection against unauthorized remote control by a third party using a different terminal device.

(18) The verification method may further comprise: a revocation information recording step of, when the unique identifier is determined as not matching the ID in the user authentication step, recording the unique identifier in the revocation information.

According to this verification method, when the recording medium device that is usually used by the user is used under the condition that it is connected to a terminal device that is different from the terminal device that is usually used by the user, the unique identifier stored in the recording medium is recorded into the revocation information. Therefore, the verification method improves protection against unauthorized remote control by a third party using this recording medium device.

(19) A verification system pertaining to the present invention is a system including a terminal device, an appliance and a server device, the terminal device executing a control program to remotely control the appliance via the server device, the terminal device comprising: a unique identifier acquiring unit acquiring a unique identifier from a unique identifier storage device that stores therein the unique identifier, the unique identifier being assigned to a user of the terminal device; a parameter acquiring unit acquiring a parameter generated by the server device, the parameter being assigned to the control program; a generating unit repeatedly generating verification data during execution of the control program based on partial data, the unique identifier, and the parameter, the partial data being at least a portion of the control program; and a transmitting unit transmitting the verification data to the server device every time the verification data is generated, and the server device comprising: a receiving unit receiving the verification data; a comparison data generating unit, every time the receiving unit receives the verification data, generating comparison data by using at least one of: an ID stored in correspondence with an authorized user of the control program; the parameter; and a portion of a control program stored in the server device, the control program stored in the server device being in correspondence with the control program executed by the terminal device, and the portion of the control program stored in the server device being in correspondence with the partial data; a determining unit determining whether the control program stored in the terminal device is valid by comparing the verification data with the comparison data; and a controlling unit prohibiting the terminal device from remotely controlling the appliance when the control program is determined as not valid by the determining unit.

According to this system, the validity of the control program that is being executed is determined by repeatedly comparing the verification data, which is generated by the terminal device based on: the unique identifier assigned to the user; the parameter assigned to the control program used by the user; and data of the control program, with the comparison data generated by the server device, during the execution of the control program, and when the control program is determined as not valid, the remote control according to the control program will be prohibited.

[Industrial Applicability]

A verification method pertaining to the present invention can be used for verifying the validity of an application program that is being executed in a terminal device.

REFERENCE SIGNS LIST

10, 11 Remote control system
20 Network
100 Distribution server device
101, 201, 301, 401 Control unit
102, 202, 302, 502, 650 Communication unit
103, 203, 303, 403 Mutual authentication unit
104, 204, 304, 404 Key storage unit
105 Storage unit
106, 209 Account storage unit
107, 215 Account verification unit
200 Verification server device
206 Program creation unit
207, 305 Program storage unit
208 Associated data generation unit
210 Authenticity evaluation unit
212 Appliance information storage unit
213 Appliance control unit
214 Signature generation unit
215 Account verification unit
216 Unique identifier acquisition unit
217 Appliance information management unit
218, 311 Verification unit
219, 912 Token verification unit
220 Mail transmission unit
221 Mail operation reception unit 300 Terminal device
306 Program execution unit
307 Associated data storage unit
308, 408 Input/output unit
309, 620 Display unit
310 Input unit
400 Memory card
407 Unique identifier storage unit
500 Appliance
501 Mechanism control unit
506 Instruction receiving unit
507 Information notification unit
508 Mechanism
600 Mail device
902 Unique identifier acquisition processing unit
911 Verification data generation unit

The invention claimed is:

1. A verification method for verifying validity of a control program, the control program being executed by a terminal device to remotely control an appliance via a server device, the verification method comprising:
  a unique identifier acquiring step of acquiring a unique identifier from a unique identifier storage device that stores therein the unique identifier, the unique identifier being assigned to a user of the terminal device;
  a parameter acquiring step of acquiring a parameter generated by the server device, the parameter being assigned to the control program;
  a generating step of repeatedly generating verification data during execution of the control program based on partial data, the unique identifier, and the parameter, the partial data being at least a portion of the control program;
  a transmitting step of transmitting the verification data to the server device every time the verification data is generated;
  a comparison data generating step of, every time the server device receives the verification data, generating comparison data by using at least one of: an ID stored in correspondence with an authorized user of the control program; the parameter; and a portion of a control program stored in the server device, the control program stored in the server device being in correspondence with the control program executed by the terminal device, and the portion of the control program stored in the server device being in correspondence with the partial data;
  a determining step of determining whether the control program stored in the terminal device is valid by comparing the verification data with the comparison data; and
  a controlling step of prohibiting the terminal device from remotely controlling the appliance when the control program is determined as not valid in the determining step.

2. The verification method of claim 1, wherein
the terminal device has execution memory,
the control program is loaded to the execution memory before being executed, and
in the generating step, at least a portion of the control program stored in the execution memory is used as the partial data.

3. The verification method of claim 2, wherein
in the generating step, a portion of the control program used as the partial data at each time is different from a portion of the control program previously used as the partial data.

4. The verification method of claim 3, wherein
the parameter is a random number,
in the generating step, the verification data is generated by using a predetermined one-way function defined with the random number, the unique identifier and the partial data, and
in the comparison data generating step, the comparison data is generated by using a same function as the predetermined one-way function.

5. The verification method of claim 4, wherein
the terminal device acquires the control program from a distribution server device,
the control program stored in the server device is the same as the control program acquired by the terminal device from the distribution server device, and
in the comparison data generating step, the comparison data is generated by using a portion of the control program stored in the server device, the portion of the control program stored in the server device being in correspondence with the partial data.

6. The verification method of claim 1, further comprising:
a notifying step of issuing a notification showing that the control program is not valid when the control program is determined as not valid in the determining step.

7. The verification method of claim 6, further comprising:
an updating step of, when the notification is issued, making an inquiry with a user of the terminal device as to whether to update the control program stored in the terminal device, and when receiving permission for updating from the user in response to the inquiry, acquiring a latest version of the control program from the distribution server and updating the control program stored in the terminal device to the latest version.

8. The verification method of claim 5, further comprising:
a parameter updating step of updating the parameter to a new parameter when the control program is determined as not valid in the determining step.

9. The verification method of claim 5, further comprising:
an outputting step of outputting a remote control instruction to the appliance to remotely control the appliance, wherein
in the controlling step, the terminal device is prohibited from remotely controlling the appliance by preventing the remote control instruction from being output to the appliance.

10. The verification method of claim 5, wherein
the terminal device stores therein a condition for each of a plurality of user instructions made to remotely control the appliance, the condition being related to the unique identifier and being used for determining whether to accept each of the user instructions,
the verification method further comprises:
  an accepting step of accepting a user instruction from among the plurality of user instructions, and
in the accepting step, when the user instruction is determined as not satisfying the condition based on the condition and the unique identifier, the user instruction is prevented from being accepted.

11. The verification method of claim 5, wherein
the server device stores IDs in one-to-one correspondence with users, and
the verification method further comprises:
  a login operation receiving step of receiving a login operation from each user;
  a user authentication step of, before execution of the control program, receiving a login operation from one of the users, specifying an ID corresponding to the one of the users by referring to the IDs stored in the server device, and performing ID verification by determining whether the unique identifier matches the ID; and a prohibiting step of prohibiting the execution of the control program when the unique identifier is determined as not matching the ID in the user authentication step.

12. The verification method of claim 11, wherein
the unique identifier storage device is a recording medium device having a tamper-resistant storage area in which the unique identifier is stored,
the terminal device has an interface for connection with the recording medium device, and
in the unique identifier acquiring step, the unique identifier is acquired from the recording medium device connected to the terminal device.

13. The verification method of claim 12, further comprising:
a detecting step of detecting a connection state showing whether the recording medium device is connected to the terminal device, wherein
when the recording medium device is determined as not connected to the terminal device in the detection step,
the login operation is received from the one of the users in the login operation receiving step, and
the ID verification is performed in the user authentication step.

14. The verification method of claim 12, wherein
the server device stores therein revocation information specifying a unique identifier for which remote control of the appliance is prohibited, and
in the user authentication step, even when the unique identifier acquired from the recording medium device is determined as matching the ID corresponding to the one of the users in the ID verification, user authentication fails when the unique identifier acquired from the recording medium device matches the unique identifier specified by the revocation information.

15. The verification method of claim 12, further comprising:
a recording step of, when the unique identifier of the recording medium device is not stored in the server device, recording the unique identifier of the recording medium device in association with the one of the users.

16. The verification method of claim 12, further comprising:
a detecting step of detecting a connection state showing whether the recording medium device is connected to the terminal device; and
a dissociating step of dissociating the unique identifier of the recording medium device from the one of the users when the recording medium device is determined as not being connected to the terminal device in the detecting step.

17. The verification method of claim 12, wherein
the server device stores therein a destination of a notification for each user and information identifying a terminal device used by the user,
the verification method further comprises:
a terminal device identifier acquiring step of acquiring a terminal device identifier identifying a terminal device allowed to access the server device,
in the user authentication step, determination is made on whether the terminal device identifier acquired in the terminal device identifier acquiring step matches the information identifying the terminal device used by the user, and
when the terminal device identifier acquired in the terminal device identifier acquiring step is determined as not matching the information identifying the terminal device used by the user, a notification indicating the mismatch is sent to the destination of the notification for the user in the notifying step.

18. The verification method of claim 12, further comprising:
a revocation information recording step of, when the unique identifier is determined as not matching the ID in the user authentication step, recording the unique identifier in the revocation information.

19. A system including a terminal device, an appliance and a server device, the terminal device executing a control program to remotely control the appliance via the server device,
the terminal device comprising:
a unique identifier acquiring unit acquiring a unique identifier from a unique identifier storage device that stores therein the unique identifier, the unique identifier being assigned to a user of the terminal device;
a parameter acquiring unit acquiring a parameter generated by the server device, the parameter being assigned to the control program;
a generating unit repeatedly generating verification data during execution of the control program based on partial data, the unique identifier, and the parameter, the partial data being at least a portion of the control program; and
a transmitting unit transmitting the verification data to the server device every time the verification data is generated, and
the server device comprising:
a receiving unit receiving the verification data;
a comparison data generating unit, every time the receiving unit receives the verification data, generating comparison data by using at least one of: an ID stored in correspondence with an authorized user of the control program; the parameter; and a portion of a control program stored in the server device, the control program stored in the server device being in correspondence with the control program executed by the terminal device, and the portion of the control program stored in the server device being in correspondence with the partial data;
a determining unit determining whether the control program stored in the terminal device is valid by comparing the verification data with the comparison data; and
a controlling unit prohibiting the terminal device from remotely controlling the appliance when the control program is determined as not valid by the determining unit.

20. A computer-readable non-transitory recording medium storing thereon a computer program to be executed in a system including a terminal device, an appliance and a server device, the terminal device executing a control program to remotely control the appliance via the server device, the computer program performing:
a unique identifier acquiring step of acquiring a unique identifier from a unique identifier storage device that stores therein the unique identifier, the unique identifier being assigned to a user of the terminal device;
a parameter acquiring step of acquiring a parameter generated by the server device, the parameter being assigned to the control program;
a generating step of repeatedly generating verification data during execution of the control program based on partial data, the unique identifier, and the parameter, the partial data being at least a portion of the control program;

a transmitting step of transmitting the verification data to the server device every time the verification data is generated;

a comparison data generating step of, every time the server device receives the verification data, generating comparison data by using at least one of: an ID stored in correspondence with an authorized user of the control program; the parameter; and a portion of a control program stored in the server device, the control program stored in the server device being in correspondence with the control program executed by the terminal device, and the portion of the control program stored in the server device being in correspondence with the partial data;

a determining step of determining whether the control program stored in the terminal device is valid by comparing the verification data with the comparison data; and a controlling step of prohibiting the terminal device from remotely controlling the appliance when the control program is determined as not valid in the determining step.

21. An integrated circuit for composing a system including a terminal device, an appliance and a server device, the terminal device executing a control program to remotely control the appliance via the server device, comprising:

a unique identifier acquiring unit acquiring a unique identifier from a unique identifier storage device that stores therein the unique identifier, the unique identifier being assigned to a user of the terminal device;

a parameter acquiring unit acquiring a parameter generated by the server device, the parameter being assigned to the control program;

a generating unit repeatedly generating verification data during execution of the control program based on partial data, the unique identifier, and the parameter, the partial data being at least a portion of the control program;

a transmitting unit transmitting the verification data to the server device every time the verification data is generated;

a comparison data generating unit, every time the server device receives the verification data, generating comparison data by using at least one of: an ID stored in correspondence with an authorized user of the control program; the parameter; and a portion of a control program stored in the server device, the control program stored in the server device being in correspondence with the control program executed by the terminal device, and the portion of the control program stored in the server device being in correspondence with the partial data;

a determining unit determining whether the control program stored in the terminal device is valid by comparing the verification data with the comparison data; and a controlling unit prohibiting the terminal device from remotely controlling the appliance when the control program is determined as not valid by the determining unit.

* * * * *